(12) United States Patent
Simmons

(10) Patent No.: US 9,791,926 B2
(45) Date of Patent: Oct. 17, 2017

(54) LIGHT MANAGEMENT FOR IMAGE AND DATA CONTROL

(71) Applicant: John Castle Simmons, Germantown, TN (US)

(72) Inventor: John Castle Simmons, Germantown, TN (US)

( * ) Notice: Subject to any disclaimer, the term of this patent is extended or adjusted under 35 U.S.C. 154(b) by 0 days.

(21) Appl. No.: 15/400,040

(22) Filed: Jan. 6, 2017

(65) Prior Publication Data

US 2017/0192504 A1 Jul. 6, 2017

Related U.S. Application Data

(63) Continuation of application No. 15/201,584, filed on Jul. 4, 2016, now Pat. No. 9,576,556, which is a continuation of application No. 14/215,199, filed on Mar. 17, 2014, now Pat. No. 9,392,129.

(60) Provisional application No. 61/801,708, filed on Mar. 15, 2013.

(51) Int. Cl.
| | |
|---|---|
| *G06F 3/01* | (2006.01) |
| *G09G 5/10* | (2006.01) |
| *G09G 5/02* | (2006.01) |
| *G02B 27/00* | (2006.01) |
| *G02B 27/01* | (2006.01) |
| *H04N 5/775* | (2006.01) |

(52) U.S. Cl.
CPC ......... *G06F 3/013* (2013.01); *G02B 27/0093* (2013.01); *G02B 27/0172* (2013.01); *G02B 27/0179* (2013.01); *G09G 5/02* (2013.01); *G09G 5/10* (2013.01); *G02B 2027/014* (2013.01); *G02B 2027/0112* (2013.01); *G02B 2027/0118* (2013.01); *G02B 2027/0138* (2013.01); *G02B 2027/0187* (2013.01); *G09G 2320/0626* (2013.01); *G09G 2320/0666* (2013.01); *G09G 2320/0686* (2013.01); *G09G 2354/00* (2013.01); *H04N 5/7755* (2013.01)

(58) Field of Classification Search
CPC . G06F 3/013; G02B 27/0093; G02B 27/0172; G02B 27/0179; G02B 2027/0112; G02B 2027/0118; G02B 2027/0138; G02B 2027/014; G02B 2027/0187; G09G 5/02; G09G 5/10; G09G 2320/0626; G09G 2320/0666; G09G 2320/0686; G09G 2354/00; H04N 5/7755
See application file for complete search history.

(56) References Cited

U.S. PATENT DOCUMENTS

| 5,801,808 A * | 9/1998 | Abraham | A61B 3/12 351/221 |
|---|---|---|---|
| 2013/0033485 A1* | 2/2013 | Kollin | G06F 1/1637 345/419 |

(Continued)

*Primary Examiner* — Dmitriy Bolotin

(57) ABSTRACT

Image-adaptive technologies supportive of better vision. Working with ordinary image display devices and, optionally, specialized ones, a number of embodiments are disclosed that provide displayed images better able to be perceived by those with, for example, macular degeneration, poor night-vision and cataracts. In both ordinary and worn display embodiments, an image, potentially of the viewer's instant surroundings, is displayed whose fundamental light components and/or managed processes result in better visual perception.

12 Claims, 27 Drawing Sheets

(56) References Cited

U.S. PATENT DOCUMENTS

2016/0033771 A1* 2/2016 Tremblay ........... G02B 27/0172
 345/8
2016/0212404 A1* 7/2016 Maiello ................. A61B 3/032

* cited by examiner

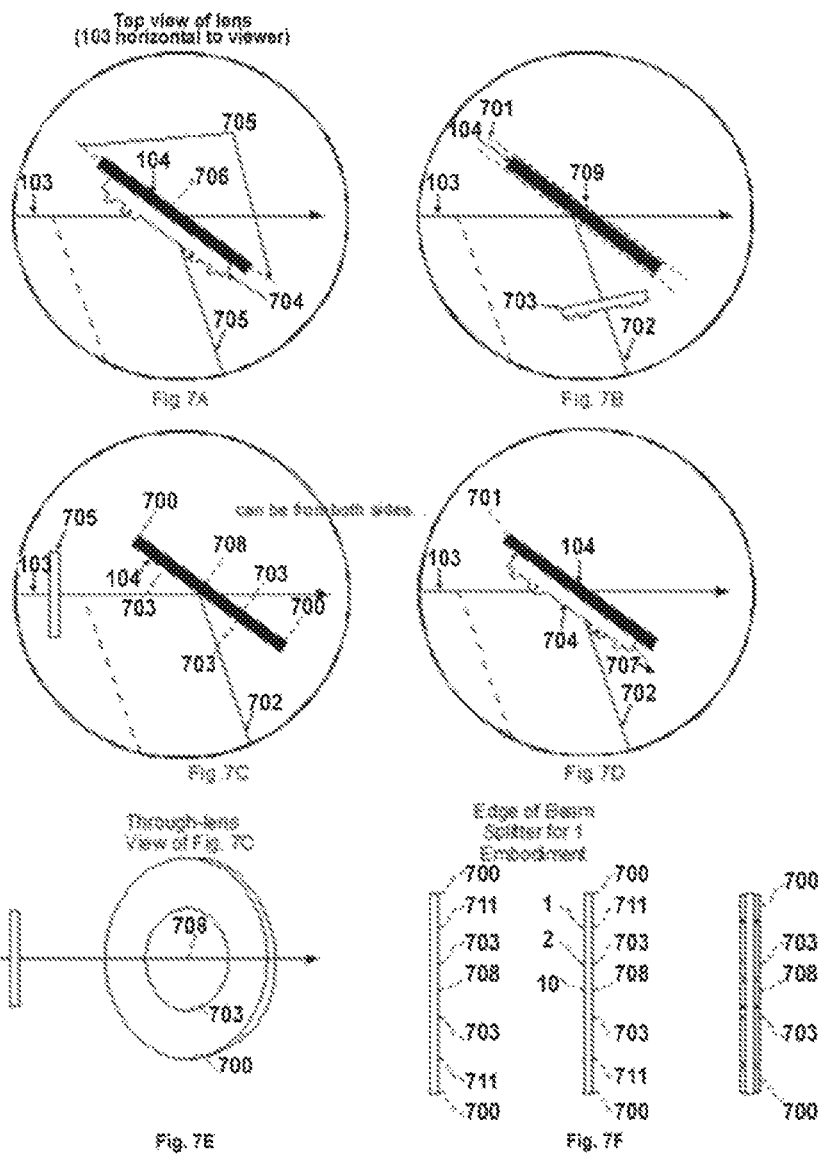

LIGHT MANAGEMENT FOR IMAGE AND DATA CONTROL

CROSS REFERENCE TO RELATED APPLICATIONS

This application claims full benefit of U.S. Ser. No. 15/201,584 filed on Jul. 4, 2016 which itself claims full benefit of U.S. Ser. No. 14/215,199 filed Mar. 17, 2014 and receiving U.S. Pat. No. 9,392,129 which itself claims full benefit of provisional application 61/801,708 filed Mar. 15, 2013.

All preceding applications are entitled "Light Management for Image and Data Control" and all are referred to and incorporated herein by reference in their entirety.

BACKGROUND OF THE INVENTION

The current invention pertains to advanced light management such as is useful in the processing of and displaying and processing of data related to light. For example, the current state of the art in display technology still falls short of providing image displays (from large screen televisions to miniature worn displays; e.g., image displaying glasses) with true and accurate depth perception, natural (wide) field of view (FOV) and control of overlaid images. Worn displays have proliferated with the miniaturization of optical parts and the widespread need for portable imaging. There are numerous "heads-up" (worn) displays based on the image (from head mounted projectors) passing through a collimator and entering the eye. The collimation (i.e. divergence reduction) process makes the image appear more distal by making the light from any given pixel less divergent. Otherwise, a head mounted projector would normally be too close for the eye to bring to a focus on the retina. The collimation process, in addition to creating the illusion of a larger, more distant display, also moves the apparent point of interest (POI, i.e. what the observer wants to see) beyond the near point so that the image can be resolved on the retina within a reasonable circle of confusion (CC). There are numerous variations on that theme including those in which the image is reflected off of mirrors, deformable mirrors, mirror arrays and beamsplitters in transit to the eye.

This external accommodation for the eye's limited diopters of focusing power for very near isotropic-pixel image sources and the other hardware typically required in directing and managing the beam to the retina all come at a high cost. That cost includes the expense of lenses (typically very precise and often compound lenses), the chromatic aberration and/or edge distortion/peripheral vision and FOV-limiting factors associated with them, the weight of those classical optics, the need for a larger housing to accommodate the collimating and beam managing optics, the often extreme sensitivity to critical alignment (and vibration-induced misalignment), and full or partial obstruction of the natural scene view (what would be seen without a display in the way) by all of these components. These and the electrical power requirements of classical display technologies prevents their use altogether in many applications and makes it difficult in others.

There are other problems with both 2-D and 3-D worn displays that are designed for assisting the viewer (the person viewing the image) with images that are either independent (only the display image is seen) or overlaid over a scene. These include:

Mixed views with conflicting focal distances: Mixing the image to be displayed against a complex landscape (that landscape having a potentially wide disparity in required focusing distances even in a narrow lateral proximity) is complex task. As you look at a near projected image with a far object visible behind it, the eye, having a single lens-accommodation apparatus, attempts to capture both landscape and image using the same focus. When the eye's focus is set on a very near object, an also-near (i.e. high divergence associated with a near isotropic emitter) display image may be in focus. If it is, then it will be out of focus if the viewer later fixates on a far object—delivering a confused view to the user that forces him to give attention selectively to the display to the detriment of the now fuzzy background or vice versa. In other words, conventional display systems can't match the display view's effective plane of focus to that of the instant scene POI (which may be in a wide variety of distances from the single effective focal plane provided by typical displays).

Safety: Soldiers in the Army's advanced military equipment program have confided that they routinely take off their heads-up displays to keep from tripping and falling down even at a slow walk due to severe spatial disorientation. This is because if they focus, for example, on a graphical pointer image (highlighting, for example, the azimuth and elevation of a threat) the ground is then out of focus causing them to be disoriented when they return their focus to the real world. More complex images (much more complex than a pointer or crosshair) create even more substantial problems.

Painful 3-D: The familiar binocular 3-D glasses (whether using red and green lenses, twin polarization, or blanking interval selection) all create a phenomenon associated with, in extended use, disorientation, dizziness and often headaches or nausea. What is happening is that the brain is getting mixed signals. For example, the binocular overlap tells the brain that an object is at an overlap-indicated distance while the lens focus and interocular cant tells another story (one related to the actual image plane). This spatial disconnect forces the brain to process disorienting, conflicting data that both distracts and, even when the brain submits to a singular component (e.g., binocular overlap), degrades the capacity for accurate depth perception and spatial orientation. This can cause the user, in applications where the 3-dimensional (3-D) imaging is for the purpose of responding to a virtual or recreated distant environment, to miss a virtual target he grabs for due to the spatial disconnects forced upon the brain.

Standing or walking 3-D: Current binocular 3-D systems, in addition to the disorientation and discomfort above, don't mix well with a forward scene. There are many applications where it would be ideal for a lightweight, inexpensive binocular-based 3-D system to overlay a 3-D image cleanly into the natural 3-D scene. However, the very nature of twin sets of isotropically emitting points in a display existing at one apparent distance and another set of isotropically emitting points from a substantially different distance has, until now, assured that one of the images would be out of focus. Thus, a viewer trying to walk or run while viewing the displayed would find objects in the natural landscape out of focus.

Thus, to date, the ideal of a pair of ordinary looking, lightweight, power-efficient glasses providing the viewer with an additive displayed image that is unobstructed by projection overhead and is always in focus with the natural scene view has eluded designers.

Enhanced perception: The medical community, despite great advances in 3-D image capture, still lacks an effective method for integrating this 3-D image with the scene image of the patient in real time as the physician's perspective continually moves. This is especially problematic at hand-eye coordination distances where lens muscular tension (a brain-recognized indication of the focal plane of an eye) varies substantially with the near-field POI.

Spatial light modulators (SLM's) are widely used in projection systems. SLM's work in a number of fashions. Heat-based spatial light modulators are optical devices that allow modulation of incident light with a phase pattern or amplitude determined by heat. Digital micro-mirror devices (DMD's) involve a matrix of micro-mirrors placed above a substrate. A voltage is applied between the micro-mirror and electrode. This allows individual adjustment of the light reflection angles of the micro-mirror. Further timing of how long light is reflected at a target can control the brightness. Liquid crystal devices (LCD's) are another form of spatial light modulation that is effective in controlling the light at a pixel level. Various DMD technologies are disclosed in U.S. Pat. Nos. 4,956,619 and. 5,083,857.

The unique components of all patents referenced herein are not foundational to the claims of the current invention but are mentioned here for background.

U.S. Pat. No. 6,819,469 documents another form of SLM. Here Chalcogenide materials, having nonlinear optical properties, are thus useful as nonlinear optical fibers and filters. From that patent (U.S. Pat. No. 6,819,469): "Chalcogenide materials are known to be capable of reversible structural change between crystalline and amorphous state. These materials have highly nonlinear electrical conductance, which is used in many devices. As an example, U.S. Pat. No. 5,757,446, is for a LCD light modulator (display) in which ovonic (chalcogenide) material is used for pixel switching (selection) element, which allows to apply voltage to the pixel located on the given intersection of address lines, instead of traditional switching elements such as a diode or transistor.

Electro-optic (EO) materials change their refractive index (RI) in an electric field enabling yet another form of SLM. A first-order (linear) electro-optic effect, known as the Pockels effect, and a second-order (quadratic) electro-optic effect, known as the Kerr effect, occur in response to the electric field. EO materials have been shown to be effective dynamic lens materials where a matrix of selectively charged areas effect a desired matrix of refractive indexes for light to pass through. For example, a simple convex lens of a desired focal length can be emulated by an EO SLM by making the refractive index (RI) increasingly high the more distal a point on the matrix is from the center. For example, U.S. Pat. No. 4,746,942, describes a wafer of electro-optic material with an array of independently operated surface-mounted electrodes.

Other forms of SLM's include Dynamic Micromirror Displays (DMD's), LCD's and a number of others in this emerging class of imaging devices that are effective for attenuating the direction and/or characteristics of light at an individual pixel level However, all SLM's, particularly in embodiments where large light vector changes are required in a short space or in a very small area, are inadequate for providing an unimpeded scene view and a scene-overlaid displayed image from miniaturized worn display elements.

U.S. Pat. No. 7,158,317 introduces depth of field enhancing patterns using Fresnel lenses and Zalevsky et al teach binary-phase masks that also sharpen an image when at a depth associated with defocus by conventional lenses. ["All-optical axial super resolving imaging using a low-frequency binary-phase mask", Zeev Zalevsky(1), Amir Shemer(1), Alexander Zlotnik(1), Eyal Ben Eliezer(2) and Emanuel Marom(2) 3 Apr. 2006/Vol. 14, No. 7/Optics Express]

Gaming glasses provide a 3-D effect as a viewer watches a monitor through them. The gaming glasses that work on the shutter principle provide each eye the image respective of its side of a binocular image. Many do this by blocking, for example, the left eye very briefly and flashing the image on the screen for the right eye. The next cycle blocks the right eye and flashes the image for the left eye. In this manner, each eye sees an image appropriate for a desired distance in a binocular view.

Laser projection is a promising area for traditional screen and worn display applications and allows a view of the scene combined with the display image. However, most involve collimation optics, image projectors (to reproduce a scene that is physically blocked by the assembly) and beam splitters which add layers of error and complexity and may severely limit effective FOV. The collimation optics themselves create physical weight and footprint overhead as well as multiple degrees of freedom potential for error in alignment of individual components. This is further compounded by the interacting misalignments of multiple collimation components required on equipment that is unfortunately destined for the impacts, water droplets, glass fog and filmy slime of hostile environments. Large screen displays are currently not associated with flat screens or efficient light control. The need exists for an power efficient, broadly scalable flat screen display (from handheld screen to billboard) that effectively delivers the vast majority of the light produced to the viewer as opposed to the surrounding area outside the field of view (FOV) of the display and, optionally, in 2-D or 3-D.

Currently available HWD's are expensive, sensitive to shock, misalignment of optical components, heat and moisture and do not provide the broad FOV, good peripheral vision, easily viewed, high-resolution scene view (integrated with the display view) or the depth-enabled pixel display necessary for natural spatial perceptions. If this were accomplished, there would also be multiple applications in vision enhancement and correction but the above limitations have not previously been overcome.

U.S. Pat. No. 6,181,367 discloses an ingenious device that casts raster-like rows of light along the surface of a transparent plate using total internal reflection (TIR) to keep the multi-diode-delivered light in the plate. This uncollimated light (TIR reflections and an intentional pass through a grating inject numerous light vectors) escapes the TIR (via charge-induced frustrated TIR or FTIR) when a surface area's refractive index (RI) is modified. This escaping diffuse light is redirected by a hologram at each point of activity to direct the light producing an emission viewed as a pixel. However, even this use of reflectivity, TIR mediated by FTIR, (where control of reflectivity is only used as an on/off switch for transmission vs. reflection, affects the quality of the light and ultimately image resolution.

Also, degree of illumination is controlled by attenuation of power to the light source which largely precludes or hampers the potential activation of multiple pixels in the same raster line (having different desired intensities) at once thus reducing potential refresh speed. Also, a binary electro-optic (EO) choice of off or on determines the state of the pixel but offers no favorably distributive effect as would be effected with an intensity based on duration of activation or amplitude of the activation signal to the EO modulator. Also, the switching of the laser is a key part of choosing which area is to be activated which can further limit top refresh speed by limiting or eliminating concurrent activations of multiple pixels in the same row all of which normally have a different intensity. This can become even more awkward when multi-color imaging is desired and, in a described embodiment, three or more diodes are required for each row of pixels.

The sequential switching of the elements in the row of light emitting diodes as a means of providing light to numerous pixel areas as needed also is substantially slower (in the switching process) to respond to a needed activation than a device using a constant beam which requires no waiting for the right LED sequence and the correct brightness to "come around again".

Also, the dedication of a laser diode for each row in a raster-like display both creates expense, fabrication time and registration issues as well as exacerbating wiring and timing issues while becoming even more complex when three diodes or other color controls are required for each row. Also, the switching of these as disclosed can also create issues "deriving from an NTSC video signal the signals applied to the laser diodes".

The confining of each pixel's directive control to one or two holographic elements also reduces the flexibility and increased precision potential and more uniform brightness control that can be effected by cooperating elements that produce a single pixel with broadly variable controlled properties.

The holograph-using embodiments taught in the referenced patent, particularly in the sizes responsive to the compactness required for high resolution (small pixels) and with the quality of phase-distorted TIR light reflecting off of a surface, can't redirect light at as sharp an angle with as clean a beam as the current invention.

Also, the purpose of the holographic element(s) for each pixel is to make the light appear to diverge isotropically at a manufacturer-set divergence relative to a one-time chosen display difference. Thus the fixed holographic elements of the device cannot place the objects at a context sensitive or currently desired image location (depth) because the single depth of the projected image is fixed at the factory. Thus, the image's focal plane can conflict drastically with the focal distance of a nearby area of the scene making it difficult to focus on both at the same time (e.g., when a displayed graphic or text is placed over a scene POI to identify it).

The disclosures of the referenced invention also fail to create any embodiments supportive of true 3-D imaging though it does provide the means to provide one of the multiple brain cues of depth perception, binocular overlap (as do red and green glasses). The disclosures indicate that "the virtual image viewed through a single eye will appear to be at an indeterminate distance" but "the actual appearance of depth will depend almost entirely on stereoscopic cues . . . ". The broadly understood spatial disconnect between binocular overlap and the brain's other compelling depth perception cues is responsible for the headaches, disorientation and sometimes nausea associated with using a 3-D mechanism limited to binocular overlap. Worse, the user does not have a true sense of depth of the displayed images (having, in fact, a misleading one) that could have been used to exploit natural hand-eye coordination in applications where projected images are related to POI'S in the scene view such as a surgeon viewing a positionally registered image of a depth-encoded MRI superimposed over a patient enabling precise and natural hand eye coordination and sense of depth as the surgeon cuts into the patient while viewing a virtual POI inside the body (e.g., an artery to be avoided or a tumor to be precision excised).

Finally, the holographic element(s) can severely react to (negatively) bright ambient light sources and, even in controlled light, substantially distort the scene view (diffracting scene light that attempts to pass through) in addition to the deleterious scene distorting effects of potential artifacts resulting from the FTIR selection of an entire row (distorting the RI of that row for the scene view) at a time (with the chosen "column" diode identifying the pixel). This and other distorting elements in the referenced patent preclude its effective use in coordination with a scene view.

Despite a wealth of imaging technologies, both emerging and established, there is an unmet need for a worn display technology that enables any of the multiple objects of the current invention summarized below under "Summary of The Invention". There is also an unmet need for the control of light, applicable to both imaging and data control applications (e.g. light transmission switching and selective attenuation of signal channels) without the above limitations.

BRIEF SUMMARY OF THE INVENTION

The current invention pertains to an approach applicable to a new visual display technology for providing superior display characteristics for ordinary televisions, computer monitors, giant screen displays and display systems that can be worn like ordinary glasses. It can also provide 3-D as well as 2-D imaging in flat screen displays and curved displays (for providing a surround image with very large FOV). The 3-D images can provide more of the brain's cues for depth perception and spatial sensing than binocular-overlap-based 3-D imaging. Thus, it provides true depth perception (not the misimpression of depth perception that comes from a partial system such as the familiar binocular overlap or other twin image techniques such as shutter-driven gaming glasses) applicable to genuine immersive simulation enabling improved hand-eye coordination. Also, in doing so, the well known spatial sensory disconnects are eliminated along with the disorientation, headaches, etc. that come from receiving mixed spatial signals.

Although any essentially collimatable or near collimatable light source may be an applicable component for the current invention, many embodiments of the current invention are described herein as being a form of laser projection. In one example embodiment applied to viewing a natural scene with an overlaid image, laser light passing through a plate (like glass) longitudinally (traveling inside the plate and being essentially parallel to the surface inside the plate) passes through optical elements in the plate that have the same RI as the plate. Thus, said optical elements do not create substantial boundary conditions, reflection, diffraction or refraction. However, when activated, an area in the plate analogous to a pixel (i.e. emulating the effects of a positioned light source coming from a position perceivable as a pixel in a display), exhibits a shifted RI resulting in controlled redirection of the light passing through it. These paths of redirected lights reach the eye of the user and are perceived as an image. Due to the potential for wavefront reconstruction, the image so viewed can be true 3-D.

It is an object of the current invention to provide a unique and useful display medium for superior performance in very small flat displays, curved displays, giant screen displays (including highway billboards where captured sunlight, being collimated, is an optional light source to overcome bright light viewing conditions) and worn displays that look like ordinary glasses.

It is also an object of the current invention to provide a display medium that allows an unimpeded view of the natural scene along with the video image to be displayed. The "scene" is what would be left to see if the display were removed from the user's FOV.

It is also an object of the current invention to provide a display medium with reduced power usage and enhanced resolution.

It is also an object of the current invention to provide a displayed image that can always be in focus to the wearer of the current invention regardless of the instant focal plane of the current POI in the natural landscape. This will prevent the viewer from necessarily having to change focus to view the displayed image and then focus again to view the natural view. This will also prevent the safety issues incumbent in a system that leaves critical environmental cues out of focus while viewing displayed images.

It is also an object of the current invention to provide a display in one embodiment whose image can only be seen from one point in space, being un-interceptable prior or post observation.

It is also an object of the current invention to provide a worn display medium that accommodates less than perfect eyes by providing the accommodation correction of the scene image needed responsive to less than emmetropic vision while simultaneously protecting the projected image (rather than distorting it with eyeglass lenses whose prescription is inappropriate for the current virtual distance of a displayed virtual image).

It is also an object of the current invention to provide a display medium with a consistent mediation of diffraction issues, including at a pixel level, even for less than emmetropic eyes. (For example, an astigmatism requires a graduated focus that must also be taken into account with any present focused diffraction correction.)

It is also an object of the current invention to provide 3-D worn imaging that, rather than providing the brain with conflicting distance and spatial relationship cues, provides accurate and spatially consistent cues for natural perception without nausea or disorientation.

It is also an object of the current invention to provide a new screen display mechanism that enables superior resolution, brightness, and power efficiency with a minimum of the physical overhead or space requirements that make current displays too bulky or large for many application.

It is also an object of the current invention to provide, for data communicated through light transmission, an improved and attenuated selective data switching mechanism and method.

BRIEF DESCRIPTION OF THE DRAWINGS

FIGS. 7A-F illustrate more complex examples with each showing different wirings for selectively creating a gradient of charge across and electro-optic element e.g., 703 and 704 in all of A-E which can be photonic crystals or other EO RI-shift-enhancing layers inserted in the path of a beam-splitter(s).

DETAILED DESCRIPTION OF THE INVENTION

Figure 1A:
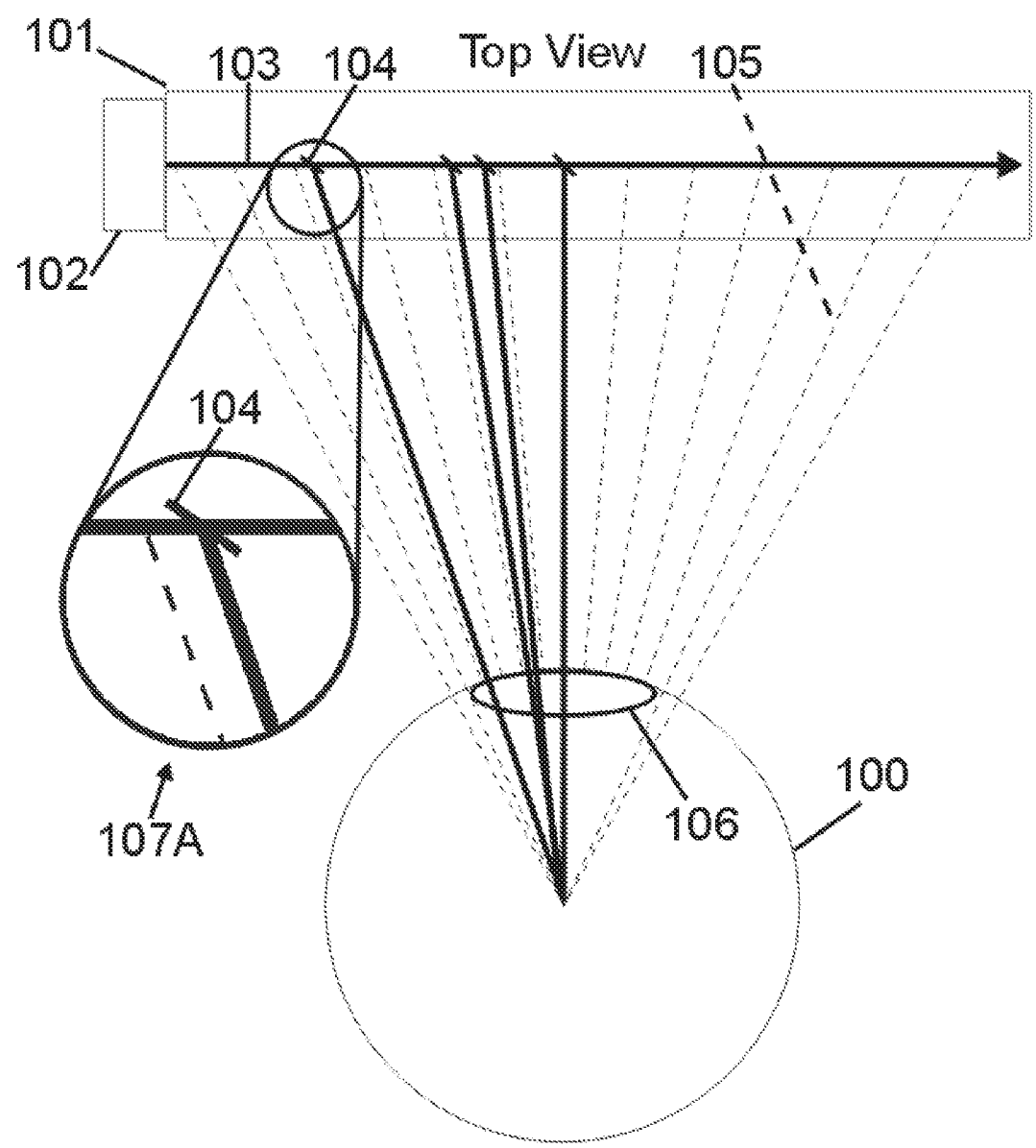
FIG. 1A is a drawing of a single transparent plate directing light from a laser light source to a single eye.

The current invention, which relates to both still image and video embodiments, is not limited to creating images made up of a raster-like compendium of rows of displayed image data. It is, in fact, applicably conducive to numerous useful departures from that theme. However, at times herein it is simpler to explain the concepts of the current invention in that simplest embodiment without thus limiting the scope of the current invention. Also, it is not the intent of this disclosure to distract from the description of the unique components of the current invention with discourses on devices and techniques already well known to those skilled in the art of display imaging. Thus, for example, the process of capturing an image with a camera in digital or analog, processing that image, delivering that image to a display at a geographic location and even calculating the characteristics of that still or transient image into a series of desired pixel locations with brightness, contrast, color and, optionally, spatial depth is not considered in any detail herein. Also, both the well-established and the emerging concepts for directing the activation of an area of a display (e.g., applying a charge to a display element location via a matrix or combination of electrical leads or applying forces or energy related to an area for the purpose of changing the RI or conductive characteristics of an area) are, except for the degree of detail required by one skilled in the art, left to the rich set of all such process that are understood to deliver such data and energies to key components of the current invention.

Refraction Controlling Components:

The current invention relates to an image display process that makes frequent use in multiple embodiments of a class of devices and materials that are defined herein as light-directing elements (LDE's). These defined elements, through representative of a variety of methods and materials, allow the controlled modification of effective refraction and/or diffraction (in some cases, e.g. some holographic applications, only diffraction is required while in some others diffraction is used along with refraction to control the nature of the light). Some nomenclatures for some LDE's emphasize their phase shifting or light slowing attributes but those skilled in the art understand that, properly configured, these can both attenuate and accrete a current RI. Embodiments of the current invention can employ any form of LDE's capable of directing light as described herein and as is apparent according to the current invention's stated approach. A number of appropriate activating stimuli include electrical charges, heat (often effected through an electrical charge), light, pressure or any effective means for such LDE modulation.

Some well-known applicable LDE components include methods for modifying the RI and having the capacity to change conditions very rapidly. One subset of applicable LDE components are EO's. For example, lithium Niobate ($LiNbO_3$) has become one of the more common EO materials used for amplitude modulating fiber optic communications systems operating at data rates exceeding 10 gigabits per second.

Some LDE examples: Spatial Light Modulators (SLM's) use a plurality of LDE's. Many use EO components from liquid crystal (including ferromagnetic liquid crystals), to many solid transparent crystals rated by their range of potential attenuation and accretion such as GaAs, $KH_2PO_4$, $NH_4H_2PO_4$, CdTe, $LiNbO_3$, $LiTaO_3$, and $BaTiO_3$. Lithium Niobate ($LiNbO_3$) has become one of the more common EO materials used for amplitude modulating fiber optic communications systems operating at data rates exceeding 10 gigabits per second. Its speed of attenuation/accretion (adjustment rate) and the comparatively broad range of refraction indices that it can be directed to achieve make it a strong candidate for display applications. Indeed, the SLM is, in itself, both an assembly of LDE's and, as a unit, a LDE—i.e. an entity that, upon command, can modify the RI for a specific region or a group of regions. Also, chalcogenides, liquid crystals, photopolymers, etc. can be part of the current invention as LDE's. Though some of these LDE's, if used to replace a more common LDE such as an EO element in the drawings, require modified wiring paths or even light activation, these will be obvious adjustments within the current invention understood by those skilled in the art.

In the preferred embodiment, the logic circuits controlling these actions are made up of controllers (or more extensive computer assemblies) that direct the LDE's with transparent electrical circuits such as indium tin oxide (ITO). Power for these assemblies may be provided by onboard batteries, other stored energy devices such as capacitors, direct connection with power from local utilities, or even the more recent transmitted energy devices for wirelessly passing energy to devices over short distances (sometimes used currently to power or recharge devices surgically implanted into humans).

A Basic Embodiment

FIG. 1A is one very simple embodiment of the current invention viewed from above. While other embodiments vary greatly in size, shape and viewing distance, this embodiment illustrates one side of a worn display that looks much like a pair of worn eyeglasses. Here an eye, 100, is looking through one of the "panes", 101, of the "glasses" (only one pane of which is shown here). The perspective of FIG. 1's view is from above that viewer whose pupil is labeled 106. The "viewer" is herein defined to be the person using the current invention and here we are looking down on one eye area of a viewer wearing a display in a form resembling worn eyeglasses.

Beamsplitter Example:

In the particular embodiment of FIG. 1 essentially collimated light from a light source, 102, proceeds along the path identified by the line 103 through LDE optical elements, e.g., 104, which are, in the instantly described embodiment, EO beam-splitters (BS's) in one or more of a variety of shapes and being activated in the preferred embodiment by transparent leads. In the arena of man-made light there is no such thing as perfectly collimated light. Thus, when we refer to "essentially collimated light" or even to "collimated light" it is intended to mean that the divergence or convergence of the light is reasonably small where reasonably small is defined by the task. Here, the task is to minimize light noise from internal reflection and maximize the energy transmission efficiency of the light through the plate. Thus, here, essentially collimated light is sufficiently collimated to keep noise and signal at acceptable levels. Essentially collimated light may be provided, of course, by lasers but it may also be provided by any light source that is appropriately conditioned. That conditioning, depending on the light source, may include optical collimation/decollimation with lenses to better collimate a beam, spatial (e.g. pinhole) filtering, polarization control/filtering, and bandpass or other frequency filtering. Some light sources are already conditioned by the nature of their manufacture. For example, the refractive nature of the shape of some LED bodies has a collimating effect and, thus, the LED by itself could be called a "conditioned LED source". Light that is either inherently collimated (like laser light) or that has been conditioned to be essentially collimated or that is by its nature adequately organized in its dispersion of light to illuminate without creating excessive noise in the system will be called herein "collimation controlled" light, "essentially collimated" light, "approximately collimated" light, "light having a limited divergence" or, for convenience herein, simply "collimated" light. For economy of space, leads are not drawn. However, as is normal in the industry, leads (e.g., transparent leads of indium tin oxide) can be effectively placed at the ends or from the top to bottom or in any pattern that produces the potential across the LDE and LDE's may be individually wired or wired in matrix arrays as is more common in imaging applications. Also, for economy of space, only a few example BSs are illustrated of the potentially dense and even multi-layered array in this pane. Thus, at any point in time there may also be many un-activated and, thus "invisible" BSs in each row prepared to send light to the eye (when activated) along available paths like 105 (here 105 is a dotted line and the BS not shown because it is illustrative of an LDE that is not currently activated while the solid lines towards the eye (e.g., from the BS 104) represent selective pixels of light directed to the eye from activated LDE's. In a preferred embodiment, such rows are arrayed on a plane normal to the paper in FIG. 1 and, thus, inside the plate. Thus, from the subject's point of view, there may be, for enhanced resolution and brightness, multiple layers of BSs in the plate (not drawn) visible, when activated, as raster-like rows and columns of BSs arrayed to reflect pixels of light associated with a display. The row and column arrays of different planes do not have to be aligned with each other. In fact, higher resolutions are possible where they are not since one layer's BSs (which may be seen as a layer of BS's in a plane parallel to the surface of the plate) may be placed between those of the others from the subject's viewing perspective.

FIG. 1 can be viewed as having the light, after reflecting off of a flat BS (like those in FIG. 1A), still essentially collimated and this is essentially the case particularly for larger pixel embodiments (lower resolution requirements/larger BSs) or where short wavelength light is used, or both. However, for embodiments with very high resolution requirements and long wavelengths, diffraction increases and implementers will then select from a number of both diffraction control and diffraction-exploiting components described herein to both accommodate and use diffraction for better imaging. Arrow 107A points to an enlargement of the indicated area in FIG. 1A illustrating a reflected path.

Figure 1B:
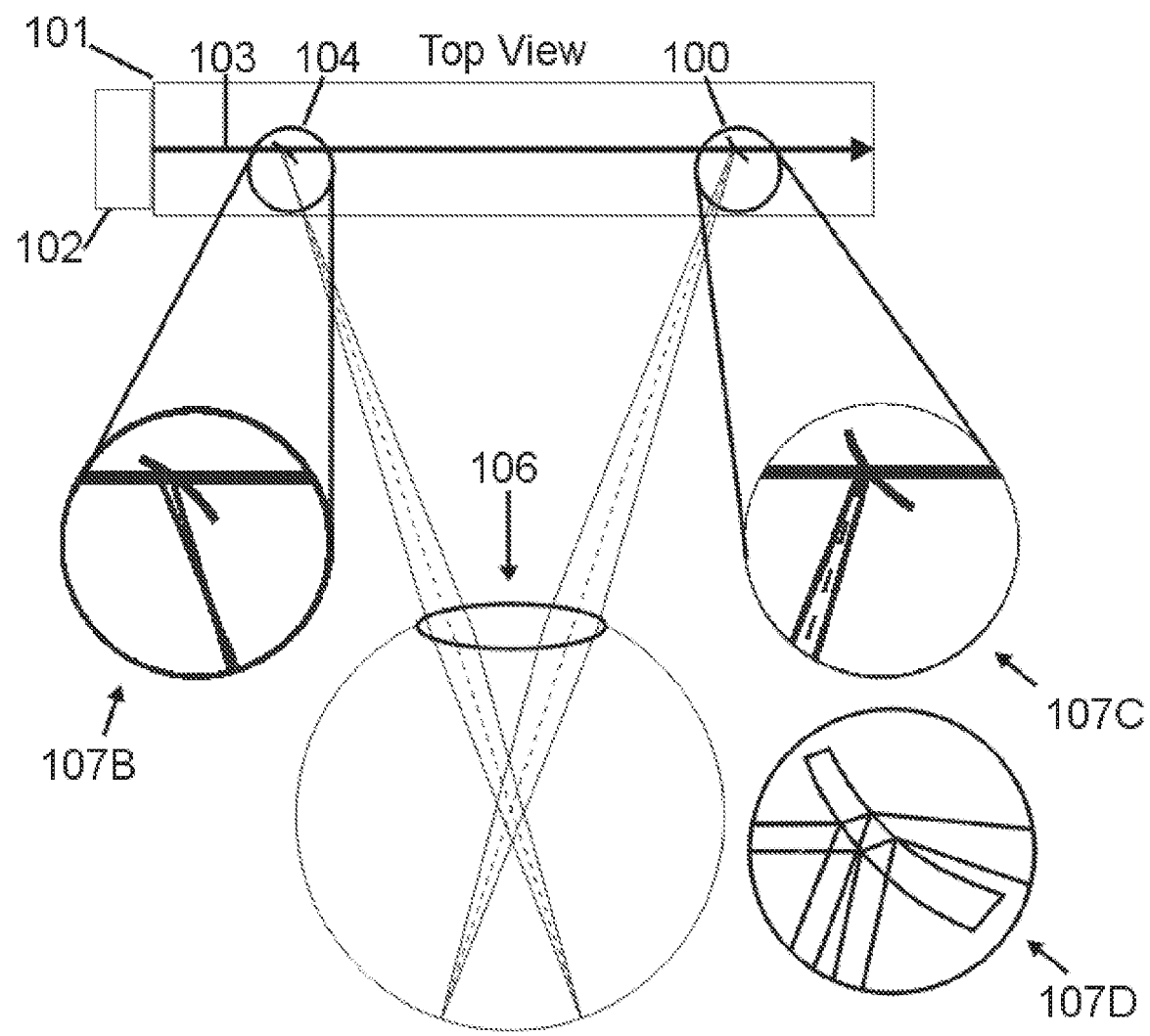
FIG. 1B additionally illustrates additional reflected divergence patterns.

The embodiment reflected in FIG. 1B illustrates the use of non-planar beam splitters any number of which are applicable embodiments of the current invention. For example, FIG. 1B illustrates a curved beamsplitter shown enlarged in the 107B inset. Arrow 107C points to an enlargement of another indicated area having an LDE with a different curve shape. Arrow 107D points to enlargement of that LDE in the enlargement indicated by arrow 107C. This further enlargement, 107D, is intended to better describe, and generally exaggerate for ease of viewing, the refraction of light passing through a curved BS having a slightly different RI than the surrounding transparent media. These also illustrate that various beamsplitters and different shapes thereof can be used in the same assembly.

Figure 1C:
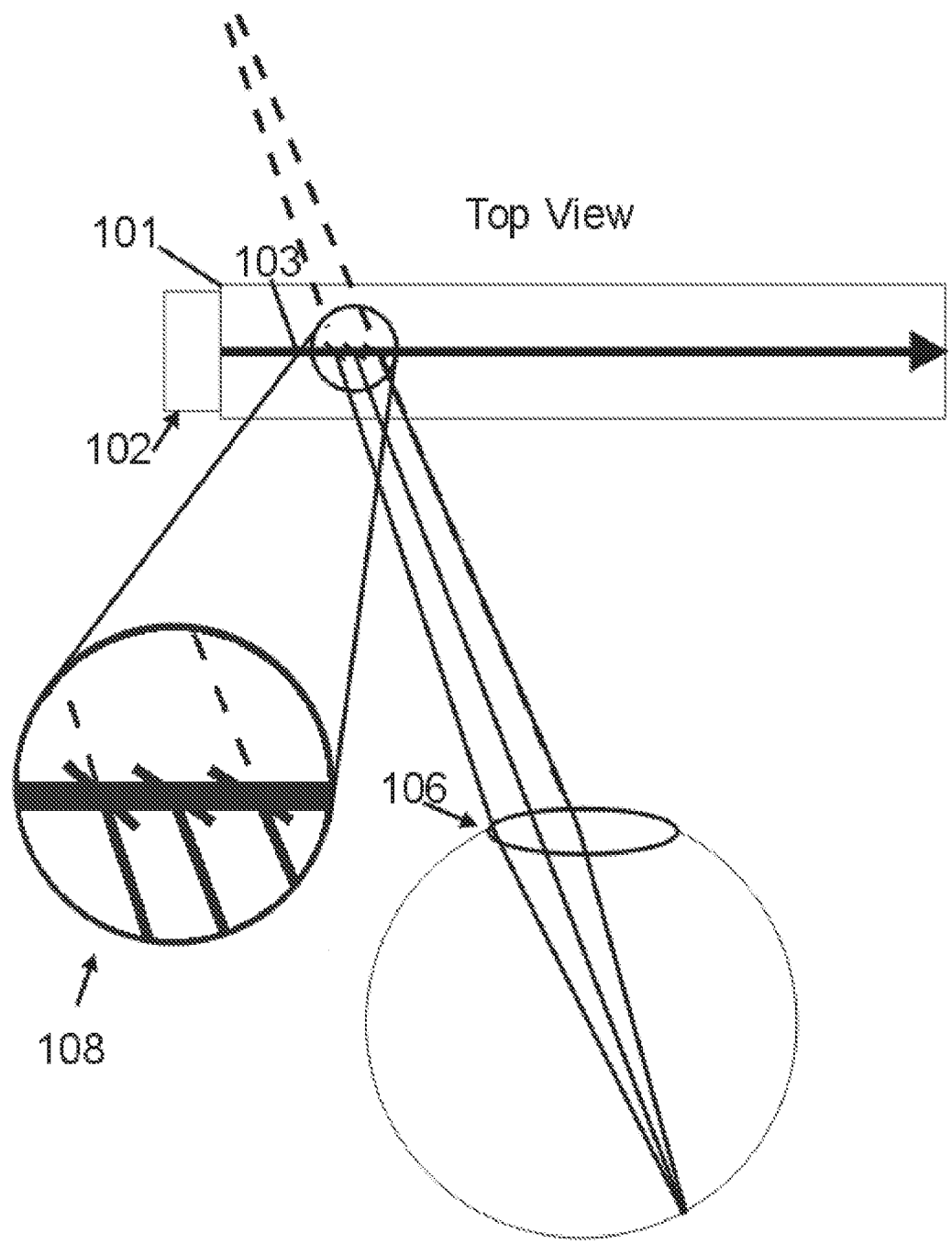
FIG. 1C illustrates how the eye might perceive this as a distant object.

This also illustrates (and FIG. 1D further illustrates) that any number of beamsplitters of different shapes and attitudes may coexist without excessively affecting each other as long as, for a given ray, there is not excessive refraction caused by too many activated beamsplitters sharing one ray at one instant. FIG. 1C illustrates how the activated reflections of the light, 103, from multiple BS's (shown better in the enlargement indicated by arrow 108) can be perceived as coming from a single distant point (indicated by the intersection, not shown, of the extended dotted lines extending up and to the left) when the eye focuses this essentially diverging band of light that enters the pupil, 106, to essentially a single point on the retina. This provides a superior sense of depth perception (even when binocular-overlap-based 3-D, as described herein, is already provided) because the accommodation of the lens of the eye required to bring it to proper focus is the accommodation perceived by the brain associated with the distance to the point where the dotted lines (leading to a perceived point in the distance) would intersect. Thus, when light enters the pupil with a degree of divergence equivalent to the degree of divergence of light from a point at a given distance, the brain's 3-D perceptions, based on the lens accommodation required to bring a viewed target into focus, perceives that the light is coming from a point at that distance.

Figure 1D:
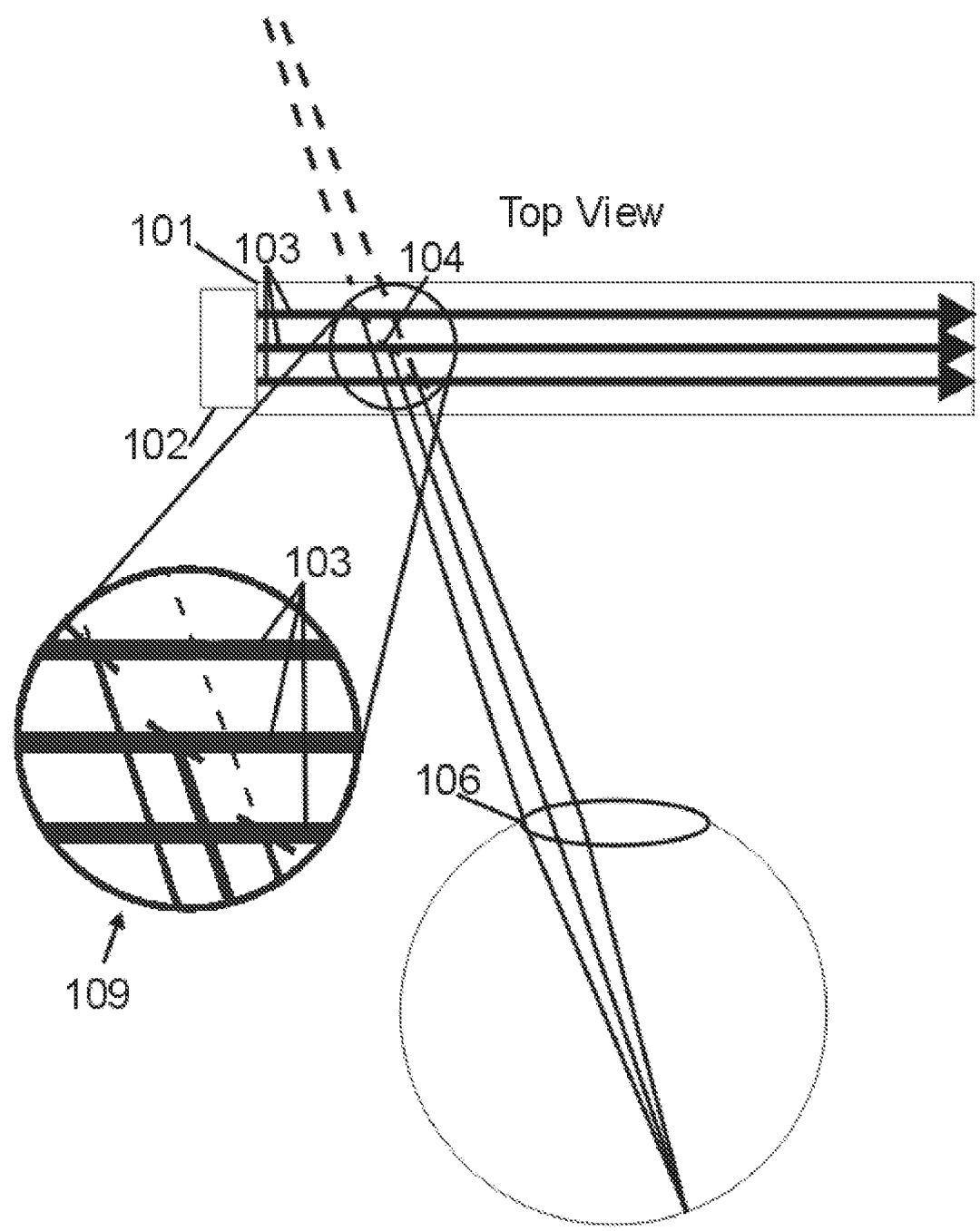
FIG. 1D further illustrates the perception of an image distal to the viewing plate.

FIG. 1D further illustrates this process and is different from FIG. 1C only in that, in this illustration, the BS's activated to create the light to be perceived as coming from a distant point are arrayed in different cyclopic planes (used herein to describe planes normal to the viewer's cyclopic optical axis) rather than laterally (e.g., potentially sharing the same photon in the path of the light, 103). Arrow 109 points to an enlargement of the circle-indicated area traversed by the light, 103 (shown here as three conceptual rays for illustration). The dotted line can also be seen in this enlargement. Of course, there can be any number of LDE's (BS's and other LDE's described herein) combining and participating to create light that appears to the viewer to be coming from any single point despite the fact that those LDE's can be placed at a variety of distances from the viewer in different locations within the plate (alternatively referred to as pane herein), 101. This capacity to create light in multiple chosen directions that appears to emanate from each point in a viewer's view effectively provides complex wavefront reconstruction directly analogous to that of a hologram. (A hologram creates a complex wavefront reconstruction with large numbers of overlapping effective gratings through diffractive redirection of light.)

Light Source Embodiments:

While a hologram requires light that is both collimated and in phase for the diffractive redirection of light to effect the desired wavefront reconstruction, neither is a requirement here. For example, in the four examples of FIGS. 1A-C, the single narrow shaft of light, 103 could be a particular beam from an essentially point sourced isotropic emitter (centered in the light source 102 preferably with appropriate optics and filtering) whose path encountered the BS's shown. Obviously, other rays like 103 from the same point sourced isotropic emitter but leaving the emitter at different angles, could encounter different LDE's in the plate at angles specifically chosen to direct this differently angled light. However, essentially collimated light can reduce internal reflected noise and increase lighting efficiency. Also, lasers are relatively inexpensive and place a very high percentage of their energy at a single chosen wavelength (have a narrow full width half maximum, FWHM) which enables better diffraction management and reflectivity control. Thus, in the particular embodiment of FIG. 1A, we can also see the light source, 102, as a source of essentially collimated light, 103, passing through the plate, 101, to encounter at least some BSs, like 104. Of course, not drawn are any number of additional BS's whose instant RI is the same as that of the plate and are thus invisible (i.e., not having a boundary condition and thus not redirecting the light). The light emitted may be somewhat convergent or divergent but, in the preferred embodiment, it is essentially collimated. One excellent such light source, as discussed herein, is the laser. The terms "collimated", near-collimated, effectively collimated, and largely collimated all reflect herein some of the variations in different applicable embodiments of the current invention related to light that is not necessarily parallel but whose degree of collimation is potentially controllable for better imaging.

The light may be expanded and recollimated to service a larger area, where desired, by any optical means e.g., lenses to cover a broader area. Thus, the collimated beam may be narrow or broad and thus may encounter one or more rows of EO components simultaneously (only one row is shown here, and only a thin representation of them, to allow space for details). The light travels its route inside (typically between the layers of) the plate. Much of the stray light from the light source that might pass through the surface of the plate is partially confined by total internal reflection (TIR) due to the angle of approach. However, the preferred embodiment is not dependent upon TIR. Other rows of EO components are, of course, normally understood to be above and below the plane of the paper in FIG. 1A as well as in additional planes both more proximal and more distal to the eye, 100, than the singular path, 100, that is illustrated. There are numerous examples of collimated light sources applicable to the current invention including but not limited to laser diodes and a variety of uncollimated light sources matched with collimation optics to achieve essential collimation or controlled divergence or convergence.

Light Paths:

The light may be expanded and recollimated to service a larger area, where desired, by any optical means e.g., lenses to cover a broader area. If the essentially collimated light strikes an activated BS like 104 in FIG. 1A (which is enlarged in 107A) a portion of the light, 103, will reflect through the pupil of an eye 106 based on the angular attitude of said BS.

Laser Diode Row Selection:

Some embodiments of the current invention employ a separate light source for each row of LDE's. One such embodiment has an array of laser diodes, like 102 vertically along the left edge (from the perspective of the eye) of the plate, 101 in FIG. 1A. By thus stacking the diodes vertically with emission to the right (analogous to raster rows), each beam would traverse a path along a row similar to the path shown for 103 except that they would be many of these mutually parallel beams in a plane normal to the paper. This is useful, for example, in embodiments where switching the light source on or off for a row is used to select a row in the plate for temporal activation of any selection of LDE's in that row.

This allows activation of a single electrode column (i.e. a vertically oriented electrode e.g., from an array of ITO columns in a plane parallel to the plane of the light rows thus creating, from the perspective of the eye, a matrix of horizontal ray rows and vertical electrode columns), to enable/activate a single pixel area (at the intersection of the activated beam and the activated electrode column). In one such embodiment, this results in the application by the activated electrode column of a charge to one side of the LDE with said charge flowing through the LDE to an uninterrupted sheet of electrode (e.g., ITO, on the other side) carrying the other charge or a ground. This optional embodiment can significantly reduce the number of conductor leads required.

Itinerant Laser Beams:

However, in a preferred embodiment, a single laser diode is useful in illuminating numerous rows by embarking upon an itinerant path. For example, in FIG. 3A the laser beam, 103, emitted by light source, 102, can be made itinerant with front-surface reflectors on both sides, like 302 in FIG. 3A, directing the beam to continue in rows (as shown here) or other arrangement to service a large number of LDE's with a single diode. Each itinerant path (two paths are shown here with two sets of lasers) may be ended with a trap, 303. The frame, 304, covers all but the viewable area inside the boundaries of the viewed area 305.

The beam can widen and acquire refracted noise after passing an activated BS. However, because the activation shift in RI is normally so small (normally inducing visible reflections due to the available light source brightness but leaving the continuing beam largely unaffected), in most implementations the same beam can simultaneously be reflected by multiple activated BSs before having the route terminated by a light trap, 303, before another route is begun.

Figure 3A:
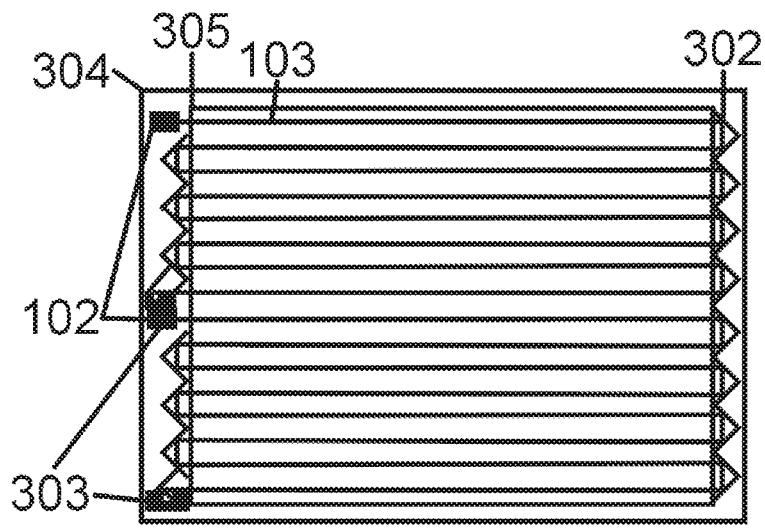
FIG. 3A illustrates, from the perspective view of a user's eye, and embodiment of a plate with a laser beam from a laser, 102, traversing the area of the plate in a raster-like path as it is reflected by mirrors like 302 along an itinerant route.

For a worn application, FIG. 3A can be understood to be seen from the perspective of one eye looking through the plate (i.e. the vision axis is normal to the plane of the paper) as in FIG. 1A. For a standing display, such as a large screen monitor or highway billboard, the cyclopic vision axis is essentially normal to the paper as both eyes view the display. Thus, it is possible to view FIG. 3A as the eye's view in FIG. 1A since the paths of FIG. 3A pass through numerous rows like the one traversed by 103 in FIG. 1A.

The essentially collimated beam can, of course, be routed by a number of applicable means to achieve the same goals including sharing a laser beam by passing through a sequence of BS's with a graduated degree of reflective coating on the left reflecting to the right. These can be ordinary, non-EO, BS's with graduated, e.g., by degrees of vapor coated aluminum, reflectance for beam balancing. The light can either be trapped on the right or routed with reflectors on the right to be used for other purposes including serving as the reference beam for a Holographic Optical Element (HOE) or other holographic element later in the process.

Figure 3B:
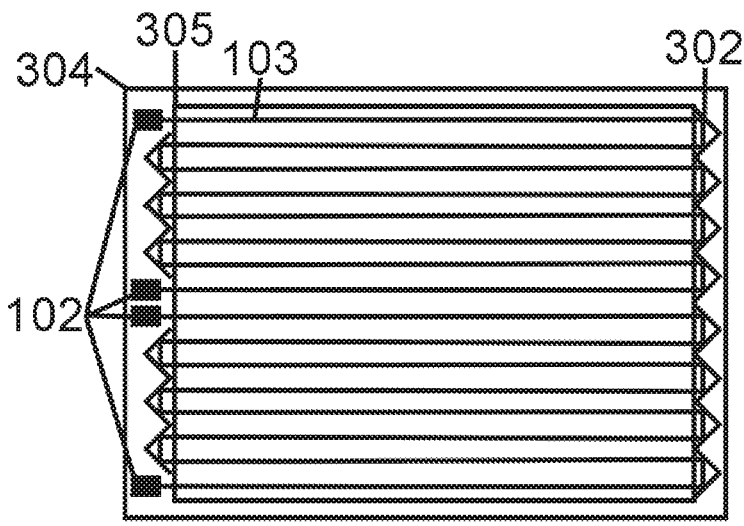
FIG. 3B. Provides additional laser(s) which can provide light which travels the path backwards as compared to FIG. 3A.
Figure 3C:
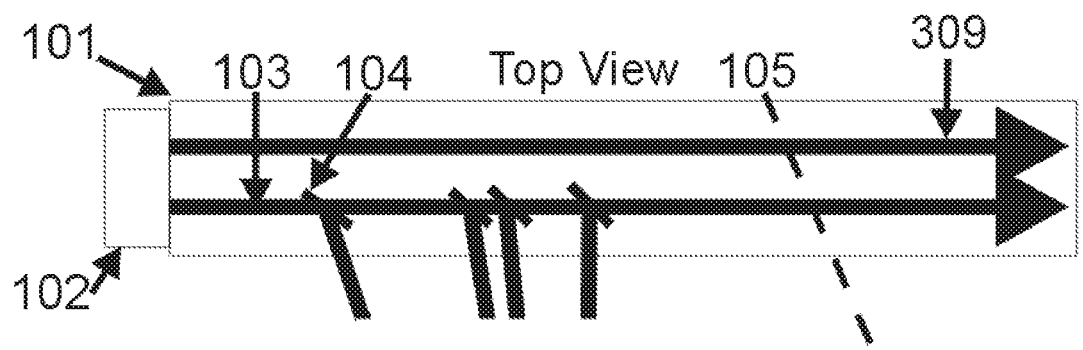
FIG. 3C illustrates light passing through the plate, 101, analogous to the plate of FIG. 3A showing light traversing in one direction from being selectively redirected towards the eye by the reflective subcomponents in the plate.
Figure 3D:
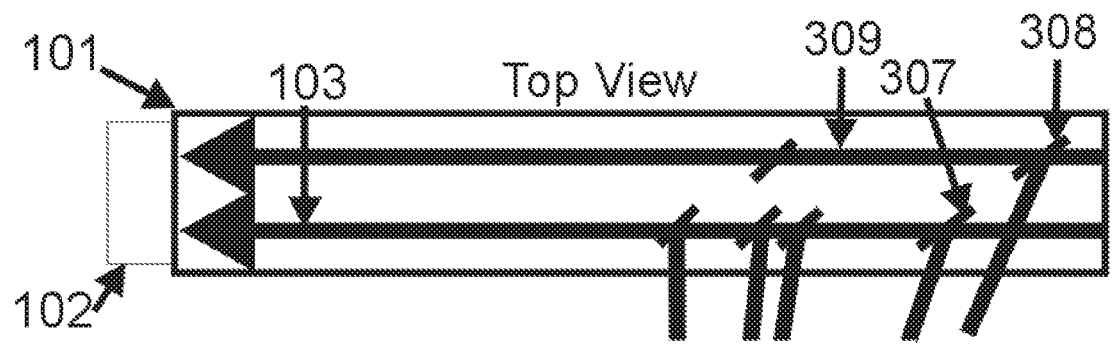
FIG. 3D illustrates light traveling in the opposite direction and the different effects that this can be used to accomplish as it encounters different reflective components from a different angle.

By optionally replacing the traps, 303 in FIG. 3A with another laser diode like 102 as illustrated in FIG. 3B and alternating the activations of these two directionally opposed lasers, a two-way light path sharing the same rows is made effective. The lower (the one we just changed from a trap, 303, to a diode) diode's light will trace back upstream the path of the upper diode optionally separated in time. This allows software selection of an LDE to occur during the cycle filled by the diode that provides the most favorable reflection characteristics. For example, as can be seen in FIG. 3C (which has a viewing perspective, like FIG. 1, from above the viewer whose vision axis is in the plane of the paper), the light is passing to the right which favors, in the preferred embodiment, the reflective angles of the LDE's on the left side (a few of which, like 104, are visible (as is the light they reflect downward on the page) because they were chosen to be activated during this side of the cycle). At the same time or alternately cycled, FIG. 3D shows the light is passing to the left and LDE's like 307 were selected for the desirability of the angle of incidence allowed by the leftward path of the light. Also note in FIGS. 3C and 3D that the laser beam 103, though shown here servicing only one narrow row of LDE's, can be alternatively considered here to be a single beam optionally broad enough to service a plurality of LDE's when they are chosen for activation.

The top view of FIG. 3 only shows two planes where LDE's are located (one for 103 and 1 for 309). However, there can be a number of planes (or other geometric shapes) containing and providing light to LDE's. This greatly increases the potential for providing a large number of LDE's to service a single perceived pixel of a viewer's view which is supportive of more complete wavefront reconstruction for 3-D, the potential for parallax-based depth perception in embodiments where the user's head can move without moving the plate (e.g. television and billboards), higher resolutions, and more complex colors (where multiple LDE's sending different colors appear to be coming from the same point in the user's perception thus combining the colors).

Of course, implementers of the current invention can certainly use simple, single, non-reversed, beams no more complex than FIG. 1A yet still itinerant via reflectors and use BSs in a row that are all tilted essentially towards the same quadrant. For example, the BSs in FIG. 3C have Cartesian angles in the plane of the paper (with respect to the x axis which is understood to be the beam, 103) of greater than $\pi/2$ (tilting towards the $2^{nd}$ quadrant) while the angle of the LDE's activated in FIG. 3D are less than $\pi/2$ tilting towards the $1^{st}$ quadrant. Though not necessary, this can be used to optimize reflectivity. For example, activating BSs on the far right side of FIG. 3C with BS's having angles that will divert light into the pupil (BSs tilted towards the $2^{nd}$ quadrant but having an angle of incidence so small that less reflection results) suggests an opportunity for implementer adjustments to accommodate the larger variations in amounts of reflection driven by angle of incidence based upon Snell's law. This lower reflection due to small angle of incidence can be also be alternatively (without being so selective in LDE placement) or additively accommodated with adjustments in duration of LDE activation, amount of charge used, polarization in embodiments where light polarization is rapidly adjusted, instant light source brightness and paired BSs, often in separate planes of BSs, contributing to the same pixel.

Finally, for each such pair of opposed lasers, one can be replaced with a front surface mirror normal to the rays of light from the other laser thus reducing assembly, power requirements and parts cost but maintaining a potentially continuous dual direction illumination of time-chosen BSs to be activated. For example, the two light sources, 102 in the left center of the screen in FIG. 3B can be replaced by front surface mirrors. The single laser for each route can also be left on continuously in embodiments where laser on/off switching is not being used to select a row (or column) as described herein. Depending on display size and level of activity, more or fewer itinerant routes than the 2 shown in FIG. 3B may be chosen by implementers.

Also note in the perspective of FIG. 3C, which illustrates a second path, 309, for a beam of light to travel through with this path being more distal to the eye than 103. FIG. 3D illustrates one embodiment where there are only two planes of itinerant beams with the most distal plane containing the path that contains LDE 308 (positioned in this example for a leftward beam in path 309) and the more proximal plane containing 307. Separation of light path can optionally be by choice of light-path plane (one tracing an itinerant route perhaps from bottom right to top left while the other plane has light on an itinerant route from top left to bottom right.

Preferred Embodiment of Itinerant Route

The preferred form of one of the simplest embodiments uses dual direction rays in a plurality of paths itinerantly traversing a plane with said rays originating from a laser and being mirror-reflected back. BSs are arrayed in the plate, 101, at angles so that they can be activated by software, effect a reflective surface from that charged activation and, thus, direct the light upon the chosen path to be viewed as an image component. This simplest embodiment can be configured to use the laser's timed activation as a part of the BS row or column selection process (as described herein), or, have all activation selection effected (without the need to flash a laser on and off) via charge carriers (like ITO).

Or, for applications where light escaping through the distal surface of the plate is not an issue, the laser for each route can be allowed to stay on continuously as needed and coming from both directions at the same time via reflection or lasers at both ends of the same path. Then, light from the "wrong" direction may strike an activated BS intended for reflecting another direction and thus reflect light harmlessly away from the viewer. Spinning mirrors, etc. as is common in display optics for time-based selection of light path can also be used to scan BSs as an alternative applicable embodiment. These can still operate in time-separated periods so that a BS is only activated when reflection is desired.

In a preferred embodiment, as shown in FIG. 1, the rays tend to enter essentially normal to the cornea (or close thereto) to minimize penciling/diffusion and reflective loss and represents, through an array of LDE's, an image for some or all of the FOV of the eye even as the eye moves and the pupil selects a different view of the incoming light. However a single-direction ray embodiment (e.g., parallel rays) and any other subsets wavefront patterns from LDE's are also fully functional embodiments of the current invention.

Figure 4A:
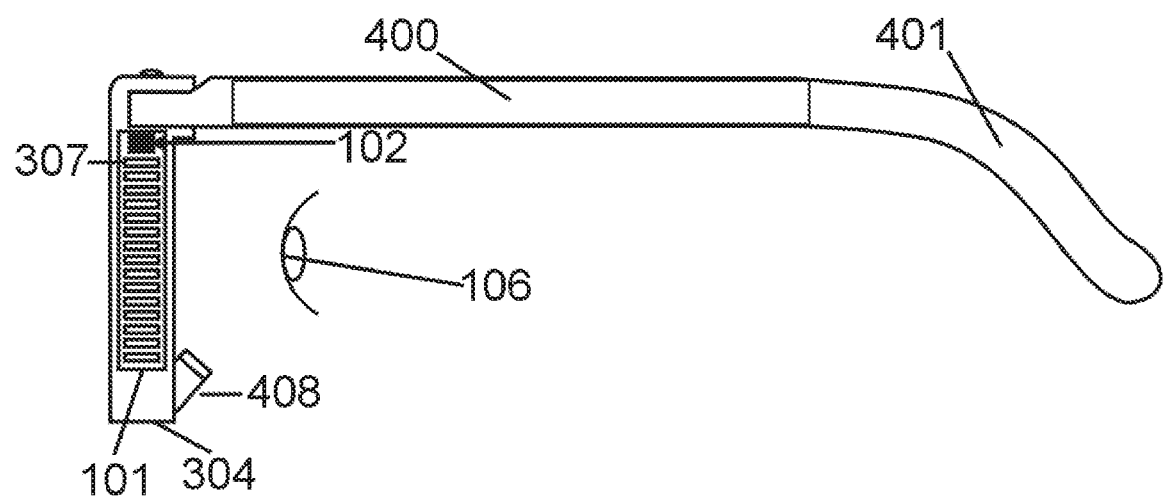
FIG. 4A provides a side view of a plate being mounted in the frames of ordinary glasses.
Figure 4B:
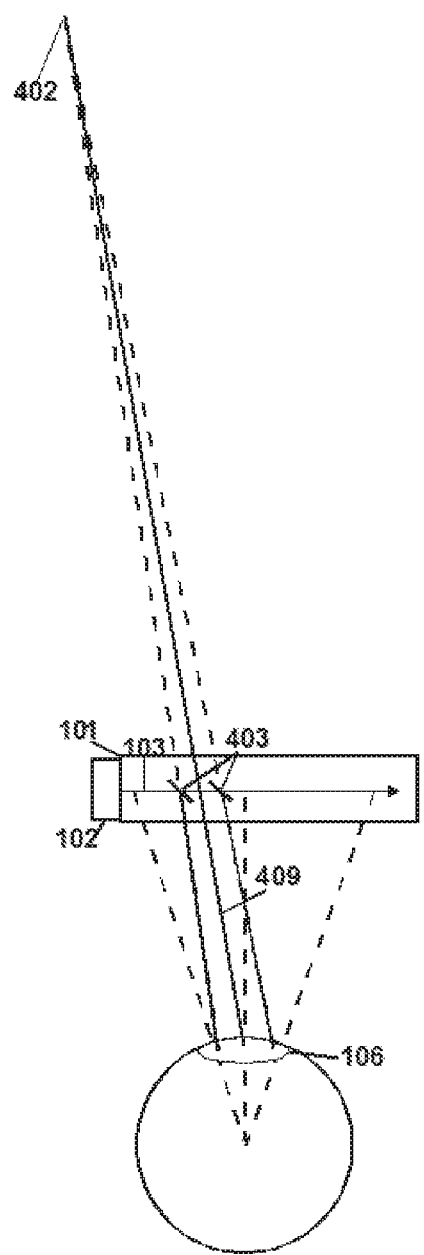
FIG. 4B includes an apparent displayed point in the distance (significantly distal to the eye and the plate) responsive to redirecting elements in the plate.
Figure 4C:
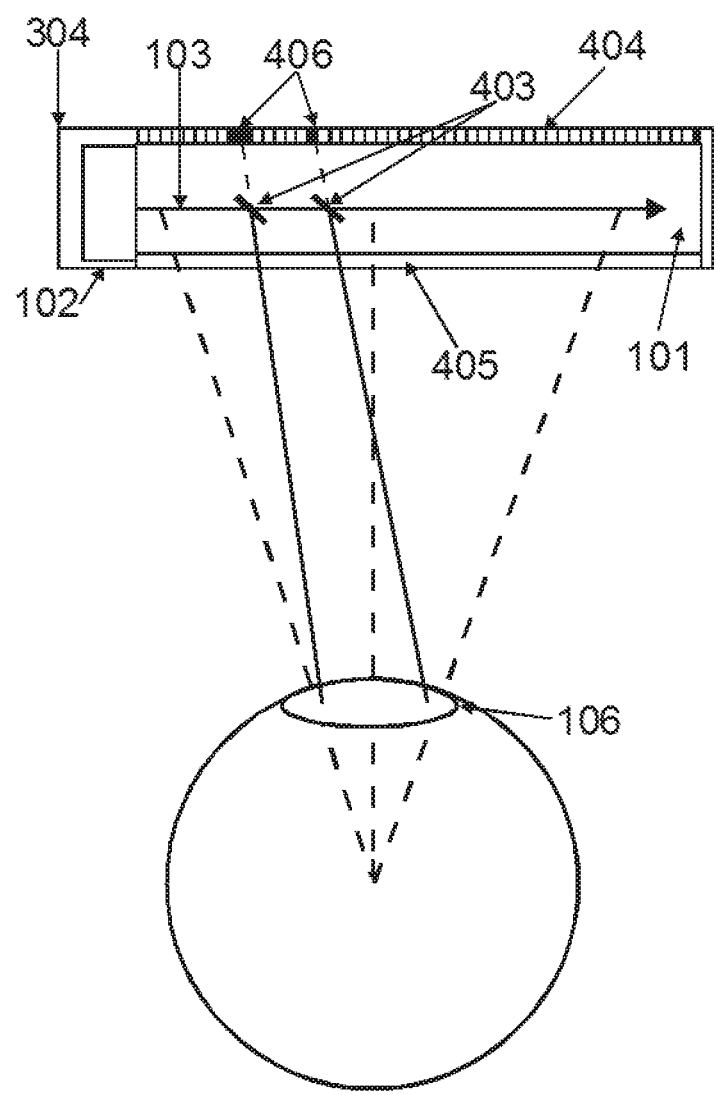
FIG. 4C further illustrates the means for acquiring a bright image in the assembly of FIG. 4B.

As can be seen in FIG. 4, there are more complex optional combinations of LDE's e.g., BS' optionally available for creating a full display image than the simple "one LDE per each radiating 'pixel'" approach. For example, FIG. 4B illustrates a virtual POI (a point of interest in space), 402, to be displayed by activating two or more (two shown here) LDE's, 403, in the path to that POI from the eye. In FIG. 4C the imaginary lines to 402 are removed but the subject "sees" 402 as the proper eye accommodation for the distance to 402 brings the brightest central part of rays reflected from the two BS's, 403, together. Of course, the different images arriving upon the other eye can, and typically will, include the proper binocular overlap to eliminate the disconnect often associated with 3-D displays (between a clashing lens accommodation and binocular overlap in the brain causing headaches and disorientation). This and further 3-D options are described herein. This multiple LDE/"pixel" reproduced approach can also be effective when only a subset of the image (even 2 rays) is thus produced since even that subset will blur (hit at substantially disparate points on the retina) in the eye's perception unless the proper eye focus (and thus sense of depth) is accomplished.

The eye pans and tilts around viewing this array viewing simultaneously the scene view and the related display view together. Each of these narrow shafts of reflected light is analogous to the at least the central cone of beams from a physical isotropic emitter that reaches the round pupil (the base of the cone). Thus, the LDE array creates an image on the retina for those areas whose associated BSs are "activated".

Figure 5A:
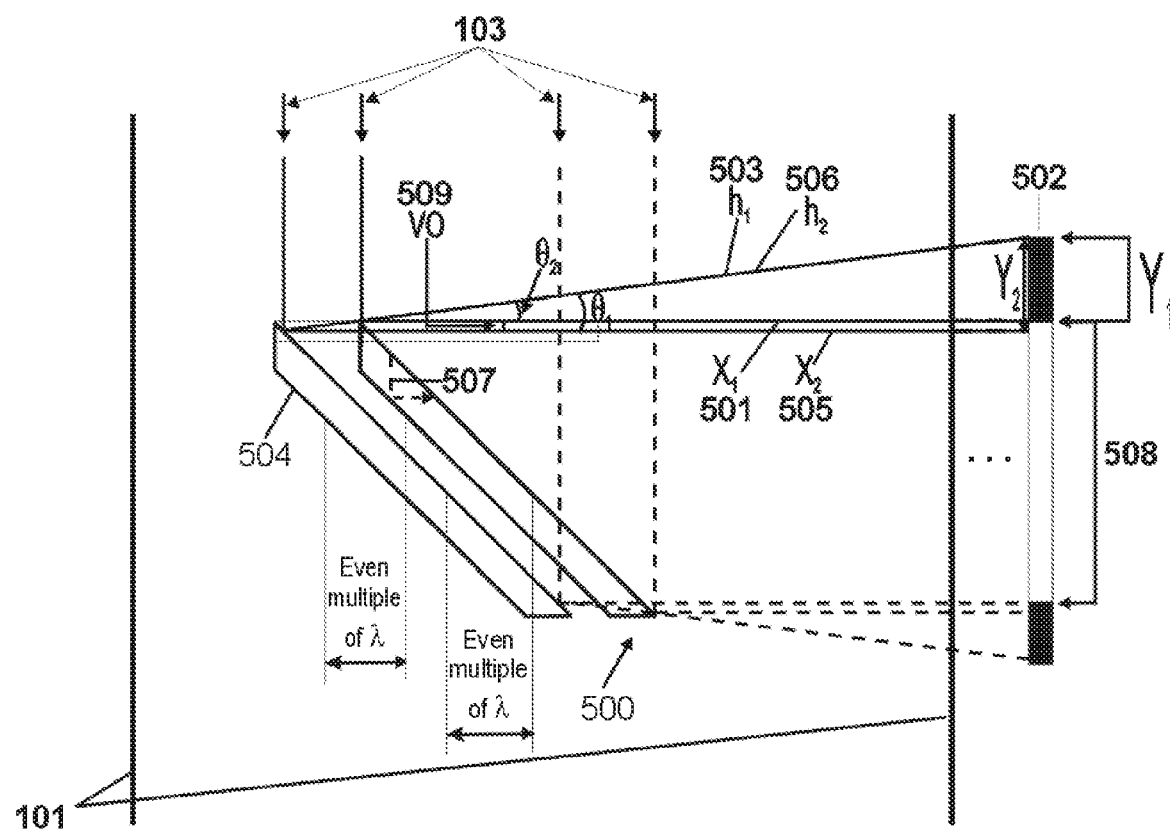
FIG. 5A illustrates an assembly configured to minimize constructive interference.
Figure 13:
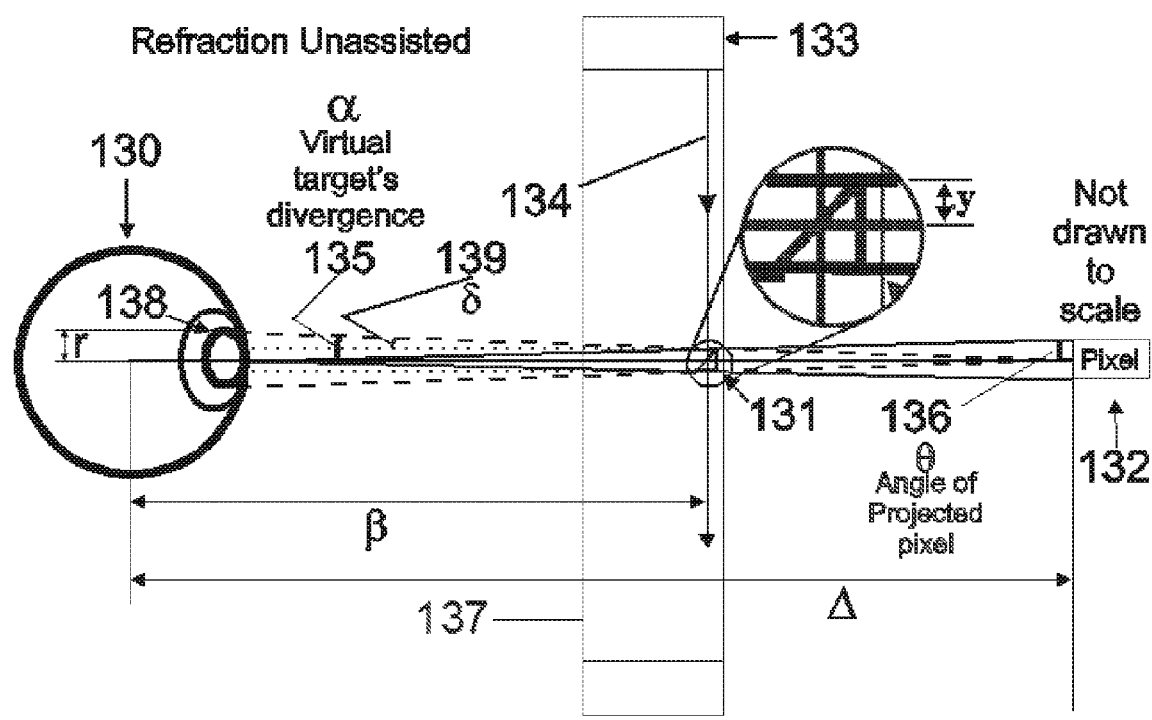
FIG. 13 illustrates some the geometry associated with light-directing elements.

Although the BSs are drawn with single lines in FIG. 4, the "dual image" (reflectance off of both sides of the BS) may be eliminated where desirable by other shapes such as the triangular-solid BS' shown in 131 in FIG. 13) so that any reflection from subsequent surfaces encountered retrace the source beam or exit rather than being directed to the eye. However, in several embodiments, the thickness of the BS is used to both control and exploit constructive and destructive interference (effectively elements of brightness) and diffraction as described herein. Its thickness can be controlled using known deposition and other formation processes to be very thin or be very thick. In one embodiment configured to minimize constructive interference in the two layers, the path of the light reflecting inside the BS (between the surfaces), e.g., 507 in FIG. 5A, is an even multiple of the predominant wavelength of the light so that light reflecting off of the back is in phase with the light reflecting off of the front. Where angle of incidence and angle to target result in back reflected rays having a different phase, the implementer can choose a thickness that, for the path determined by those angles, the difference to the target from back and front-reflected light is essentially in phase (a disparity that is an even multiple of λ).

The light reflected geometrically from the surfaces of the two BS' is constructively in phase resulting in a central bright spot surrounding the central geometrical area of reflection. This is good. Also, because diffracted light from 504 will, where coincident with light diffracted from 507, be out of phase having traveled a greater distance. This creates a darker fringe around that central bright area e.g., the dark area of the cross sectional illustration of 502. This is also beneficial (maximizing the contrast around the area of the geometrical reflection). This is discussed in more detail below.

Plate Invisibility

The transparent plate (drawn in rectangular form here so as to simplify this particular example to the non-corrective lens shape), 101 in FIG. 1, is preferably located to have its surface essentially normal to the vision axis of an eye looking straight ahead whose iris, 106, receives the scene view (rays from the scene view are not drawn) that has traveled through the transparent plate from the world in front of the viewer. Although some embodiments will not include this scene view, it is usually described herein as included for simplicity.

The plate, 101, in this example may be a solid with the appearance of a plate of glass or a combination of a solid shell with a filler such as a liquid, optical cement or gel, etc., contained inside, normally with these elements having essentially the same RI when no image is being projected. The term "medium" herein with regard to the plate or its filler will refer to the contents of the plate whether that content is simply the plate itself (a solid) or any material inside a shell.

Thus, at the default RI (where no image is being displayed), the optical elements, having the same RI as the surrounding media and components, do not create boundary conditions, reflection, diffraction or refraction. There are also potentially large numbers of additional other planes normal to the paper and parallel to the plate surface being populated by rows or patterns of LDE components inside the plate. These additional layers of BS' are not drawn here for simplicity and because, when they are not activated they do not refract or reflect light (and are, thus, invisible). However, when an area in the plate analogous to a pixel (i.e. emulating the effects of a positioned light source coming from a position perceivable as a pixel in a display) is activated, it exhibits a shifted RI resulting in controlled redirection and optional processing of the light passing through it. These paths of redirected light reach the eye of the user and are perceived as an image. Due to the potential for wavefront reconstruction, the image so viewed can be 3-D.

Exceptions to RI uniformity at default values: The outer surfaces of what is called, herein, "the plate", 101 in FIG. 1, do not have to have the same index of refraction as the RI-matched "contents" between the outer surfaces. In fact, other planes of transparent element parallel to the front of the plate can also have a different RI without destroying the effect. Though it is advantageous for the RI of all elements in the plate to be the same, the refractive shift will, with many contents/shell mismatches, be about that of ordinary eyeglasses. Also, at least one side of every conductor pair may, in certain unique embodiments (such as those where light diode switching contributes to row or column activation area selection), be a single uninterrupted layer of conductor rather than a conductor trace linking a row (or column) of EO components. Thus, a general exception to the homogenous RI rule exists for an uninterrupted layer, e.g., a ground layer, which is essentially flat or uniformly curved (e.g., being matched to a number of uniquely charged or uncharged leads on the opposite side of an array of EO areas or components to effect an array of EO light modulators perceivable as pixels), the RI of this uninterrupted surface does not necessarily have to match other components at default. This is analogous to putting a flat plate of glass in front of a pair of glasses. It may have a different RI but the image, while not as pure as without the plate, is not destroyed.

Activation e.g. from Table Via Conductors

The activation of LDE optical elements are effected in this example embodiment by a charge on opposing sides, ends or edges of the EO component as chosen by the implementer. In general, the ideal path through the LDE is the shortest if you want to maximize RI shift and thus pixel brightness (which isn't always the goal). Indium Tin Oxide and other transparent conductors are routinely used to route and apply electrical charges in such applications to LDE components.

The processes of converting a still or video image into a set of pixel intensities and routing a charge relative to each of those pixel intensities to arrayed locations via conductive leads, matrices and hybrids is not extensively detailed here as it is well known by those skilled in the art. The ideal amount of charge required for a particular pixel intensity will vary by EO material, angle of incidence, chosen light polarization characteristics, period of activation, intensity of the light source and diffraction (determined by BS shape, size and the effects of combined BS cooperation in the same light vector). Thus, as described further below, it will be normative for different pixels in different locations desiring to produce the exact same intensity (e.g., in flat-fielding calibration) to receive either different (both calculated and experientially attained) charge amplitude values, different charge durations, different light intensities, even varying polarizations, different combinations of pixel partners (where two of more EO components cooperate to paint a single pixel), or combinations thereof. Thus, the designer of a system will typically calculate or model, using the known characteristics for the components used, a most-ideal set of component characteristics for different component areas. For example, in a preferred BS environment, the angular attitudes of the BSs are all geometrically calculated to reflect their beam towards some common point in space that could intersect with the vision axis of an eye. That is, each of the BSs arrayed at different azimuths, elevations and, optionally, depths around the eye, can all be assigned attitudes (for proper angle of incidence) such that all of the beams would, if the eye or eye-simulating sensor were not in the way, cross essentially at a single point thus effecting a convergent image of the arrayed LDE's.

Calibration

However, although these calculations are easily made, tolerances and errors in manufacture make calibration necessary. While the well known art of calibration is not novel to or tediously taught by the current invention, at least one calibration process makes this a welcome task by enabling a uniquely accurate embodiment that is forgiving of errors in design and manufacture as well as deformations and misadjustments from later use/misuse. Once the arrayed LDE positions have been calculated and fabricated, the assembly can be calibrated by a net receptor (virtual eye sensor in testbed) at varying light-source intensities, durations, charges, combinations of LDE's, etc. such that the calibration curve(s) can be used directly by controller software to select values for brightness-controlling elements, etc. for each effective display pixel to be activated (a process well-known to those in the image processing field). While use of calibration curves and their application to calculating appropriate light attenuation or accretion required to get a desired output from an actual system is well known, it is particularly useful to, as part of the calibration process, to also test essentially all logical combinations of activations and simply capture the light characteristics and apparent pixel locations that result in the virtual eye (e.g., charge coupled device (CCD)) based on position, divergence (here related to the size of the stimulation area upon CCD nodes analogous to a circle of confusion for a single pixel), and intensity. For example, a calibration assembly may comprise a plate like 101 in FIG. 1, whose proximal face is normal to and centered upon the vision axis of a lens and sensor (e.g., a camera in place of an eye). These calibration data can be converted into algorithm(s) or other logic responsive to the calibration. Thus, the net calibration can incorporate and subsequently at least partially correct for all sources of error since all sources of errors contribute to the net final actual arrival points of light. This relationship between sensor-received light and the LDE activations that resulted in them provides a path from desired results to the activations that effect them.

Or, in the preferred embodiment, these calibration results are simply organized into a table. However, though the table example is a valuable means of simplifying principles of a complex operation with data normalization, faster response times can often be achieved with other well-known software methods that accomplish the same retrievals or calculations in any number of applicable ways. The table, in its most basic form, relates each LDE or team of elements related to the display of a "pixel" to actual performance in situ (here defined as in the natural position within a test environment appropriate to calibration for the worn environment). Thus the effects of direction, degree of divergence, brightness, apparent location (pixel location), etc. is, now, stored as actual rather than calculated/estimated with reflection angle errors. Such tables can be normalized and structured in any number of ways one of which is reflected in the following very simplified data structure:

Data Format for Calibration:

where row and column is the actual apparent (to the viewer) row and column based on the center of the cluster of nodes on the CCD (whose CCD row and column can be used to identify the row/column of a FOV responsive to the activated LDE's); optionally brightness-centered. The primary database key is row+column (using the well known data key normalization protocol for stacking a plurality of key elements into a single search/SQL value). The row and column of an imaginary screen (related to the pixels of the CCD) define an obvious method for identifying the perceived azimuth and elevation of image portions from the perspective of a properly placed eye. Ideally, the calibration CCD or combination of CCD's used has significantly more pixels than the display of the current invention so that multiple CCD pixels can more effectively represent a divergent beam from one LDE (or teamed LDE's forming one pixel) and, of course, in color embodiments, capture net resulting color from the LDE or teamed elements. Thus, in a preferred calibration process, each individual or teamed LDE (multiple LDE's to form a given pixel) can be activated in logical combinations and the results captured. Note: there can be multiple records with the same row and column value because there are multiple combinations of teamcodes that will result in the same apparent pixel location in the displayed image. This can be extremely useful in allowing software to select a different combination of LDE's for the same pixel either to increase brightness (activating more than one set) or to activate leads that aren't already in use in the instant display cycle, etc.

Teamcodes identify, directly or indirectly, the LDE's to be activated to produce a given row/column pixel by identifying directly or indirectly (directly in the preferred embodiment so that no interpretation is required for the subsequent lead activation) electronic leads to be activated or by any other identifiers determined to be used by software to identify those activations. For example, teamcodes can be an embedded series of lead numbers (the preferred embodiment) or a pointer (index key) to a related database containing teamcodes for the row/column.

Thus, when software seeks to "light" a display pixel (i.e. activate the best LDE(s) to reflect light that will appear to come from the apparent location; i.e. a row and column of the viewers FOV), a table record for that row and column is sought by the primary key. Teamcodes for the thus-acquired record(s) (there can be many to select from for the same pixel) provide the information needed by anyone skilled in the art to activate leads leading to the LDE's of choice. Of course, the table option is only one of many applicable embodiments responsive to calibration and controlled fabrication.

Relative intensity is a value (or set of values, optionally keying to a supplementary database in less preferred embodiments) relatable to the actual brightness as received on the testbed CCD when the teamcode-indicated LDE's are activated. Since light source intensity can be varied, this value can be used by software as a relative term to be used by software to decide on activation term (e.g. a longer term to achieve more brightness for the same charge) or a modified charge amplutude). Also or alternatively, this field can simply point to related database values for combinations of activation periods, polarities, charge amplitudes, etc. to even better enable software to direct the appropriate brightness of a pixel. Multiple CCD pixels receiving light from a calibration activation pass can represent a divergent beam from one LDE (or teamed LDE's forming one pixel) and, of course, in color embodiments, capture net resulting color from the LDE or teamed elements.

Divergence

Divergence is a value indicative of the divergence of the light emanating from the teamcode-selected LDEs. In one form this may be stored simply as the number of or cross-sectional range of testbed CCD pixels receiving a threshold-surpassing amount of light resulting from a given LDE or LDE team activation. The threshold is based on an implementer-chosen brightness cutoff that limits the inclusion of nearby (from central) CCD pixels (center may also be identified with respect to brightness). Any implementer-chosen thresholds are applicable and may be guided by experience, common sense, signal contrast goals and/or others such as the Rayleigh Criterion based on resolution objectives design as is widely understood. Although many such applicable methods and more apply for the identification of the peripheral boundary of the threshold of inclusion, in the preferred embodiment it is simply calculated as the circle around the center of that area on the CCD surrounding the center of the Airy disk that comprises 84% of the total power received by the CCD responsive to the currently activated LDE's. The center of the intensity pattern on the CCD is found by common means and a representative line segment is identified from that center to (or significantly towards) the most distal portion of the CCD (this accommodates centers that occur at edges and corners of the CCD and choosing horizontal (for convenience and fewer pixilation issues) paths on the CCD speeds the simple calculation). The data is normalized by summing the intensity of the line segment and considering it as a relative value for total power. Then the intensity values are summed for pixels along that row (or other pattern) from the center until that sum is 84% (or other chosen value) of the full line segment's intensity value or other implementer-chosen indicator relative to power. The distance, r, between the CCD node at the center and the node whose intensity measurement brings the total (between and including these two points) to 84% defines the radius of the estimated Airy disk. The half angle of divergence, α, can be calculated as: (this simplified and non-limiting example does not consider the interaction of a lens-based testbed camera but, instead, the simple placement of a CCD proximal to the point of proper eye placement such that the reflecting parallel light creates a largely non-divergent geometric image plus diffraction on the CCD).

$$\alpha = \text{Tan}^{-1}\left[(r-\sigma)/d\right]$$

where σ is the radius of the geometric optical reflection from the LDE, r is the radius of the entire area/circle of active image on the CCD and d is the distance to the LDE from the current center node.

Though divergence data can be stored in many forms, in the preferred embodiment divergence will be calculated at calibration time (prior to final data storage) and recorded either as the effective half-angle of divergence, α, or, in the most preferred embodiment, the apparent distance, D, to the POI implied by this divergence. E.g., $D=r/\tan(\alpha)$. Also stored are either azimuth and elevation represented by the POI or an equivalent row and column value on a plane, or any other notation, such that the location in space of the POI is identified with the appropriate LDE's. Thus, after calibration, the apparent location and (at least for 3-D applications) the distance of each LDE and many combinations of LDE's upon activation is known.

Then, for example, when the software needs, in order to produce a given image, to light a given pixel (by activating one or more LDE's) to create light that appears to come from a point of origin relative to that pixel row/column position and to have a given distance (which can vary in 3-D applications), brightness, color, etc., the table is consulted. In the example embodiment, the table, normally resident in memory, can be keyed on, for example, row+column+divergence (or distance since divergence is a function of distance) in a "find-nearby-values" mode to find the "records" with teamcodes for activating LDE's that will appear to come from the desired azimuth, elevation and distance (also color e.g., if the light source is not variable). The amount of light source brightness, length of activation or both (along with a long list of other brightness controls described herein) are now, based on the relative brightness value in the chosen record can effect the desired brightness. Thus, based on these thus-calculated and calibrated values, the appropriate charges are applied to the teamcode-designated leads activating LDE's and light is redirected to the eye. Of course, some embodiments, particularly non-3-D embodiments, will not be concerned with distance but will store some values appropriate to the application that identify a perceived pixel and the LDE's that can effect it.

Image Formation: Scene+Disp

In many head-worn displays that provide a scene view, that view has a narrow FOV limited by the characteristics of the display providing the scene image. However, in most embodiments of the current invention the viewer sees the wide FOV and high resolution of the scene via ordinary light from the scene passing through the plate to the eye. The scene view is unimpeded by the display elements. In embodiments where the scene view is precluded by equipment implementers, such as by a distal opaque layer either temporal or static, the laser display functions still perform as described. However, in some embodiments, such as night vision glasses or when the natural light from the scene does not pass through the plate, a captured camera (typically worn, not shown in FIG. 1A) image of the scene is displayed as the wide FOV display image in the appropriate spatial location using the display technology of the current invention. Overlaid upon this can be other displayed images such as analytics and text.

The dotted lines in FIG. 1A do not represent reflected light from activated BSs (only a few BSs are illustrated for simplicity) but are potential path indicators illustrating the general radial (convergent towards the eye) nature of the array in this particular drawn embodiment. This 2-D representation of a 3-D assembly describes an array of BSs that potentially provides a pixel of light from each azimuth and elevation (pan and tilt) of the eye (within a prescribed resolution and FOV). Thus, a kind of dot-matrix/row&column (analogous to raster) image is provided with that image being projected on the retina in inverse form. Note in FIG. 1A that some of the dotted lines fall outside the instant range of the pupil as drawn and, thus, that the plate can and normally will provide image rays from wider azimuth and elevation sources to be seen when the eye rotates or saccades beyond the fixed drawn position of FIG. 1A. This allows the wearer to look around and see a continuous image as the eye scans the combined wavefronts: i.e. the image being constructed artificially along with the natural wavefront of the scene view.

In FIG. 1A, 4 beamsplitters are shown creating the illusion of 4 points against the scene from the 4 rays seen as solid lines entering the cornea 106. The positions of these dots of light against the natural scene will be determined by the angle of the beamsplitter with respect to the collimated beam and the eye and its position in the plate. A collection of these dots is perceived in the brain as an image against the natural scene. (It will not be repeated for each embodiment but it is understood that the scene can also be blanked thus limiting the user's view to the projected image.)

Dealing with Both Sides of a BS

Of course, the beamsplitters, as drawn in FIG. 1A, normally have two effective surfaces or boundary layers with shifted RI's resulting in reflection. These surfaces can be close enough to produce a pair of beams so proximal as to serve as one pixel yet enjoy the benefits of increased (combined) reflectivity while being adequately distal to each other to minimize destructive interference following well understood techniques familiar to those skilled in the art. Although not the primary factor, selecting a BS thickness for a given embodiment will benefit from choices resulting in little intensity loss due to phase-shifting-driven destructive interference. Depending, of course, on the wavelength of the light source, this can be accomplished by a difference in path length to the eye that is normally not ½ of the wavelength and/or such that the path inside the BS is long enough to make the two vectors strike the retina adequately apart as is commonly worked out by those familiar with such optical effects. For example, the path of the light, 103, inside the angled BS can be a near exact multiple of the wavelength of the light source. Alternatively, the second surface can be normal to the itinerant beam (or otherwise reflect the beam away from the eye responsive to a non-parallel nature of the two BS surfaces) to prevent any noise from the second surface.

Non-Transparent Component Placement

Figure 2A:
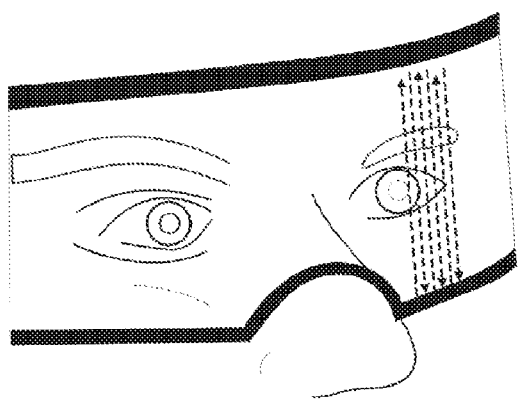
FIG. 2A illustrates one embodiment of a single continuous curved plate providing an unbroken view of the forward view (the wearer's view of the scene ahead).
Figure 2B:
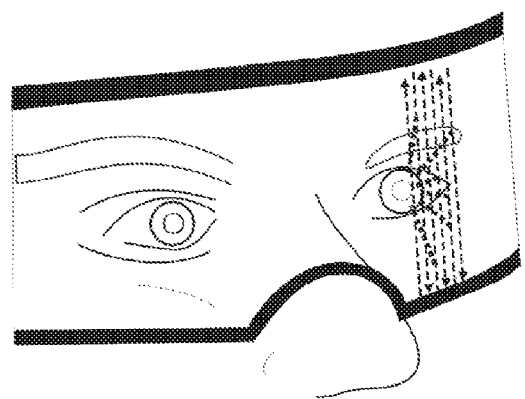
FIG. 2B illustrates the same curved plate but additionally shows rays being directed towards the eye as they are redirected by the subcomponents in the plate.

Non-transparent components may be placed in the edges of the plate (e.g., in the frames of ordinary-looking glasses like the ones shown in FIG. 4A), or single wide view plates providing an uninterrupted landscape view for both eyes simultaneously, e.g., the curved plate shown in FIG. 2, or in potentially large flat screen laser-projection TVs.

Without moving parts, without lenses aligned with other lenses and with the potential for effective mechanical fixation and protective sealing, the assembly can be ruggedly insensitive to fog, inter-component misalignments, impact and water. There are several embodiments with increasing levels of resolution and color selection which will also be described herein.

Scalability: Tiny Worn Displays to 2-D and 3-D Billboards.

Also, virtually all embodiments of the current invention are scalable. Thus, the plate may also be, for example, 3 m (meters) wide and 2 m tall to form a large screen "standup" display capable of both 2-D and 3-D images viewable up close or far away. Indeed, very practical embodiments of the current invention include screens large enough to be in the form of a highway billboard. To deal with the need for brightness in sunlight, existing sunlight may be ported into the light path, 103 in FIG. 3A, via a beamsplitter near the light sources, 102, in the usual manner which allows either or both sources of light to follow the paths shown in FIG. 3A. Of course, the light sources can also be physically switched when the sun comes out or when the light becomes dim by all ordinary means. Acquiring sunlight as the sun appears to move with a servo sun-tracking assembly and redirecting this sunlight into the path is well understood by those skilled in the art and not recapitulated here. Diffraction of the very bright sunlight on the LDE's, although this can also be dealt with via many of the diffraction control methods described herein can be simply managed by reducing it with larger LDE's (easier to do in a very large display with big pixels) and increase diffraction where desired (as described herein) by reducing the size of some or all of the LDE's.

Figure 15:
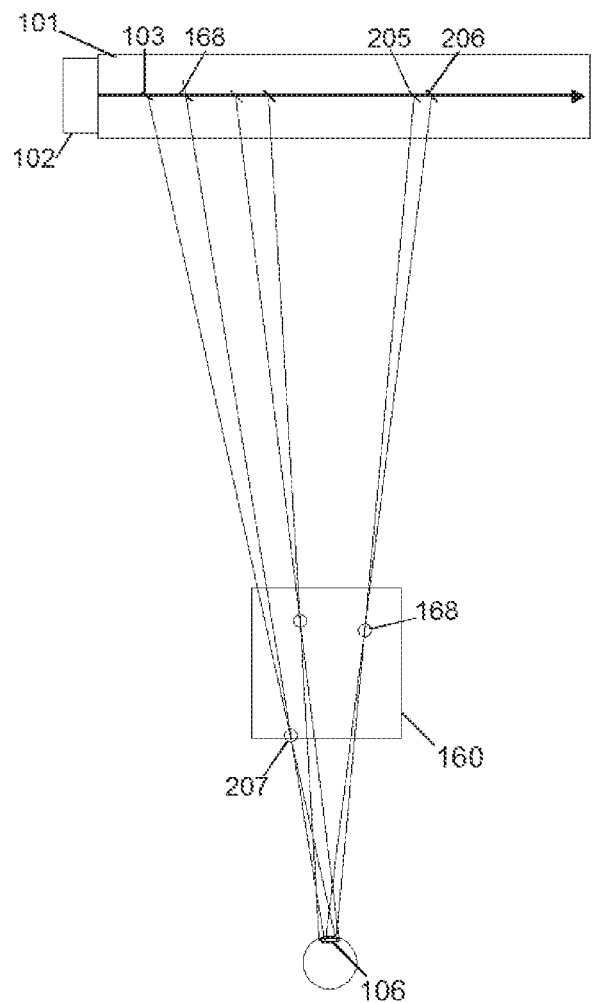
FIG. 15 illustrates an apparent 3-D image location frame.

FIG. 15 illustrates an apparent 3-D image location frame, 160 which simply identifies an area within which the apparent image may be located (here the image appears to be located between the screen in the viewer. This simply illustrates (by the circles locating line of sight intersections in the image location frame, 160), where the image, originating from the plate 101, will be perceived. For example, LDE's 103 and 168 redirect light along paths which intersect in the circle, 207. From the perspective of the viewing eye at 106, the light appears to emanate from 207. Thus, the distance from the eye at 106 to 207 is the perceived distance to the apparent "pixel" at 207. Also, 207 will appear closer to the viewer than 168. This is applicable to any kind of display from a television screen to a large billboard. In each, the perceived image will appear to appear between the plate 101 and the viewer. The substantial power of these concepts for providing depth perception in an image is further illustrated in FIG. 4B. For example, as FIG. 15 illustrates that a portion of an image can be seen to be substantially in front of the screen (between the screen and the viewer), so FIG. 4B illustrates that, potentially simultaneously, all or some of the image can also appear to be far behind the screen. The sum of the range from far behind the screen to far in front of the screen represents a large range of potential perceived depth. Also, there can be many, many LDE's. If you cannot fit enough in one plane in the plate to meet the needs of an embodiment, you can add essentially any number of additional planes parallel to and within the plate, 101 (just make the plate thicker to make more room or the paths of light more discrete) filled with LDE's. Thus it is also possible to provide the benefits of a wavefront reconstruction not unlike that of a hologram which allows you to move your viewing perspective and still encounter enough light seeming to be coming from a single point yet containing photons heading a number of directions (which permits lens-accommodation-based depth perception, binocular-overlap-based depth perception, and parallax-based depth perception). Similarly, by providing enough LDE directed photons to represent enough of the rays of a wavefront reconstruction, the viewer in FIG. 4B and FIG. 15 could move his head and still encounter rays analogous to the ones drawn in these figures (but directed to the then current areas occupied by the viewer). This, of course, also enables these displays to provide these effects to multiple simultaneous viewers at multiple locations in front of the screen.

Color may be provided by any practical means including multi-chromatic light source with filtering, diffraction or sequential control to separate colors in time (such as a spinning color wheel) feeding the light source. Also, color-separating gratings optionally associated with EO components and, of course, red, green and blue laser sources are other good alternatives as are color selective modulating elements (i.e. ITO excitation of an RI modulator that also changes color). Where the light source provides multiple colors, e.g., multiple lasers, each laser (or other color source) may be positioned to follow a path populated by LDE's whose activation will cause that color to be reflected. Color can also be time-selected where the light source provides one color while LDE's intended to display that color are activated (are caused to be reflective by having an RI different from that of the surrounding media of the plate), and another color while LDE's intended display that color are activated. Also the known practice of inserting holographic and other gratings in the path of light to select color and the use of holograms otherwise described herein for use in light direction can also be used to select color are useful optional embodiments of the current invention. Thus, all technologies capable of providing colored light (whether the light sources are unique to each row or those that follow an itinerant path to service multiple rows) are all applicable to the current invention. Control of colors actually display may also be accomplished by the separation of multispectral light after LDE's have redirected it. For example, in a time-based separation strategy, white light may encounter the LDE's but, before it reaches the eyes, it is filtered to transmit a chosen color. The old standby color wheel, for example, is often used to place a green filter in the path when the light image passing through it is the green component of an image. Similarly, of course, for the three color system example, the same is done for red and blue. Of course, it is also possible to combine these different approaches to color provision into a single embodiment.

Thus, the current invention is also an eminently flat screen technology (despite the fact that, prior to the current invention, flat screen and laser projection wouldn't work together). Standup display embodiments, like worn embodiments, may optionally be enabled with eye tracking (ET). It can be expensive or impossible to provide a dense LDE-provided wavefront of rays to every point in a large area so means to select a smaller area to send light to allows for better discretization. Eye-tracking is to be used in such situations to locate the eyes of each viewer so that appropriate LDE's are selected to send light to the locations of those eyes (rather than wasting LDE's sending light to areas for there were no eyes). On worn displays eye-tracking cameras are preferably mounted in the glasses while for standups they are preferably mounted on the standup display. Also, for embodiments applied to large screen TV's and billboards (which are understood to include billboards with moving video images), I tracking and be applied not only to more efficiently provide LDE-directed light only where there are eyes looking but can also be applied to tracking moving eyes. For example, a billboard, in order to provide a 3-D image that appears to be suspended in front of the viewer may track the movement of that viewer to redirect LDE-directed light to where the viewer is currently.

Eye Box, FOV and Eye Relief

In one preferred embodiment the FOV is similar to that of an ordinary glass lens in a pair of glasses and at least 80 degrees. Choice of FOV affects eye box. For this described embodiment, we minimize eye relief (distance from eye to optic) to maximize eye box keeping it to about 9 mm. In a typical optics environment (ordinary glasses) sized like ours this would suggest an eye box with lateral diameter over 40 mm but we will not do that well because at this point we aren't presuming full wavefront reconstruction. Thus the eye box will be less that 40 mm and how much less will be determined by the amount of wavefront reconstructed.

In the plan for the first prototype eye box (lateral tolerance) should be about 10-12 mm but that is manageable with good glass frames. Also, because the light's divergence is controlled, the eye relief (axial distance) tolerance is also well within the ability of glasses frames.

Computer Hardware, Software and Basic Logical Methods:

Except as described herein, software for the processing and display of video images is a process understood by those familiar with the art and, thus, processing details that are normally understood or obvious to someone skilled in the art are not explicitly detailed here.

The basic function of addressing a conductor matrix and applying a charge to one or more nodes, for example, is neither a new process nor the novel focus of the current invention. Thus the current invention's applicable embodiments include every practical means for activating any of the arrayed LDE components. The system's software interrogates image data and reproduces it.

Computer:

Similarly, computer devices capable of running the software described and otherwise appropriate for the functions listed are not limited to any given application specific integrated circuit (ASIC), processor, controller or collection of processing means; all are applicable. The computer assembly does, however, have to run the software and have operative connection to activation control hardware. This activation control hardware, familiar to implementers in its many embodiments currently used to select, direct and apply charges to display devices, spatial light modulators, etc., and those that will be designed later, are all applicable to the current invention's task of applying charges in a timely manner.

Communications:

In embodiments for display of information not captured by the worn assembly, a communication device, e.g., a wireless data transmitter, coupled to a wireless receiver in the worn frames or nearby, delivers image data to an on-board processor, also in the frames or operatively connected, which selectively activates LDE components in the plate(s) to display pixels of light. Some processing may also optionally be offloaded to a nearby processor by the same or a similar wireless communicator. However, for remotely received video data, in the preferred embodiment, preparatory processing is accomplished before the image data is sent to the worn assembly. For example, a subject may watch a remotely captured video image wherein that image is being assimilated by well understood (and thus not duplicated here) processes such as clock-directed sample and hold (S/H) circuits and image processing all resolving to values for color and intensity for each pixel of data to be displayed in rows and columns. Even the specific choice of which nodes to charge/activate may be made remotely to minimize footprint and processing overhead in a worn processor.

Thus, for images captured by the worn assembly, all of the typical image processing may be processed by processors in the worn assembly with parts optionally offloaded for remote processing by that wireless coupling. For remotely supplied video data, however, the preferred embodiment of the worn assembly receives data already in the form of either pixel data (location, brightness and, optionally, color) or the lower level instructions (specific to the subject's unit). Example embodiments of the latter are EO component matrix location, charge to be applied and, optionally (when data regards smaller units of time than the default frame rate suggests e.g. for duration-based brightness control), duration of charge application. This allows the worn assembly to simply apply the given charge to the given conductor matrix location for either the typical frame period or a transmitted-data-provided period.

Software Single-Component Imaging:

Consider an embodiment with one LDE component (in the current example this is a BS) per pixel. Image reproduction, in the simplest embodiment, typically involves a video or still image which is understood as or converted to an array of pixels. Each pixel location is associated with at least one BS either by software decision process e.g., recall from a list of image pixel number (often simply row and column) vs. BS numbers (the BS that recreates the desired pixel attributes from the perspective of a properly aligned eye e.g., as based on pre-calibration on a testbed with a camera for a virtual eye).

Virtual placement (depth/light divergence) of a flat image or a 3-D image of pixels appearing to be at a variety of distances is software directed by any combination of elements such as:

choice of BS size (typically from variety of available BSs in different layers satisfying the desired positional and light divergent criteria) and other diffraction-based depth placement options. Diffraction-based divergence is explained in more detail herein.

choice of BS shape (see FIG. 4b)

diffractive controls (discussed herein)

combinations of BSs where a plurality of BS reflections will, at the appropriate eye accommodation, focus to the single point representative of a desired pixel location.

direct changes (e.g. actuation) in physical component locations (covered in detail herein).

choice of light source color (varies effective angle of diffractive divergence) which may be adjustable by implementer choice, Here, the software considers the desired virtual placement (depth as well as azimuth and elevation) based on subject/factory criteria (both fixed and context-sensitive), current subject behavior (e.g., where the subject is looking at the moment when ET capability is present) and any application specific criteria. 3-D imaging is explained in more detail below.

Multi-Component Imaging: (Matched and Unmatched Components are Discussed Separately)

There are a number of reasons for using more than one electro-optic component to represent a single pixel. Some of these include placement of images, brightness and 3-D imaging.

Placement: As Illustrated in FIG. 4 and explained herein, activating multiple EO components to illuminate a single pixel (applicable to BSs and holographic imaging EO components) is one effective way to provide virtual image placement.

Image Brightness Control.

One reason for using multiple EO components for the creation of a single pixel is for contributory brightness. As illustrated in FIG. 1 and other illustrations herein, a pixel may be created by any kind or shape of electro-optic material. Choosing multiple near or contiguous EO components (being near and effectively in the same plane or effectively sharing a vector from the eye) causes their reflectivities to combine for a brighter pixel image. Also, as illustrated in FIG. 4, multiple pixels may contribute to the display of a single pixel even if they are far apart.

In one applicable embodiment the software, preparing to choose EO components to paint a pixel, may simply table select from the manufacturer's table of which BSs direct light that appears to come from the azimuth and elevation associated with a pixel location to be illuminated. These tables may be updated or modified on-the-fly during calibration or by subject-specific configuration preferences.

Brightness is, of course, also additionally or alternatively software controlled by variation in charge to EO components, variation in how long the charge is applied as well as the software selected shape, size, coatings and angle of incidence of EO components chosen. In the simplest application, the intensity value of the pixel to be illuminated is software directed to be directly proportional to the charge applied. Control of image brightness can use one or many of the effective controls optionally available in the current invention.

Corneal Entry Angle Selection:

Although it is not necessary, the essentially normal angle of incidence of BSs, e.g., as shown in FIG. 1A, maximizes perception of brightness by minimizing Light Lost Due to Corneal Reflection and Some Diffusion.

Light Source Management: Controlling the Light Source Output or Nature.

Light source management is one effective method for controlling image brightness. Also, by separating the frame into many shorter sub-frames and activating different EO components with variations in light-source brightness (e.g., by spinning wheel filtering, power management to the light source, polarization shift attenuation or other forms of brightness attenuation) between the sub-frames, pixel brightness can be controlled. Also, brightness can be controlled with even minor shifts of light source wavelength (the longer it is, the more of it is reflected to be perceived as brightness.

Reverse Charging:

Increasing brightness control range with a reverse charge. There are many methods of brightness control of the EO component or components used to illuminate one pixel of the display that are considered elsewhere herein. These include choice of charge, EO material (can theoretically be a different material for each different EO component), duration of charge, size of BS, shape of BS, number of BS' for one pixel, comparative darkness of the background, change of light wavelength, adjustment of light source output, change of light source, thickness of EO component (the thinner it between the opposing charge sources, the more effect the charge has upon RI), etc. Yet another way to increase brightness involves increasing EO component reflectivity range.

Each EO component has a maximum change in RI that it can reasonably accomplish within the inevitable voltage limits of a production system. Thus the RI difference between the uncharged component and a fully charged one defines an RI range for the component we'll identify as R. Thus, with a chosen set of charge polarities, the RI range is 0-R (or zero to R). However, if you reverse the polarity of the charges, the range becomes −R to 0. Thus, by selecting, for one or more EO components, an EO material whose "−R" RI is the default RI for the system, then, in the default condition you actually provide a full reverse charge for minimal RI just to achieve the default RI in order to be transparent to the system. Then the charge can vary from full reverse to full normal thus providing a range of RI's essentially equal to 2*R. Thus, more capacity for brightness is achieved (approximately doubled) through more capacity for an RI shift above the default RI. Reverse charging is particularly appropriate for applications where the unit can be easily removed or circumvented upon loss of power.

However, using methods understood by all skilled in the art, more substantial or application-appropriate brightness can be achieved using any combination of these broader factors. Another significant reason for using multiple components is for 3-D imaging which will be explained in detail further below.

Shaped EO Components:

Shaped LDE components, e.g., those enlarged in 107B in FIG. 1B, are useful for controlling the end divergence of the light.

Selective Pixel Activation:

In FIG. 1A the BS' are made from electro-optic (EO) materials and have transparent conductors. In the "default" condition the refractive index (RI) of the BSs are essentially the same as the usually non-conductive (or non-activated) surrounding media and any conductors with which they are surrounded. The term "default RI" as used herein will be understood to mean an RI that RI-adjustable (e.g., electro-optical) components are caused to approach when there needs to be a minimal difference in RI between the components inside the plate. Typically, this is the RI of components in the path of the FOV whose RI is not substantially modified in real time in the normative process.

Thus, unless an EO is activated by the transparent charged leads to have an RI different from that of the surrounding elements, the invisible BS' have no effect, refractive, reflective, or otherwise, on the itinerant beam of light passing through the plate. At this default state, the wearer's view is undistorted and the wearer's FOV is undiminished. The conductor leads (referring here to any electrical connections of any material that are either clear with an RI adequately close to the default RI to minimize impact or are made adequately invisible by any combination of their RI, their narrow diameter, or their choice of placement) are, in the preferred embodiment, arrayed in the well-known "rows and columns" in order to allow selective activation of a node by selection of a row and column to apply charge to. However, any format or method of selectively activating the BS is applicable. One alternative format involves a potentially flat conductor layer for one polarity rather than the familiar array of conductor traces such as, for example, where the EO components are holographic elements. Thus, the other conductor polarity may be delivered by, for example, a column-selecting trace contacting that side of a vertical column of EO components while the other side of the EO components contacts the potentially planar layer of conductor whose RI is not as critical due to its shape. To select a row, in this particular embodiment, a diode for each row is provided which is activated by the processor at the same time that the column is selected by the vertical trace elements whose charge flows through the EO component to the conductor layer. Thus a single pixel is activated by row and column. Such a conductor layer can serve as a conductor for two layers of EO components, one on each side of the layer. However, most of the discussion herein surrounds the more traditional matrix of conductor traces applying a charge to both sides.

When it is desirable for a pixel of light to appear against the scene, a BS, perceivable as a pixel to the wearer, is software selected for the relative azimuth and elevation of a beam it would reflect to the eye. With the BS now selected, a charge is momentarily applied to it, sending light to the eye that appears to be coming from a point in the scene.

Alternatively, groups of BSs may be selectively software-activated to recreate subset elements of a virtual cone of light representative of those rays that might isotropically emit from a single point in the scene and thus form a cone of light with the cone base defined by the diameter of the pupil as illustrated in FIG. 4*b*.

The very slight change in BS RI results in a very partial reflection. Considering the small change in RI responsive to charged EO materials at moderate voltages, it is fortunate that we only want a tiny portion of the itinerant laser beam to be reflected from a selected BS (since even a small diode laser is too powerful to be fully deflected into the eye for long periods of time.

EO Component Mapping for Calibration and Mass-Production Enablement:

An explanation is overdue for just how one could inexpensively mass-produce (stamp, etch, burn or deposit) such complex BS-based devices and make each BS' reflected ray go precisely where you want it to go. The fact is that nothing worn by humans with different shaped heads and even variations in interpupilary distance may ever be that standardized. Further, even if they were, the many opportunities for permanent misalignment of thousands of components during manufacture and the temporal gross misalignment of the whole assembly with respect to the cyclopic axis of the human vision system would make predicting such precision at manufacture problematic (though theoretically possible given the stability of the plate once fabricated).

Thus, a post-manufacture software solution is among the effective approaches to achieving high precision with high-speed, mass-produced parts. As shown in FIG. 4, there are, potentially, many different BSs located in a wide variety of locations, including sharing the same plane, that can be used to create a single virtual pixel. In a multi-level (stacked) stamped (e.g., in planes of EO light directing components) or deposited plate, there can be even more BSs to choose from to light a single display pixel. For example, a single vector from the center of the pupil outward through the plate might encounter in different layers any number of EO components whose light will reflect back along that same vector to be perceived as the same point. Although approximate and orderly patterns with redundancy as needed for a given application is preferable, one could, in theory, even stamp thousands of randomly oriented BSs roughly oriented to deflect light towards the eye. Even in that embodiment, the equipment could then be automatically software post-configured on a calibration device that, much like the real-time display driver will do, activates one BS at a time and precisely records the resulting vector of the directed light.

Figure 8A:
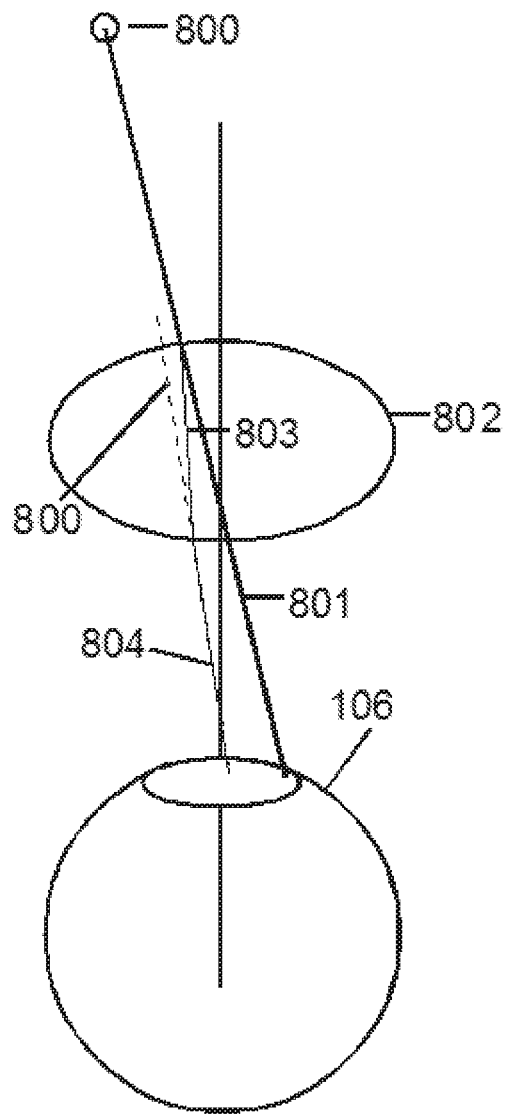
FIG. 8A illustrates the use of a cylindrical lens, 802, in the assembly for astigmatism.
Figure 8B:
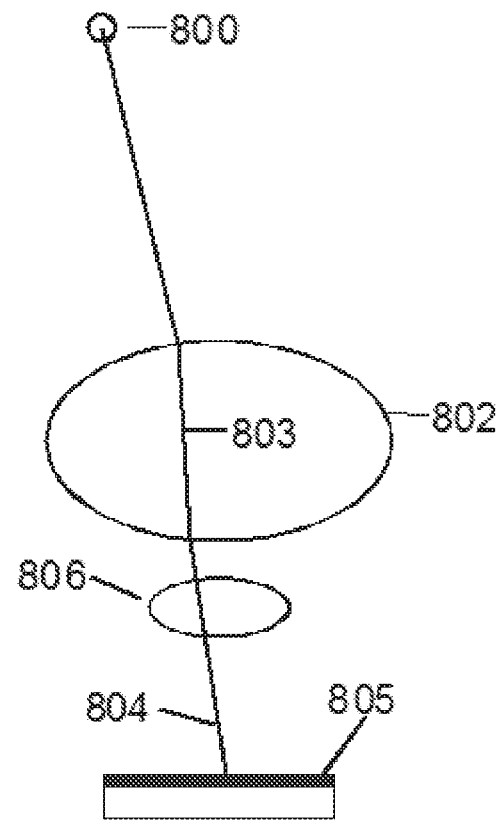
FIG. 8B illustrates the use of a CCD (a charge coupled detector camera element) in place of the eye for receiving the image. This is applicable to a calibration strategy described herein.

This can be done by numerous lab procedures well known to those skilled in the art. One such approach is the plate testbed illustrated in FIG. 8D. Here, the plate, 101, is anchored in a known spatial reference position and each EO component is activated one at a time (or in groups) to see which array element on a nearby CCD, 805, is activated by the rays from the EO components. Ideally, the plane of the CCD is parallel to the plate and the center of the CCD and the center of the plate share a vector normal to both.

Since the CCD, plate and lens (where applicable) placement are known, the central vector of light resulting from each BS activated is easily calculated by well known laboratory calibration methods. The lens, 806, may be adjustable and even dynamically positioned to adjust focus more appropriately for the instant-activated EO component. However, for most embodiments, a fixed lens can be used. Thus the focused point of light for a given EO component on the CCD is relatable, by good spatial alignment of the testbed and common laboratory calibration procedures, to the primary central vector of the light from each EO component tested.

Figure 8C:
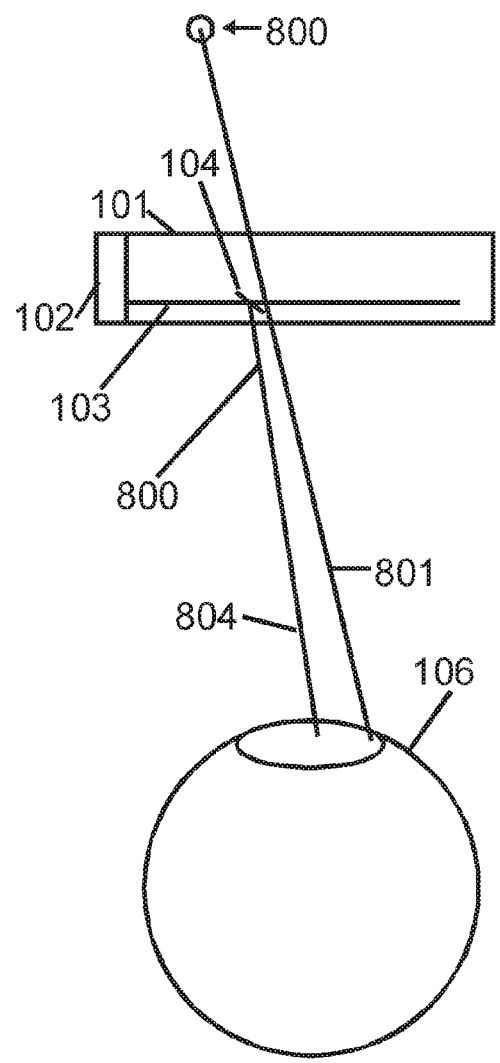
FIG. 8C illustrates a means by which an image from a plate, 101 can be made to create an image appropriate for, here, and astigmatism.
Figure 8D:
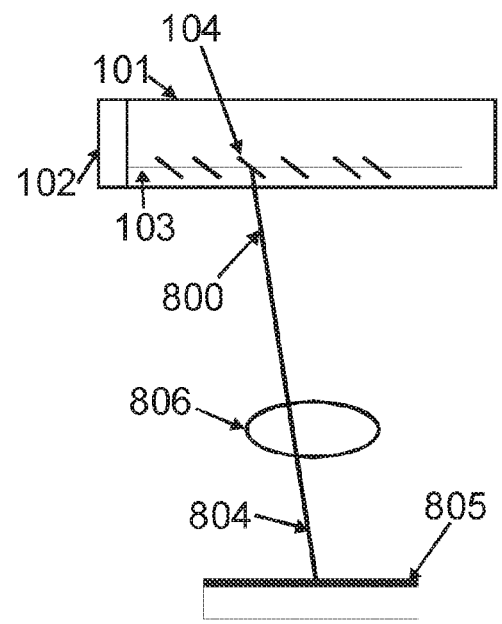
FIG. 8D illustrates a CCD replacing the eye shown in FIG. 8C applicable to calibrating and testing the effectiveness. This may be done through a lens, 806.

This vector for each BS, once captured, is extended in software to cross the virtual location of a virtual eyeball (virtually placed with respect to the physical plate like the eye, 106, in FIG. 8C. Thus, if the worn assembly happens to fit the human subject precisely as it did the virtual or physical test bed (with the subject's eyes exactly where the virtual eyes were and the assembly oriented to the standard virtual or model head exactly as the physical equipment does with the subject's head), we know precisely which BS to activate to deliver light along which vector. Then, at runtime (when a subject is wearing the InVisiVision plate, the IVV, a name used herein for the invisible, i.e. transparent, plate with an image emerging from it), this decision of which EO component to activate can be made by display software by any common means (e.g., using a table of vector vs. conductor matrix location, which identifies conductor connections to activate to cause a specific BS to reflect a given vector of light).

Then, of course, since no human subject will perfectly match the configuration/calibration testbed that recorded the resulting vectors of redirected light for each BS, macro-level alignment of the two plates to the subject's eyes will occur as soon as the IVV is removed from the box and placed on the subject. Such macro alignments of the two plates with the eyes are so well understood to those skilled in the art that they will not be covered in detail here. They may, for some applications and subject-demographics, be as simple as the subject using adjustment screws or verniers to properly fine-tune the orientation and attitude of each plate manually until a clear, unwarped image is observed.

A few enhanced configuration alignment methods include:

Scene Camera: Providing a scene camera (for capturing the natural view before the subject) whose displayed image will overlay the natural scene (viewed right through the plate) making misalignments visually obvious and easily adjusted either by manual screw adjustment or computer assisted adjustment.

ET: For certain other applications where ET (using tiny monochrome cameras in the rim of the IVV "glasses" assembly for worn embodiments) is either already provided for another function or is otherwise practical, the ET software can automatically and without requiring subject expertise, activate several BSs, wait till the subject fixates briefly upon it and use the several responses to recognize the spatial relationship between a plate and an eye. Then either:

Automatically direct the actuation of a vernier or other physical adjustment to approach (servo) the correct alignment of the plate until it is in perfect physical alignment or With that known spatial relationship, recalculate the table (or other BS selection method) so that each BS is now known (and called up) based on its actual and precise vector of directed light to the eye.

Where the geometry of the eye is not perfect (myopia, hyperopia, corneal or lenticular astigmatism, etc.), this can be accommodated by separate lenses or even modified paths as described below with "Virtual Corrective Lenses".

On-Board and/or Remote Processing:

A processor or processors for receiving an external image (graphics, video, text, etc.) and for directing which BSs are activated at what times, along with control of associated devices and functions, may be in typically small (e.g. Application Specific Integrated Circuits; ASICS) processor component(s) as part of the glasses assembly. Alternatively, some or all of the processing may be performed by remote connection (wireless or wired) with the addition of a communications link (preferably wireless) between the glasses and external processing components.

Eye-Tracking (ET):

ET associated with LDE arrays is applicable to expanding the functionality of multiple embodiments and functions including computer-assisted calibration, treating presbyopes, providing always-in-focus, self-prescribing emmetropic glasses by calculating the distance to the intersection of the eyes' instant vision axes and adjusting the focal power of the LDE array used (e.g., lens-emulating SLM's) and adjusting the corrective focus accordingly, facilitating better vision for some with macular degeneration (MD), enabling a moving virtual lens for potentially more complex correction of astigmatism and enabling a single shaped EO component to more precisely cover large areas with range-to-POI knowledge.

In the preferred worn embodiment, a tiny camera mounted in or on worn glasses-rims captures an image of the eye. In some applications, infrared (IR) LED's are provided and mounted beside each camera to illuminate each eye enabling dim-light applications and increasing accuracy because the reflections (IR glints) on the eyeball are well-known additive tools for accurately capturing the attitude of each eye. With the attitude of each eye and a known spatial relationship with the physical components, the approximate range to the instant POI can be calculated. Standup display embodiments are similarly optionally enabled. In the preferred of such embodiments, the ET camera and optional IR lamp are mounted on the display itself. This, in addition to all the other ET-enabled enhancements, makes more efficient display possible based on well-understood facial location recognition (e.g., eye and nose positional registration). Here, the display software receives from the ET camera both the attitude of the eyes and their approximate location using well understood methods. Thus, the display can optionally recreate a subset of the 2-D or 3-D full wavefront for more efficient use of light (brightness efficiency), improved processing efficiency (less processing required when fewer EO components are selected) and further improvements to 3-D display by providing (through reduced general use) more EO components for multi-component imaging options Diffraction Uses and Control:

Summary: Diffraction, the historical bane of super-high resolution imaging, can be both useful and in need of control for the current invention's display system. As is further described in the later discussion of "3-D Imaging", diffraction from any of the EO light direction components, including BS's, is an effective means for providing divergence of light emulative of light from an isotropic emitter. The closer the isotropic emitter (be it virtual or real) is to the pupil of the eye, the greater the maximum degree of divergence of the emitted light as it enters the observer's eye. Thus, to display an image that will focus correctly on the retina when the subject is focusing at a depth where the displayed object is desired to appear, that displayed virtual emitter needs to have essentially the same degree of divergence that the virtual POI has. This also provides one of the several means that the brain uses for provision of the depth perception that is so critical to hand-eye coordination such as for a doctor performing imaging-supported surgery.

For virtual objects being displayed very near to the subject's eye but using larger BSs, for example, the diffraction may actually need to be optically increased to match the anticipated divergence.

Below is a list of some of the many applicable methods for applying and controlling diffraction:

Applying Some or all of Diffraction to Proper Depth Perception:

As described below with the discussion of 3-D imaging, diffraction is useful in the current invention as a means of creating a desired amount of light divergence reflective of a virtual POI distance. In FIG. 13 an eye, 130, has an instant vision axis that passes through a BS, 131. The parallel geometric reflection can be seen heading for the eye, 130, from 131 in the form of two dotted parallel lines surrounding the optical axis. A diffraction angle is approximated as the angle between the two dashed lines.

Thus when light from an essentially collimated light source, 133, is directed in a beam, 134, towards the BS, 131, it is reflected to the eye with the appearance of originating from the virtual point of interest (VPOI), 132. The degree of eye accommodation required to bring α, 135, the half-angle of the VPOI's virtual divergence (seen here in this 2 dimensional drawing) in focus (to a point on the retina) is essentially the same as the accommodation required to bring light from a BS or BS' essentially within the area of the dotted lines whose divergence results in a total divergence similar to α.

Note: although FIG. 13 is instructive, it must be noted that most diffraction calculations relate to an angle of divergence that presumes a central emanation while diffraction actually occurs at the boundary conditions of electromagnetic imbalance (edges). However, the degree of divergence is that value, which can be selected by multiple means as discussed herein, that requires a specific accommodation by the eye and thus the appearance of emanating from a given distance useful for placing the image at a depth. However, binocular overlap must also be managed (by well known methods) to effect the same depth perception or the current invention is no better at eliminating the sensory disconnect between accommodation-based and binocular-overlap based depth perception than some other inventions.

Thus, when dealing with diffraction from an EO component, correction for that diffraction is limited to the amount that is appropriate for the perception of distance (as described below with 3-D Imaging). Thus, while the other elements in this list can be used to reduce (or increase as needed) diffraction, they need only reduce it enough that the angle associated with the first airy disc is reduced to the degree of divergence normative for an isotropically emitting point at the distance to the instant virtual POI being displayed (as opposed to having to reduce divergence all the way to 0).

Size Management of EO Components and Diffraction Some Calculations:

One element that drives degree of diffraction is the size of the BS or the size of the activation area of a BS or other EO component. Thus, choosing an EO component from an array of those available for its size is a method for determining the apparent distance for proper focus and depth perception. Recall that multiple layers of LDE's can be used to represent multiple depths and degrees of divergence. One stamped layer of LDE's might be dedicated to represent a handheld sheet of paper's distance (small LDE), another LDE for 2 M (a slightly larger LDE) and another for 10 M (which is near infinity and would result from choosing a larger LDE or simply a larger conductor activation area of a LDE or other EO component). Also, because these "center of cone" beams are a little less vulnerable to defocus, fewer depth-specific layers are needed for many applications.

Some Calculations for Diffraction

The current invention is not based on any single calculation of diffraction. In fact, it is not the intent here to teach any calculation of diffraction realizing that there are many, they depend on a number of inter-reacting difficult to predict and measure factors and they are all, at best, approximations.

In fact, one of the calibration methods of the current invention is creating a broad array of LDE's on each plate (based on approximate calculations of both spatial location and degree of divergence) and, using a software directed camera in place of the eye in front of a plate, activate each LDE individually, computer focus the camera lens until a minimal point is created (this is a distance value, easily calculated as is know by all skilled in the art), and create a table of:

a) x, y location analogous to pixels representative of the apparent location of the pixel to the wearer of the glasses.
b) Apparent distance Then, when desiring to create a virtual pixel at a given distance, that LDE can be table selected from a database for activation to accomplish those dual objectives.

Having said all that and not attempting to teach a calculation that will virtually always be superseded by calibration and adjustment, one method for approximating the divergence from an LDE responsive to diffraction are the well known calculations shown below. However, any calculation for diffraction is applicable to the current invention as long as it is accurate enough to approximate diffraction enough to simplify the implementer's task of creating a good array of LDE's to select from.

One approximation of diffraction degree, θ, for circular reflectors is $$\sin(\theta) = 1.22 * m\ \lambda/d$$

and for slit or rectangular reflectors it is $$\sin(\theta) = m\ \lambda/d$$

where λ is the wavelength of the light striking the LDE, d is the effective width of the LDE and m is the iteration. Because the central portion of the airy disc is of primary effect, 1 can be used for m.

Thus, for example, in FIG. 13 to select a desired round LDE diameter to create the appropriately divergent light representative of the distance to the virtual pixel, 132, the known degree of POI divergence, α, 135, is equal to the angle δ, 139. Thus, in addition to the geometrically LDE-reflected light populating an area representative of the central portion of the cone-shaped virtual solid angle of the POI, 132, to the eye, additional first-iteration (central Airy disc) light diffracted from the LDE will (in addition to central geometric area contribution) additionally fill or at least partially further populate the area outside the geometrically reflected portion but essentially inside the solid angle of the POI's path (dashed line shown with angle α, 135) if the diameter, d, of the LDE is based on the approximation:

$$d = 1.22\lambda/\sin(\delta)$$

Wavelength Control:

As discussed above, wavelength, which affects diffraction (the longer the wavelength, the more diffraction) can be controlled by any practical means including selective laser diode activation, color wheel selection from multi-chromatic light and wavelength modifying methods such as grating color selection, nano-dot color shift, phase-shifting, wave compression/decompression, etc. The larger the wavelength, the more diffraction is selectively created.

Choice of Virtual Distance:

Here, as described elsewhere herein, the virtual location is moved significantly to effect a large change or very slightly to more perfectly tweak a potentially granular adjustment based. Thus, a tolerance for too much or too little diffraction will be based on the depth perception and defocus limit needs of the application.

Adjusting Distance Between Eye and EO Component:

Here the effect of beam divergence on the circle of confusion is modified rather than actually changing the degree of diffraction but in many cases, the effect will be similar. The distance between eye and EO component can be adjusted by frame position control (e.g., automatic or manual vernier adjustment) or choice of alternate BS layer (s) in the plate.

Lens-Based Diffraction Reconvergence:

As discussed in some detail below under "Lenses for Vision Correction and/or Light Divergence Control, refractive post correction is a powerful and useful means for dealing with diffraction, simplifying stamping arrays (permitting simpler pattern arrays with a proximal lens) and dealing with subject prescription eyeglass needs. It is understood that any of the embodiments that incorporate lenses herein can, as applicable embodiments, have conventional lens functions provided by SLM's or holographs (e.g., holographic optical elements or HOE's using as a reference beam light from the light sources already provided for the EO component array(s) after passing through the plate by mirror rerouting or by a separate light source).

A good thing about diffraction that occurs over fixed path lengths from fixed size EO components is that it's eminently predictable. Thus, the degree of divergence can be post-adjusted refractively by either (or a combination of any of):

a.) Fixed global correction, e.g. FIG. 14A. This is applicable when the user is not viewing a simultaneously mixed scene/display image (e.g., a large screen TV application, or a worn display without a scene view or when the subject's vision correction benefits from a proximal convex lens e.g., FIG. 14A. In the latter case, the configuration software can, when the subject is farsighted (requiring a convex corrective lens), recalculate the net divergence of light from each EO component (simply calculating the refractive effect of passing through the proximal lens). Thus, the display components' general diffractive divergence (diffraction for all components can be designed to be, for some embodiment, identical or within a tolerance) can be reversed or attenuated by the easily calculated responsive convergence of the subsequent lens.

b.) Dynamic global correction. This is applicable when the user is viewing both the display and the scene but in the presence of a shutter plane. Here, the correction is still general (rather than at the pixel level) but now it is EO in nature and is only activated in timeslices where the scene is blanked out. This may be in the form of a switchably active/inactive convex lens (FIG. 14A), a group of lenses (FIG. 14E), or a SLM (FIG. 14D) proximal to the user both for reducing the diffraction driven divergence and for creating the illusion of the displayed image being at a chosen distance (which varies with voltage).

C. Pixel level correction: A Spatial Light Modulator (SLM, e.g., FIG. 14D) or an array of EO components (FIG. 10) on the proximal side of the plate selectively converge enough of the diffraction-induced divergence to manage the diffraction. This can be at a pixel level to an eye.

EO Components Arrayed for Destructive Interference and Electronic, Pixel-Level Divergence Variation:

Destructive interference is useful for reducing an EO component's envelope of diffraction to provide a more discrete packet of potentially collimated light. Advantages include a potentially brighter beam of light (geometrically reflected light is all constructive unlike normal incident beams, for example, of two coincident flashlight beams that do not result in twice the light), potentially very narrow beams and electronically adjusted beam divergence. Using two or more EO components in combination with each other (selectively activated at the same time) allows selective interference with beneficial results. The separations between the chosen EO components can be large or very small. The separation between two selected elements may be, for very small separations, simply a conductor deposition (shared for activation by an EO component on each side) which can be on the order of a micron in thickness. Two of the numerous applicable examples of EO component placement for diffraction management are illustrated below: Unmatched and matched components.

Matched Components:

Matched components often benefit from selective placement.

The example in FIG. 5A illustrates one embodiment of matched components, in this case essentially equal sized and parallel BSs. The plate whose surfaces are indicated by 101, carries a laser beam, 103, (a sampling of rays are illustrated) to encounter a first BS, 500. The BS may be small to enable a very high resolution image. Light reflects geometrically along line 501 until it reaches its target, 502. However, because it is a very small BS, it additionally diffracts light as broadly away from 501 as line 503 (this figure is not drawn to scale and diffraction may be less or more than shown in the form that is simplified for easy observation). Similarly, another ray, 103, is shown reflecting off of 504 and reflecting geometrically along line 505 and creating a diffractive envelope whose outer boundary is defined by line 506. We have chosen points such that 503 and 506 are coincident. Because both $\theta_1$ and $\theta_2$ are responsive to the diffraction of 500 and 504 (which have the same aperture), $\theta_1$, in this example configuration, is equal to $\theta_2$. Also, with a judicious choice of the distance between the BS', we can assure that the geometrically reflected light is in phase (e.g., in the current example, the lateral distance between reflecting faces is an even multiple of $\lambda$. The path, 507, inside a BS is also an even multiple of $\lambda$ and the diffracted light along 503/506 is out of phase by roughly $\lambda/2$. Thus, regardless of the distance to any target, 502, including a refracted path through an eye, the two beams will offset each other contributing no brightness to the target.

Also, this example pair of points on 504 and one on 500 also emit other non-geometrically reflected light (bad light, in the instant context) essentially from $\theta_1$ to $-\theta_1$ (that is, you could rotate 503 on the axis of its point of contact on 500 until it was coincident with 501 (where the angle of 503 is reduced to 0 with respect to 501) and then continue rotating potentially as far as another $\theta_1$ degrees. This would represent a length on 502 that is roughly $2*Y_1$ in height ($Y_1$ is the length on the target covered by projection of the angle $\theta_1$). A good choice of placement parameters can result in all of the light from these two points in all of that length of 502 being essentially mutually phase offset and thus contributing no brightness to the target. Thus, the diffracted light from these two points is largely self-annihilated leaving a narrower corridor of illumination less negatively affected by diffraction. An accounting for the beams for the two currently considered points on 500 and 504 is as follows. Every point along the length of 502 that falls between the intersection of 502 with 503 and 501 (labeled "$Y_2$") will receive, in an average instant of time, a roughly equal number of photons from the two considered points. Driven by VO, these will destructively interfere and provide essentially no brightness. This is also true for rays from the point pair that intersect with each other at the intersection of 501 with 502. It could be argued that, in this illustrative embodiment, that the diffractive beam from 504 destructively interferes with the geometric beam from 500 and this is correct. However, there are more photons geometrically reflected than diffracted from a given point (thus, after diffracted photons are offset by geometrically reflected photons, there are still many geometrically reflected photons remaining). Additively, there are, at that same point on 502, geometrically reflected photons from 504 that are fully constructive. Thus, although there is destructive interference with some of the geometrically reflected rays, this has, in this example embodiment, the beneficial effect of narrowing (darkening the edges of) the beam where the most diffractive photons travel (an advantage) while the additional photons geometrically reflected from 504 further provides brighter edges for the genuine beam corridor.

Figure 5B:
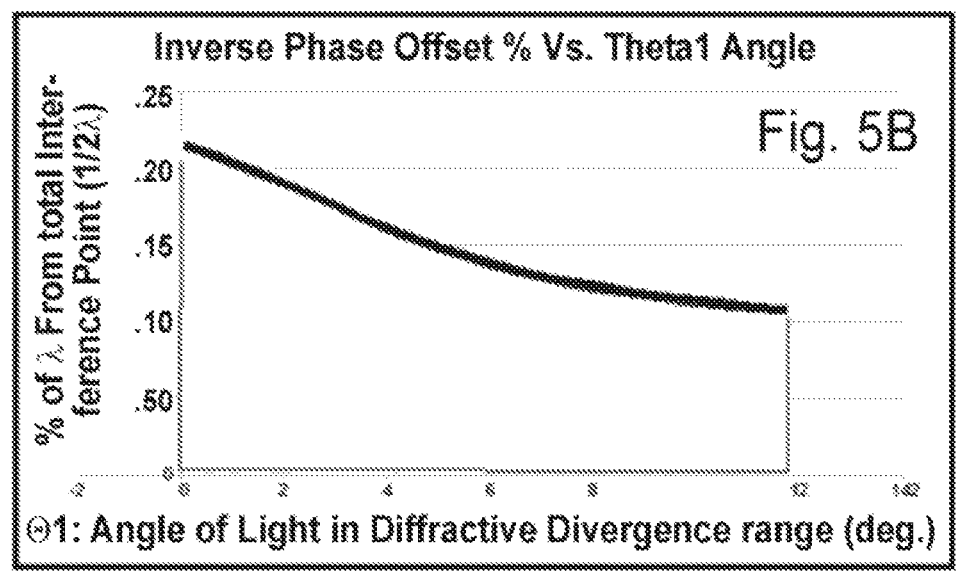
FIG. 5B and FIG. 5C are graphs illustrating the effectiveness of the assembly shown in FIG. 5A.

As will be illustrated by example, there would be no diffraction problem if these were the only two points receiving photons from 103. Fortunately, almost all of the reflective surfaces of 500 and 504 can be similarly accounted for with another similar set of paired points with the same results. It can be visually observed that the next point-pair one might consider (located some identical tiny increment below these two first points would result in continually coincident 503 and 506 as you continue to consider this and subsequent point-pairs downward along the surfaces of 504 and 500 with both still coincident and phase offset so as to contribute no light, regardless of how far the two rays travel towards the target. Also, as you again, for each new point-pair considered, rotate, 503 from the diffraction boundary, θ1, where the light is essentially phase offset, to 0 and even to −θ1, judicious configuration choices can keep the resulting interference at 502 well in the near-completely phase offset range as illustrated in FIG. 5B. Alternatively, as in FIG. 5C using different configuration options, diffracted light that is destined to fall in or very near to the corridor, where geometrically reflected (un-diffracted) light is carried, can be more contributory (constructive interference) and less destructive for an even brighter discrete light corridor (making use of diffraction contributing to the bright spot).

There is not, however, a point pair considered in this discussion for a potentially tiny fragment of the ends of 504 as drawn. The vertical component of this distance is equal to the vertical offset (VO), 509, of these arbitrarily selected points as labeled in FIG. 5A, which can be kept very small (on the order of only one wavelength or less which becomes smaller as it's brought to a focal point on the retina) with good end results. Even this potentially tiny sliver of the BSs, due to the light's proximity (ranging about from 0 nanometers to 1 wavelength) and parallel travel with the envelope beam (the widest boundary of the diffractive divergence), can be attenuated by interference with the envelope path. The value VO, driven by the distance between and size of 500 and 504 (the size, and thus the aperture, of the BS determining the degree of divergence and the distance between them determining light travels along that angle) is a key component to watch in configuring a system. Normally, this is kept very small which minimizes unmatched points and maximizes, by proximity, the opportunity for destructive interference.

Advantages in manufacturing: Some manufacturing processes create rough optical edges that are seen, from the viewer's non-micro perspective, as partial defocus or low signal-to-noise ratio. The paired and selectively interfering BSs offer options for dealing with these problems because, on the average, the irregularities in diffraction will, spaced as described, negatively interfere. For deposition-based or even some etched and stamping-based micro-forming processes, irregularities in edges may be accommodated at least in part by modifications to any combination of inter-BS spacing, slight reduction in diameter of only one BS and biasing charge to slightly favor one BS.

Dynamic Divergence Control:

The same EO components, 500 and 504, can be caused to reflect light with a variety of divergences. This ability allows a single EO component to provide light that appears to originate at a variety of distance for proper focusing and perception of depth (3-D). Particularly in embodiments like the one graphed in FIG. 5C where diffraction is damped progressively more (by destructive interference) at wider angles, the divergence of the net light emitted can be increased simply by attenuating (reducing) the intensity of one BS compared to the other. The other illustrations shown herein normally presume that the two BSs have the same charge and thus the same amount of reflection (although the charge on 504 might, in some embodiments, be very slightly higher that the one on 500 to provide the same amount of light after passing through) the Because Attenuate size by comparative charge on the 2 BSs.

Inter-Component Interference:

Depending on the amount of charge on these BSs, the light from 504 passing through the simultaneously active 500 may be phase shifted by 500 significantly enough for an accommodation. This shift is very small because the change in refraction is typically very small. This is why it is possible to use a bright laser beam whose light is destined for the eye (only a tiny portion is normatively reflected due to the minor change in RI). However, in embodiments where this is significant, said accommodation is easy and obvious to anyone skilled in the art requiring only a minor adjustment between, in the instant example, the lateral distance between 500 and 504 to assure that geometrically reflected light is still in phase.

With these point-pair and component-placement principles in place, a calculation method for configuring ideal combinations of component placements and angles for maximum diffraction management exists.

Alternative and Advanced Calculation and Graph of a Matched Component Example:

Using the example components of FIG. 5A, the length of line segment $X_1$ (between 500 and 502) is chosen, in this example calculation, as one of the characteristic determination factors. Similarly, the effective aperture of the BS in the system, driven by choice of BS size, is also selected here as a system characteristic-driving component. Finally, the lateral distance between the primary parallel faces of 500 and 504 is selected to assure that the distance is a multiple of λ. The thickness of the BSs are selected to, after accommodation, if any, for phase shifting of light passing through 500, be either an even multiple of λ or the adjusted equivalent figure. Calculations from chosen values: Based on the aperture value, the divergent diffraction, θ, of light, 103, from reflectors 500 and 504 is determined by the size and shape of the effective aperture approximated by, for a round BS effective aperture as $\sin(\theta)=1.22*\lambda/d$ and, for a rectangular one, $\sin(\theta)=\lambda/d$ where d is the effective aperture. $X_2$, 505, is the sum of the chosen value for $X_1$ and the value chosen for the distance between the primary parallel faces of 500 and 504. $VO=(X_2-X_1)*\tan(\theta)$. The length of the hypotenuse $h_2$, 506, extending from the reflection of light, 103, on 500 to the target 502 is: $h_2=(X_2^2+VO^2)^{1/2}$. Thus, the difference between the two paths of the two contributing source of diffracted light to the outer edge of the diffraction envelope (via 503) is: $P_D=VO+h2-X_1$.

However, the above only calculates the outer envelope. One example method used in the initial research here for assessing the interference of the area inside the envelope is an iterative scan of each point on 502 falling within the envelope and comparing the distance traveled by rays from the two points (in the point pair being considered) when they intersect there. In each iteration, $\theta_1$ is progressively reduced by some tiny increment (e.g. some fraction of a degree or radian) resulting in a new intersection of 503 with 502 thus redefining $Y_1$. $Y_2=X_2*\text{Tan }\theta_1$. From that $Y_1$, a new value for $h_1$ is simply calculated with the Pythagorean theorem. Also, from that new $\theta_1$, a temporary value for $\theta_2$ resulting in an intersection with the same point on 502 is calculated: $\theta_2=a\tan(Y_2/X_2)$ which enables the Pythagorean calculation of $h_2$. Thus, for each iteration reflective of a different point on 502 receiving diffracted light, the difference in the path lengths, $P_D$, of the light from the two points is calculated the same way it was for the outer envelope (now using the iterative values for values of $\theta_1$ within the envelope): $P_D=VO+h2-X_1$. Now, with the values of $P_D$ for the envelope and points within firmly in hand, the fractional $\lambda$ shift, F, is calculated for each such point on 502: $F=P_D/\lambda-\text{int}(P_D/\lambda)$ This value will range from 0 (no shift) to 0.5 (exactly out of phase for maximum destructive interference) to just under 1 (e.g., 0.9999) which is approaching 1 which is indicative of being fully in phase again. A useful calculated value for graphing the results is PFHL (percent of lambda from half-lambda) which ranges from 0% from half $\lambda$ (total destructive interference) to 50% $\lambda$ from half lambda (which is in phase). PFHL is a useful value for graphing since it cycles from 0 to 0.5 with 0.0 being black and 0.25 being white. Thus, it can be viewed as a brightness indicator (the larger it is, the brighter the interference area) or as the percentage of $\lambda$ away from total destructive interference.

Thus, in terms of the brightness of two beams intersecting on a target, the larger the PFHL value, the brighter the resulting net light. $PFHL=0.5-P_D$. Since the next set of point pairs (for example, the next smallest increment down and to the right from the previous points on 500 and 504) has the same results, this is a good approximation of the net effect. Also, it can be seen by the dotted lines that the same process works at the opposing edge.

Figure 5C:
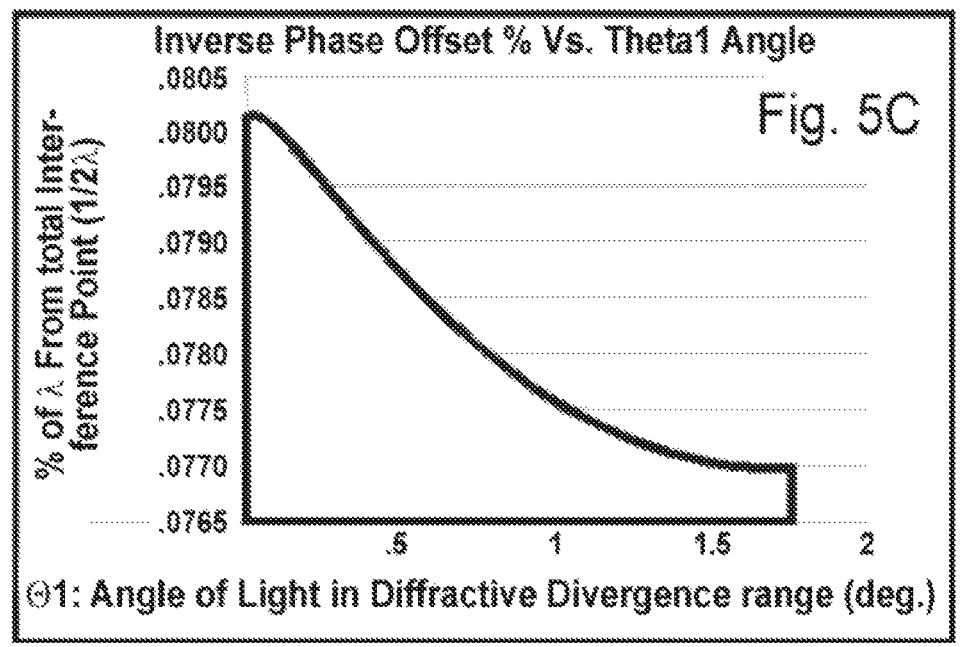

PFHL vs. those iteratively considered values of $\theta_1$ is graphed in FIG. 5B and FIG. 5C. In FIG. 5B configuration options were selected to darkly block out diffraction with diffraction. Thus, all the values of PFHL (which is maximally black at 0 and essentially in the black range for anything under 0.1) are graphed as about 8% or less away from 0 (having a PFHL of about 0.0802 or less—virtually all diffraction is self-destructed throughout the iteratively scanned range). The configuration values selected for FIG. 5B were aperture=0.02 mm (i.e. 20 microns in diameter), wavelength=500 nm, $X_1$=50 mm. These result in a VO that is only 110 nm. It is also possible, in addition to reducing diffraction, to assure that much of the diffraction resulting from 500 and 504 is, while much less contributory to radial diffraction (outside the corridor, 508) be constructive (providing brightness) with light in the corridor. In FIG. 5C the configuration options chosen cause diffracted light in the outer diffraction envelope to have low PFHL values (dark) and begin entering the white range (this example only reaches about 0.2 while 0.25 would be all the way into an essentially white range although some range identifiers are subjective and environmental-context driven). The configuration values chosen here represent only a fraction of the controls available but effectively demonstrate a very small aperture size (3 microns), a fairly typical $X_1$ (50 mm), a mid-range wavelength (500 nm) and a circular BS. Moderate changes in $X_1$ do not greatly affect the results. This is very advantageous since optics and people move.

Figure 5D:
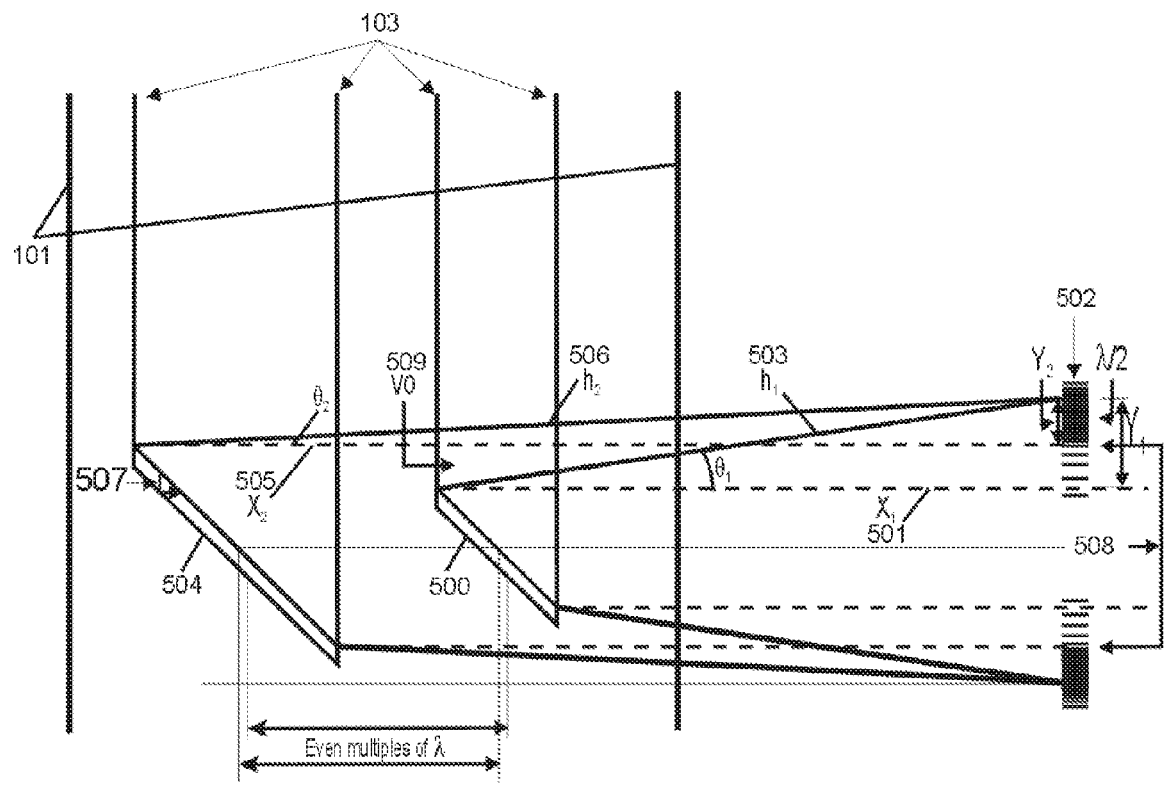
FIG. 5D is similar to FIG. 5A but the two reflective components are not matched in size.

Unmatched Components:

Unlike matched components, unmatched components may be different in size and thus vary in maximum diffraction envelope angle. In one embodiment, as illustrated in FIG. 5D, the plate whose surfaces are indicated by 101, carries a laser beam, 103, (a sampling of rays are illustrated) to encounter a small BS, 500. The BS may be small to enable a very high resolution image. Light reflects geometrically along line 501 until it reaches its target, 502. However, because it may be a very small BS, it additionally diffracts light as broadly away from 501 as line 503 (this figure is not drawn to scale) potentially leaving a spot on the target much larger than the effective aperture of the small BS, 500. (Of course, it will not typically diffract as substantially as drawn since the angles were exaggerated to be visible.)

Diffraction occurs at 500 with angle $\theta_1$ along line 503. It also occurs at 504 with angle $\theta_2$ along line 506. In the instant example embodiment the two BSs have been chosen by software and/or placed in manufacture so that the outer boundaries of their diffractive envelopes essentially terminate together where the lines 503 and 506 (and their counterparts in the lower half) intersect. Thus, for every angle $\theta_2$ between 505 and 506 (i.e. for different values for $\theta_2$ representing light reflecting from 504), there is a corresponding intersection with light from 500 with a particular degree value for $\theta_1$. Where the difference in these path lengths (after subtracting all even multiples of the wavelength and, thus, now dealing with the fractional remainders to compare the lengths by) are near $\lambda/2$, destructive interference darkens the target.

To manage the effects of diffraction to a) make the pixel look and come into ocular focus as if further away, b) permit very fine pixel size without subsequent refractive optics, c) provide a display pixel with an electronically adjustable divergence, d) increase the apparent brightness of the display pixel, or e) provide discrete packets of light for multi-packet 3-D recreation of a point in space, a second, BS, 504, (also receiving light from laser beam, 103) with a potentially different size and effective aperture is selected by software to be activated. Larger BSs will often be in the same plate for the convenience and systems efficiency of illuminating multiple display pixel areas with a single conductor signal and a single EO component (e.g., one larger BS can display larger areas of contiguous brightness and color). In many embodiments, they will also share a vector from the eye with other EO components like 500 and be available to be put into service, when needed, as a pair-member. Thus a group of BSs may be electronically selected/grouped (grouping illustrated here is a pair but any number of interacting BSs may define a pairing) in numerous combinations based on the desired effects of brightness, size and divergence. Thus, a pair like 500 and 504 may also be separated by a number of normally invisible BSs (between them and beyond them, not drawn) any of which may be selected to participate in the display of a pixel. 504 geometrically reflects a slightly broader beam (not normally as broad as illustrated, of course) along line 505 to encounter the target, 502. The pair are drawn parallel to each other and, in this illustration, at a 45° angle to 103 with reflection normal to 103. While in some embodiments, all the EO components may be so aligned, particularly in the presence of additional subsequent refractive optics e.g., FIG. 14, (due to the extreme ease of mass-stamping such arrays), they may also be at a variety of angles with similar results and manufacturing economies. It is also possible to reverse the order of the BSs (place the larger BS between a smaller BS and the target) with respect to the order shown in FIG. 5.

In that drawn illustration, light coming from the intersection of 506 and 504 has a longer path to the target, 502, than corresponding light from the intersection of 503 and 500. The BSs can be placed by implementers so that the distance between them controls the comparative phase of light reflecting from these two points to 502. For simplification of a process that has many applicable embodiments and no single required calculation method, only these two points are considered in the current illustration and the tolerance for distance shift of the light from the pair. For these two singular selected points, the path difference is calculated trigonometrically and, if BS positions and charges are chosen for narrowing the beam, an out of phase condition exists at the outer envelope boundary. The envelope is bounded by the outermost reach of the diffraction area, here illustrated as 503 for 500 and 506 for 504. The positive diffraction envelope in this illustration for 500 may be considered to extend from 506 to 505 (as if 506 is rotated $\theta_2°$ upon the intersection of 505 and 506 to then coincide with 505). 505 is an outer boundary of the bright corridor, 508, which in this illustration is equal to the aperture of the BS.

To further consider the effect of diffracted Huygens light that intersects with 502 inside the corridor (which would ideally interfere constructively near 505 with the geometrically reflected, i.e. undiffracted, light) some implementers will want to consider also basing BS positioning on calculations of the interference in the negative diffraction envelope for 500. The negative envelope is understood in this example to be a mirror image of the positive diffraction envelope intersecting the positive envelope at 505 (as if 505 were rotated clockwise on the intersection of 505 and 506 by $\theta_2°$. This "inside the corridor" negative diffraction envelope thus impacts 502 between 505 and a point below 505 on 502 by the initial magnitude of $Y_1$ as drawn. For this reason, the calculation example below considers the full envelope (both positive and negative $\theta_2$ angles) on both sides of 501. The calculation below, to illustrate the most challenging case, considers both sides of the envelope for 504 ($\theta_2$ to $-\theta_2$). If a given set of BS placements provides good dark (destructive interference) in the positive envelope and bright (constructive interference) in the negative envelope, the diffractive angle will be reduced and the bright spot brightened.

Consideration of other points by observation: If our calculations for these two sample points (one on 500 and one on 504) provide these good results, it can then be observed that there is another pair of points just below each of the two just considered receiving light, 103. The only difference in the results of geometric reflection and diffraction from these two points (compared to the ones above them) is that, at points of intersection of diffracted light from these new points, the paths for both would be, in the instant example, slightly shorter and the relative path difference slightly different. Thus, if this example calculation is used, a BS placement that is not sensitive to change in x1 within the scope of the aperture is advisable. It was not difficult to quickly find a number of placement combinations with results that are stable even with shifts in $X_1$ that are many times larger than the apertures. Thus, one method of confirming a good set of BS placements for a given set of design goals can include a consideration of two points at one end and interference calculation for the intersecting diffractive beams from the two points in the positive and, optionally, the negative envelope. Then, with adequate tolerance for change in $X_1$, (e.g., when the rays are close enough to parallel or otherwise adequately insensitive to distance change) this will be applicable for other points observed towards the center. A similar calculation from the other end of the BSs will, presuming that same calculable tolerance, also verify good results of a placement strategy. 500 and 504 are spaced such that light reflecting from one is essentially in phase with light reflecting from the other. This can be accomplished in a number of applicable embodiments. Here, the reflective surfaces of 500 and 504 are simply separated by multiples of $\lambda$ along the geometrically reflected paths. Thus, a very bright spot is created around the central axis of the assembly making this also a good example of the use of multiple BSs for creating a single, brighter (electronically brightness controlled) pixel (here, with two beams sharing a narrow corridor with a central vector to the eye).

The target, 502, is simply illustrated as a flat target rather than the actual target, the eye. The same exaggerated diffraction angles that make the BS diffraction visible also make illustrating paths through the eye difficult to illustrate at a distinguishable size: Thus, here, a simplified flat target is shown. Also, calculations similar to those shown below work with eye geometry and modified start conditions and criteria. One edge-pair interrelationship is shown here at the top of 500 and 504. It will be normative in some embodiments for each BS edge combination to be separately considered using ordinary target diffraction calculations. In some embodiments this may include unbalanced edge pairs rather than the symmetrically aligned elements of FIG. 5. Also, the BSs 500 and 504 do not have to share a lateral optical axis which bisects them both. This allows, for example, in a rectangular BS environment for each edge to be considered separately for diffractive results and control with different goals and steps. While results will vary with embodiment, the closer in size the two BSs are and the longer the wavelength, $\lambda$, the less sensitive the assembly tends to be to shifts in X1. Despite some intuitive predictability, it was very useful to use brute force modeling to find good potential configurations.

Non-interference between BSs: Significant diffraction does not occur in the light reflecting from the more central areas of 504 due to its passing around (or through) 500 on the way to 502. This is because the change in RI of 500 is so small with respect to the surrounding area (in fact, the RI shifts are all so small that, if we didn't have so much more laser power than we want reflected, the process would not work as well). In configurations where BS charges and placement distances make it necessary, the slight phase shift of a reflected beam from 504 passing through 500 is simply considered in the phase matching calculation as understood by those skilled in the art (thus, in some embodiments, resulting in a slight difference in BS placement).

Calculation Example

There are a large number of combinations of factors that can obtain a desired effect. An example using FIG. 5D, where the BSs are understood to be rectangular, is now calculated with sample results illustrated in FIG. 5E. Looking at the top edge of the BSs, we will first calculate the interrelated diffraction envelopes in a manner that assures that the outer boundary of the diffractive envelope for the primary BS, 500, essentially matches the outer boundary of the secondary BS, 504 upon reaching the target, 502.

Example parameters to test: In the example graph of FIG. 5E we let $X_1=51$ mm, aperture for 500$=A_1=0.1$ mm, aperture for 504$=A2=0.131$ mm and wavelength$=X=500$ nm.

Since relatively small apertures were used in the above calculation, this example calculation uses larger apertures. With those parameters for a test assembly, we first calculate the outer positive envelope to see what the resulting beam will look like there using the following calculations:

$\theta 1 = a\sin(\lambda/A1)$ degrees. This is an estimate of the natural diffraction on the primary BS.

$\theta 2 = a\sin(\lambda/A2)$ degrees. This is an estimate of the natural diffraction on the second BS.

$VO$=vertical offset of the two tops of the beamsplitters=$(A2-A1)/2$ $Y1$=height of this side of the diffraction envelope=$X1 \tan\theta_1$ If $Y_1 > VO$, $Y_2 = Y_1 - VO$ else $Y_2 = Y_1 + VO$ (since elements may be arrayed in other ways)

$X_2 = Y_2/\tan\theta 2$

Hypotenuse1=$h1 = x1/\cos(\theta 1)$

Hypotenuse2=$h2 = (X_2^2 + Y_2^2)^{1/2}$

Path difference=abs($h_2 - (h_1 + VO)$)

Fractional Shift=Path difference/$\lambda$ $F2$=Fraction of $\lambda$ shifted=Fractional Shift−Truncate (Fractional Shift)

This ranges from 0 to 0.999 (in Airy disc band "coloring" this is white through gray, black (0.5), gray and back to white). The PFHL=abs(0.5−F2).

The above calculations only consider the outer envelope (which can be imagined as coincident with 506 in FIG. 5D. Next, we sequentially consider each point on 502 within the envelope realizing that, from each of the two diffraction points (one on 500 and one on 504 that we are currently considering), there is one vector meeting one vector from the other diffraction point and intersecting at that point on 502. One calculation for "scanning" the envelope diffraction on 502 begins with iteratively reducing $\theta_2$ which rotates 506 slightly clockwise and reducing Y1. This rotated 506 now represents the path of the "first" ray inside the envelope. From this value of $\theta_2$ the phase of this first inside rays from the two points are calculated using the following equations:

$h_2 = X_2/\cos(\theta_2)$ This is the vector segment from 504.

$Y_2 = X_2 * \tan((\theta_2)$ $h_1 = (X_1^2 + (Y_2 + VO)^2)^{1/2}$ This is the vector segment from 500.

The same process as above is used to compare the paths ($h_2$ is one path and $h_1 + VO$ is the other) and determine the PFHL. This process is repeated in tiny increments of $\theta_2$ until $\theta_2 = 0$. Then, for the negative envelope, the process continues as $\theta_2$ becomes progressively negative. This can be for any period the implementers use for the task at hand but here we simply continue until the magnitude of $-\theta_2$ is equal to the original $\theta_2$. When these calculations are done programmatically in a loop, it is a simple matter to then vary the presumed value of $X_1$ up and down to find the tolerance for $X_1$ shift. One productive procedure is to find, perhaps in a brute force or Monte Carlo method, a combination that has a tolerance of a cm or so. This not only assures that, with BSs on the order of 100 microns, the next pair of points on those tiny BSs will fall well within the tolerance of the system (i.e. it will still have very similar interference patterns) but also that a worn assembly can move around on the subject a little without losing the beneficial effect.

Figure 5E:
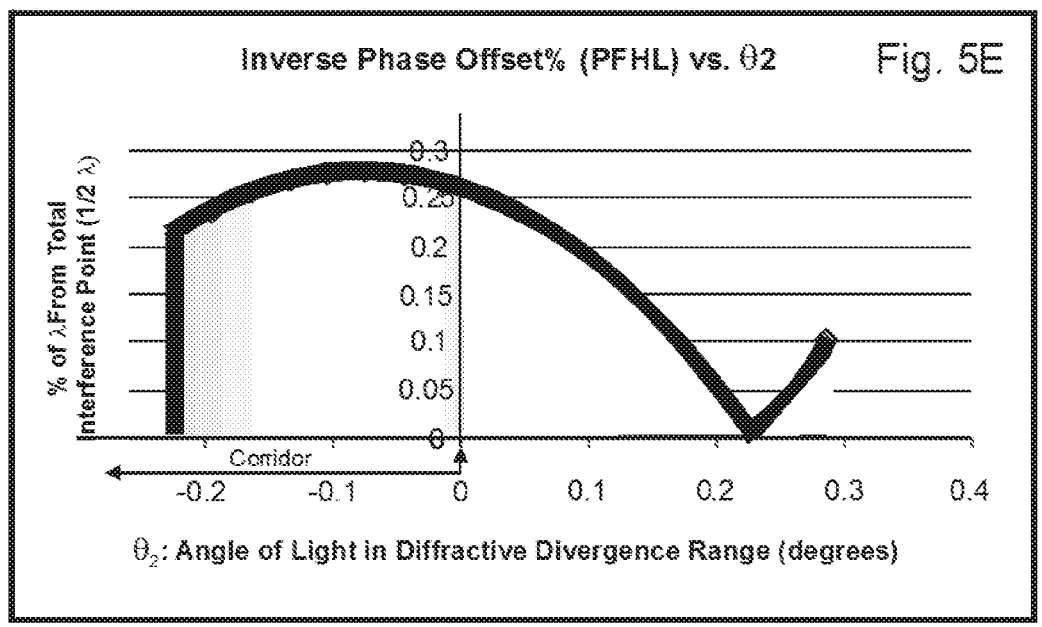
FIG. 5E graphically illustrates the effects of FIG. 5D.
Figure 6A:
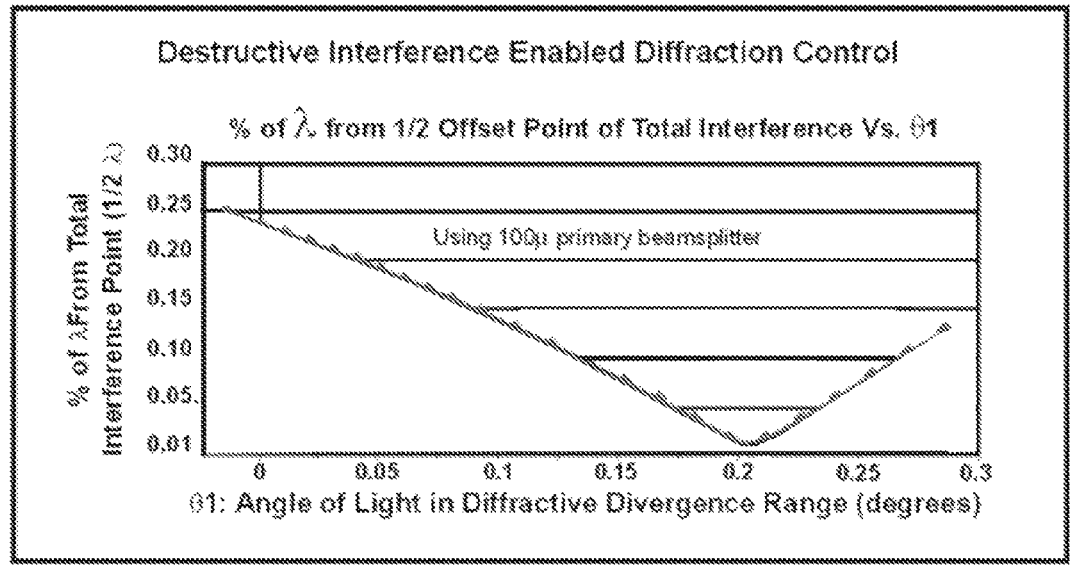
FIG. 6A graphically illustrates the effects of the unmatched beam splitter pairs in FIG. 5D. The light whose angle from center is further from 0° (to the right in the graph) is "darker" as the difference in the path lengths becomes a higher percentage of the wavelength, $\lambda$, divided by 2.
Figure 6B:
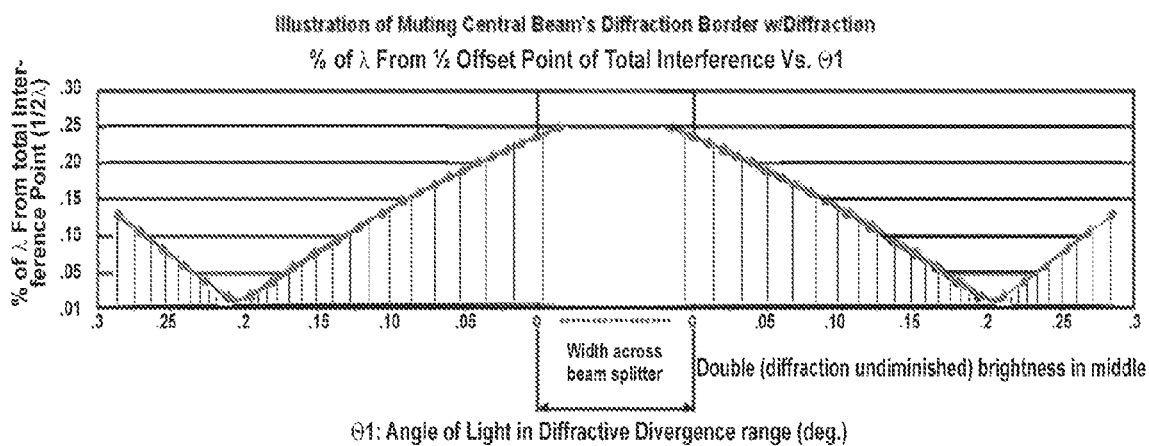
FIG. 6B uses the same data as FIG. 6A but provides a mirror image of FIG. 6A around zero on the abscissa to show symmetrically the brighter portion of the beam in the central part of the beam (further from the higher destructive interference points on the left and right of center).

FIG. 5E displays a graph using the sample data above. The abscissa is the degree of $\theta_2$ and the ordinate is PFHL. The closer the PFHL was, for a given $\theta_2$, to 0, the darker the area of the curve is illustrated indicative of near-complete destructive interference. Note that at x=0 the PFHL is above 0.25 and, thus, the background is white. The areas left of x=0 are in the corridor so this is good. To the right of x=0 is the positive diffractive envelope which becomes, as you get further away from x=0 (beyond the corridor wall) the diffracted light is progressively more out of phase and is, thus, displayed in gray. From roughly 0.17 and outward (the worst areas of diffractive expansion), it is displayed as black. The destructive interference can be seen to be at its maximum at roughly $\theta_2$=0.227°. The parameters thus tested also perform well (i.e. the effects don't change substantially) for values of $X_1$ ranging from about 47 to 58 mm. Thus, with apertures on the order of 100 microns, the results of the two points on 500 and 504 thus considered will be effectively similar to other points on the BSs.

Thus, a much more discrete and non-divergent beam is provided. Of course, adjustments will be made to specific embodiments in production. This is only one of multiple applicable embodiments of the current invention (which also include rings of BSs, etc.) where diffraction is controlled by diffraction and interference. To grasp the efficacy of this approach, consider how holograms, made up of extremely fine effective gratings emit, instead of on the order of a steradian of net diffraction from each grating element, extremely discrete packets of light along the central axis of the path to the virtual pixel. This, is accomplished, though using a different hardware design and pattern/structural distinctions, by creating very broad diffraction angles but destroying all but the central beam with destructive interference. Those viewing the hologram and the process already described above will discover that, like the flat target, 502, the retina of the eye receiving the light through the vision system, sees the narrower beam.

Electronic Divergence Control from a Single Pixel:

Also, in addition to BS selection, the relative charge on the two BSs so selected (in either a matched BS or unmatched BS embodiment) can be used to electronically determine the diameter of the reflected beam. FIG. 5 illustrates the diffraction divergence dampening effects of dual BS interaction (one edge of the corridor is represented in the graph). Thus, by reducing the charge on one BS while leaving the other the same (or any combination of charges) you can attenuate the amount of corridor narrowing destructive interference and effect electronic control of substantial variations in beam divergence from a single pixel as needed. This is applicable both to providing proper focus for an image to an eye and for providing in a dynamic manner adequate for 3-D video, a rapidly changing apparent position for a single pixel responsive to a desired distance to be perceived for the object being displayed. Of course, binocular overlap is simultaneously controlled by long understood and common practice.

Shaped EO Components and Broad-Brush Applications for Flat BS Diffraction:

Broad-Brush Applications: Diffraction and/or Shaped Components at Work.

Broad-brush applications, though not limited to shaped EO components (the same effects can and will be selected by implementers to be executed using ordinary BSs, BS pairs, holographic-related patterns, etc.) are described here because of their great usefulness in this area. If we assume or estimate a degree of eye accommodation, or, even better, if we know it from ET, then virtually any form of EO component can paint with a broad brush. That is, one EO component or component pair, etc. can display light that appears to come from many pixels. For example, simply choosing a BS whose degree of divergence is either greater than or less than the divergence that the vision system's instant power of accommodation will bring to a point on the retina will paint a larger area on the retina. Of course, as explained elsewhere herein, this is most applicable for displaying contiguous areas of reasonably consistent brightness and color and not incorporating boundary areas associated with edge detection. Fortunately the human vision system is surprisingly forgiving in its perception of flat fielded illumination. This is, perhaps, the result of a vision system designed more around the always-available edge detection rather than being dependent upon perfect, flat-fielded lighting. Thus, it is not necessary that the level of display intensity be perfect or even that the colors of slowly transitioning color changes on, for example a wall, be perfect. However, at high-contrast boundaries, the vision system's perceptions are not nearly so forgiving. Thus, applicable implementer software options will often select an EO component specifically because it does not meet the instant or estimated eye accommodation such that the larger the disparity, the larger the area painted on the retina.

Shaped components also provide the ability to focus light with a single pixel and/or to potentially paint thousands of pixels with a single EO component. The latter can be particularly precise with ET which, in providing POI range information, allows, at those points, the precise degree of divergence that will be needed after passing through the range-accommodated eye to paint the image-representative area on the retina. Where used to cause light representative of a pixel to pass through the center of the pupil in a narrower beam, pupilary diffraction at small pupil diameters can be reduced for a sharper view. The use of shaped EO components is also useful as another method for creating a desired degree of divergence so that a subject looking at a given distance will see a sharp image and, in 3-D applications, can better perceive depth (in addition to binocular overlap, etc.). As discussed below in the context of holography, the ultimate divergence of light can be controlled with shaped EO components with and without the subsequent refraction of additional normal or EO lenses. In FIG. 1B shaped components reflect light which can be made excessively divergent either directly by being convex or, for a concave reflector, diverging after the rays cross—thus appearing to originate by divergence at the focal point. This provides another method for placing an object's virtual depth and for painting.

As already indicated, it also, responsive to intentional software design, can paint a larger area on the retina with a single electrical signal pair and a single EO component. Thus, when the image to be displayed involves a large area of essentially contiguous brightness and color (sign backgrounds, sky, walls, etc.), painting multiple pixel's areas with one EO component (whose collected light, e.g. a potentially larger convex BS can be more substantial in brightness). This is particularly precise when the software is provided ET-rendered subject focal range information so that the diopters of eye-lens accommodation, rather than an approximation, can be included in the calculation of the convergence/divergence desired. While such a process would be perceived as intentional defocus in other applications, for a known area of contiguous, similar light (areas not associated with image processing edge detection) and with the known range (from ET or other means) of current subject accommodation indicative of the diopters of refraction of the subject vision system, an eye-model calculation of the origin and divergence of light required at that very specific diopter of eye accommodation to paint a desired area of the retina after passing through that vision system (based on any eye model including Gullstrand-Legrand and more recent models well known and understood by those skilled in the art) is enabled.

Thus, applying these well known steps in one of many applicable embodiments, the software acquires the range from the ET assembly, calculates the diopters of accommodation of the instant subject vision system and then, using calculations common in VR and image processing:
a.) Calculates the azimuth and elevation of the center of the area to be displayed as well as, using normal eye model calculations, the size of the image on the retina after passing through the lens. b.) Then, using normal ray tracing calculations similar or identical to those used in eye models, a vector passing through the plate, 101, is used to select (from those EO components known to exist in the plate from manufacturer or more recent calibrator key-indexed tables) BSs whose center is at or sufficiently near the vector located by the desired center azimuth and elevation (tabled by either cyclopic azimuth or separately for each eye). c.) Then, rays may be traced through the lens from available BS on that vector to find a good candidate whose rays sufficiently cover the identified area on the retina. d.) The thus-identified BS is activated.

For high speed operations, one effective method for steps b and c is to, at calibration time, pre-table index BSs using keys concatenating azimuth+elevation+rangegroup+area (or diameter in some embodiments) with near processing (finding a record that is near in the last element, area, when an exact match is not available). Here rangegroup breaks displayed POI range (and, thus, the directly related degrees of eye accommodation) into a few database-friendly pigeon-holes e.g., (in cm) 1:22-35 2:36-62 3:63-117 4:118-227 5:228-450 6:451-900 and 7:>900 cm (recalling that edge detection is not a factor here, only size on the retina of the defocused beam). Of course, a key record is created for each rangegroup for each BS (since the same BS will paint areas of different magnitudes based on the eye accommodation associated with each rangegroup). This is one of many methods for rapidly choosing the right BS for an area to be displayed. Another is to include degree of divergence and EO component size for all EO components and select the EO component by calculating on-the-fly the degree of divergence and component size that would properly paint the retinal area and select the BS from the general table of BSs which also key on azimuth and elevation. Also incorporated into any of these tables may, optionally, be each EO component's reflected brightness at a standard or ranges of charges since the shape affects the end brightness.

Broad-brush display of multiple image areas (pixels) from a single EO component or component set is not limited to shaped components. For example, a single tiny BS can be called into service by software (e.g., from one of the tables above) to use its high diffractive divergence to create a beam that is too divergent for the current accommodation thus spreading over a larger area. Or a pair of matched or unmatched (described above) EO components can be used to provide light to the eye that is more collimated than the current accommodation brings to a point on the retina. The latter case provides the ability to adjust the degree of divergence simply and electronically by adjusting the charge on one of the BSs to reduce or increase the diffraction-driven reduction in divergence. In practice this can result in additional table records or on-the-fly tweaking of a BS pair to perfection after one is table selected.

Other Shaped Component Applications:

While a very small shaped BS can be used to create a larger desired divergence with its natural diffraction, a shaped BS can accomplish the same feat without such a dependence on diffraction and with some beneficial "light collecting" characteristics. A larger shaped component, e.g., an off-axis concave BS, can both minimize the diffractive envelope (larger aperture) while controlling the degree of geometric divergence to place the object near or far in the subject's perception. For a convex, off-axis concave BS whose reflected light crosses to focus at a point between the plate and the eye, the light will appear to come from that focal point (based on divergence, at least). Also, the effects of diffraction can be minimized.

with what appears to the subject to be a very small pixel (high resolution) that is actually the result of a larger shaped EO component (low diffraction) whose shape focuses light to a small point on the retina. This may also be teamed with ET-ranging, where opted, to choose a maximally appropriate focus (by BS selection) for the instant diopters of eye lens accommodation. Here, based on the known accommodation of the eye, it assures an extremely discrete point on the retina even when the EO component is very close and larger than an ordinary BS would have to be to produce a pixel of the same size (and do so with the lower diffraction associated with a larger EO component).

Also, the shape of even flat components affects the diffraction. For example, a rectangular BSs diffraction calculation estimates diffractive beam expansion, $\theta$, with the equation: $\sin(\theta)=\lambda/d$ where d is the effective aperture. However, to increase diffractive divergence, a round aperture is commended whose calculation estimates diffraction using the equation: $\sin(\theta)=1.22*\lambda/d$. This can be accomplished simply by choosing a different BS from an array of those available or can be the result of selectively activating areas of a single BS Holographic Diffraction Control:

As described below in the discussion of 3-D Imaging and in the discussion of "Holographic Imaging Embodiments", there are multiple embodiments of the current invention that both control and use diffraction to provide superior wavefront reconstruction and extremely discrete (potentially narrow) packets of light.

Gradient Activation from Center of BS.

Here selective creation of a gradient charge from the center of a BS outward optionally minimizes diffraction by gradient-tapering reflectivity as distance from the center of the BS increases. This can be the natural consequence of a charged placed at the center of a BS and that charge naturally being less as lateral distance increases. In FIG. 7F a more complex example is illustrated, showing an edge of 3 differently wired BS'. Implementers may selectively create a gradient of charge with the most charge at center, e.g., across the BS at 708 and progressively less or none as you look towards the periphery (e.g., 703, 711 and possibly no charge at all on 700).

Grating-Surfaced BS.

Replace (and reposition as necessary) smooth surfaced flat, triangular or curved BSs, such as the ones in FIGS. 1A and B, with BSs having a grating on the side that first contacts the itinerant collimated light. The grating, discussed with Holographic Imaging Embodiments, below, is structured artificially in the EO material to create a focused or discrete collimated beam whose surface patterns/irregularities are expressed in EO material. Fresnel or similar focusing and/or diffractive patterns made of an EO that has the same RI as the surrounding media until activated. When activated, the RI shift w/respect to the formerly identical surroundings creates refraction and diffractive pattern resulting in an effectively discrete (or at least non-divergent or controlled divergence) beam to the eye. Also, this can use the reflectivity enhancements for low RI changes (as described above). Any of the commonly known convergent or divergent refractive and/or diffractive patterns are usefully applicable. Convergent effects will typically cross the light between the BS and the eye to become appropriately divergent or adequately collimated prior to reaching the eye.

3-D Imaging and Light Convergence/Divergence Control:

Many of the embodiments of the current invention potentially produce a software-selected and controlled perception of depth reflective of all of the human depth cues including the accommodation required (by emulating the degree of divergence of light from the virtual object) and binocular overlap with the scene image. Thus the wearer doesn't trip and fall by focusing at one depth to view virtual objects overlaid in the scene or to read displayed text while trying to navigate his walk. This is a common complaint of soldiers (who often take off the military versions of monocle HWD's to avoid disorientation). This is because viewing virtual objects against a scene image whose focal and binocular characteristics are different requires frequent reorientation and, from another source, can confuse and create "disconnect" headaches (due to conflicting accommodation-derived depth perception and binocular overlap depth perception) over time. 3-D display manufacturers state that it can take 30 minutes of more for the "disconnect" headaches to occur but the disorientation and negatively affected reaction times of subjects (users) wearing the equipment can be instantaneous.

Even to place a virtual road sign against the scene view (it must be perceived at some distance from the viewer), it is necessary to control the divergence of the light from the pixels to place the virtual image at a proper focal distance. For example, if the application is to display driving directional tips or enhanced night vision for a driver, the divergence must be controlled such that, when the driver focuses on the virtual sign, the traffic remains in clear focus.

Also, for true 3-D imaging where depth information is known for components of an image to be displayed, it is normative for spatial modeling calculations familiar to those in the virtual reality (VR) community to be used to determine the virtual location of a pixel in the image to be displayed. From the VR distance between the virtual point to be imaged and the pupil of a virtual eye (approximating in VR the relative spatial relationship of a physical point in the subject's FOV and the subject's eye), the degree of divergence of light from such a virtual point is easily calculated as is described in detail below and illustrated as the half-angle of virtual target divergence, $\alpha$, and the dotted lines, 135, in FIG. 13.

There are multiple independent embodiments, which can be used in combination, for creating the appearance of virtual distance (ignoring, here, the obvious binocular overlap, parallax, virtual object size and pixel placement which are, of course, included in the choice of activated EO component placements). Some of these methods for creating a controlled divergence of light include shaped EO components, diffraction control, multiple cone EO components, diffraction-managed divergence as well as holographic and para-holographic management of diffraction with diffraction.

Choice of BS Size:

Even the choice of BS size (such as from variety of available BSs in different layers of the plate satisfying the desired positional and light divergent criteria) determines divergence. For example, for a given wavelength, choosing to activate a moderately sized pixel will result in a much lower angle of diffractive divergence than activating a much smaller BS (e.g., in another plane of the plate yet having the same azimuth and elevation to the eye so as to fill the same perceived pixel of image).

Shaped EO Components:

Shape can also be used to effect a desired divergence. There are, in addition to the flat and triangular-solid BSs and other shaped EO components already mentioned, a wide variety of alternative BS shapes like those indicated by 107B and C in FIG. 1 for providing a desired degree of divergence related to a perceived depth and providing a diffraction control enhancement. This divergence control is useful because, without it, the eye's lens accommodation can cause these rays (representative of the center of a cone of beams of collimated light) to arrive on the retina with a larger than desired circle of confusion. One method for accommodating this lens accommodation is shown in these curved BSs (such as an off-axis curved reflector that focuses parallel light). Diffraction's contributions to divergence and problematic issues where it impedes high resolution are discussed above and that discussion continues below. Shaped reflectors can also be particularly useful where very near-appearing virtual objects are desired These shaped reflectors (BSs) can create the degree of divergence that is appropriate by selecting a BS with an end divergence within the range appropriate to a default distance and/or a divergence driven by the eye's depth accommodation for the current point of interest (POI). This latter causes the beam to focus to a point on the retina at the eye's accommodation diopter for that POI distance. Multiple curved BSs for the same pixel position can also be stacked (tightly, like spoons, with others that are invisible when not activated) in the rows, columns, and thickness of the lens for selective divergence. This aids in both providing apparent distance and, in some embodiments and applications, diffraction control.

Diffraction Control Using Shaped EO Components:

Taking advantage of the fact that there can be many layers of BS' in a plate, which permits much BS positional overlap for pixel location, a shaped BS that is much larger than the appearance of a desired pixel can both redirect itinerant collimated light and cause it to diverge or converge towards a point. For example, a large shaped, off-axis BS (with a large aperture and small diffraction) can create a desired degree of convergence/divergence (which may also be further modified by subsequent refractive elements in the light path to the eye as described). This can be used, for example, to create very narrow (and, optionally, very bright, discrete beams of light whose effective aperture (for diffraction calculation) is a relatively large BS (and, where applicable, a large subsequent optic).

Multiple EO Components: (Paired Diffraction-Control Components Described Separately)

As described above, multiple EO components can be used both for image depth placement and for more brightness. Where the image of a pixel on the retina is very discrete (either by small EO components w/diffraction control, post EO component refraction or shaped EO components) view, for the moment, FIG. 4B with the BSs sending a very discrete beam rather than the classic cone. The virtual image can still be located (even without cone divergence) using only 2 or 3 BSs for a single pixel of a virtual image. This takes a little thinking to grasp how or why this works but consider this: if only two non-contiguous (ideally maximally separated) rays of a cone of light from a single isotropic emitter reach the retina, their separation defines the circle of confusion's diameter just as effectively as the full cone. Thus it is now possible, even in embodiments where extremely discrete packets of light are emitted, to provide (e.g., where close range hand-to-eye coordination is required, such as image-assisted surgical applications, and/ or where the equipment will be worn long enough to suffer disorientation or headaches from sensor-disagreement disconnect), divergence control for the light redirected to the retina. This and other methods explained herein address this advantageous condition. Thus the degree of divergence rendered reflects the degree of divergence (sensed by the vision system's lens accommodation required) that the brain's vision system best coordinates with binocular overlap, parallax, size, etc.

Also, if the eye accommodation is at a distance substantially different from the virtual distance (for example, if 402 is nearby and the user's eyes are focused at infinity), then 402 will appear out of focus requiring an appropriate change in eye accommodation to view the virtual object. This defocus provides the proper (and particularly needed at hand-eye coordination distances) eye-lens-focus cue for 3-D perception (the binocular, cant, object perception, and parallax cues are also placed in agreement by well known worn display techniques). This should also prevent the headaches and occasional nausea in extended use that is associated with the "mixed depth signals" of binocular-only 3-D systems (e.g., lens distance perception vs. binocular overlap). It also provides the un-conflicted spatial precision needed in a hand-eye-coordination-rated 3-D display and the immersive and correct depth perception for surgical interactive display in a simultaneously shared virtual and physical image space.

Diffraction Managed Divergence:

As described extensively already, including under "Diffraction Uses and Control", degree of divergence is a vision-system cue for the distance to the POI. A single BS can, as an alternative or assist to the above, be used to create a single source of light that appears to be a central portion of the virtual cone of light from a virtual object with a depth-driven divergence. By calculating configuration criteria that employ otherwise problematic diffraction to create a desired degree of divergence, a single BS can create an expanding beam that requires essentially the same diopters of eye-lens accommodation as a real object at the virtual location.

For example, in FIG. 13 an eye, 130, has an instant vision axis that passes through a BS, 131. The height of a virtual pixel, 132, is defined by the height of BS, 131. Thus when light from an essentially collimated light source, 133, is directed in a beam, 134, towards the BS, 131, it is reflected to the eye with the essential appearance of originating from the pixel, 132. Proper control of left and right eye images, using methods well known in the art, also position, for the brain, the pixel at the same distance Δ. with binocular overlap. Disparities in binocular overlap and lens-accommodation sensed divergence result in potential inaccuracy in hand-eye coordination and possible headaches after roughly 30 minutes of use. Thus providing divergence control increases focus sharpness and sense of depth. To accomplish this in applications having moderate resolution requirements and moderate variation in the depth location of virtual images, configuration criteria are chosen that match the instant application's needs making use of the list of diffraction controls discussed above.

In one of the multiple applicable embodiments (illustrated in FIG. 13) a simple single beamsplitter, while not always the most powerful choice from the list of Diffraction Uses and Controls, can imitate light from the virtual pixel image, 132. Note that the virtual pixel, 132, which is drawn simply to illustrate what we want the reflected image from 131 to look like, is, ideally, a virtual isotropic emitter. Thus it includes rays to the eye that are parallel to the optical axis. The BS, 131, also geometrically reflects, from 134, light parallel to the optical axis that accurately emulates that parallel light. The virtual pixel, 132, also emits non-parallel light, the most divergent (greatest angle $\alpha$) to the vision system being represented by the dotted lines between the pixel and the pupil of the eye, 138. When the BS, 131, is properly selected for the dimensions of its diffractive envelope (and, of course for central vector of reflection), the outer edge of the diffractive envelope approximately coincides with the dotted lines (thus emulating the outermost portions of the virtual cone of light from 132). While the inner contents of 131's diffractive envelope will not always perfectly coincide with virtual non-parallel rays from 132, they will remain within the envelope and generally not exceed the degree of divergence, $\alpha$, of the dotted line. Thus, if the eye accommodates to view something at the position of 132, the light reflected from 131 will appear to come from 132. There are also many other applicable EO components and combinations of components discussed herein for managing diffraction both for proper focus and for 3-D imaging.

Calculation Example of Diffraction-Based Control of BS Apparent Distance:

Using the above example embodiment of a simple BS, (which will often be the lowest resolution embodiment), consider an application requiring graphical lines to be drawn as narrow as 1 point (0.35 mm) and displaying 6×9 dot matrix characters of text of approximately 8 point type (8 points*0.35 mm/pt.=2.8 mm height including above/below space). The image is desired to appear to be 30 cm (about 1 foot) in front of the wearer. $\lambda$, the wavelength, is 500 nm.

Larger text is easier to deal with so 8 point type illustrates an example that is more restrictive than necessary. Also, the choice of $\lambda$, is conservative. Smaller wavelengths in the 450 range will, of course, result in less diffraction which makes color selection/attenuation one means for adjusting the virtual image distance and also makes this a conservative illustration of the resolution and virtual distance range of this simple BS embodiment.

The virtual image of a pixel should appear to be 30 cm from the wearer's eye. This distance is shown as 4 in FIG. 13 (which is not drawn even remotely to scale to allow the BS to be visible in the illustration). When drawn to scale on a typical printed page un-enlarged, the BS will often be too small to be visible.

Assume a pupil radius, r, of 4 mm.

Thus the angle, $\alpha$, of the dotted line from the center of the pixel to an edge of the eye's iris (which defines the degree of virtual divergence responsive to the virtual distance) is:

$$\alpha = a\,\tan(r/(\Delta - 12.5))$$

which, in this example, is a $\tan(4/(300-12.5))=0.8°$ (rounded) where 12.5 mm is used to reduce the distance $\Delta$ by approximately ½ the diameter of the eye to start at the pupil.

Now, by choice of one or more of the diffraction-driven divergence control elements above, one may cause the BSs to have essentially the same degree of divergence as real objects at distance $\Delta$ would have (and thus require essentially the same eye lens accommodation and thus appear to be the same distance away per the brain's accommodation-based distance calculation). Thus, presuming that the binocular overlap method of depth perception is appropriately implemented (as is common in 2-image 3-D reproduction by locating a pixel for each eye with a difference in location commensurate with the desired illusion of distance i.e., along a path where a ray from that virtual object would have come to each eye) binocular overlap and eye accommodation will no longer disagree. This serves to eliminate the complaints of sensory disconnect headaches, nausea and feelings of disorientation.

One method for estimating the desired vertical (as drawn) height, 2y, of BS 131, is:

$$\tan(\alpha)=\tan(0.8°)=0.014=y/(\Delta-\beta)$$

$$2y=2*0.014*(\Delta-\beta)$$

where $\Delta-\beta$ is the distance from the virtual image, 136, to the plate plane of interest associated with beam 134 and BS, 131.

It can be observed by geometry that the angle, 139, between the dotted line parallel to the optical axis (and intersecting the top of the BS, 131) and the continuation of the dashed line from the virtual pixel, 132 is the same angle as $\alpha$ (since said dotted line and the optical axis are parallel with the dashed line crossing both).

Much of the parallel light from the light source, 133, will be directly reflected towards the eye in essentially parallel form between the two dotted lines drawn proximal to the optical axis and crossing the top and bottom (as drawn) of BS, 131. However, consider light reflected from the top (as drawn) boundary of the BS, 131. If the angle of diffraction from this point is equal to $\alpha$, then this additionally populate the angle 139. This effect is also obviously mirrored below the optical axis so that a cone (or other shape partially depending on BS shape) of light is created that occupies approximately the cone of photons that would come from the virtual pixel, 132, had it been a real isotropic emitter. BS' can be in any shape, square, rectangular, oval, etc. but, since they are pixels whose divergent light will be focused back down by the eye to an essentially singular point (within the circle of confusion) the virtual pixel, 132 is effectively created.

Although one calculation for the height of the BS (and, of course the obviously similar diameter for round BS', etc.) was shown above, it can also now be seen that should more diffraction be needed, for example to emulate a very near virtual pixel, 2 or 3 smaller BS' (in this particular drawn illustration of a virtual pixel on the optical axis, they may be surrounding the optical axis) will still populate the same cone or other solid area and still be resolved down to a point on the retina providing the satisfying sense of depth.

However, it should also be noted that the current invention can use only one of that mentioned plurality and it will resolve to the same point on the retina. Thus, for example to create more diffraction to create a closer virtual image, even a single BS (smaller than the area shown as 131 in the beam path, 133, crossed by the "virtual rays") from the available matrix for processor selection can be activated. Even though it may not occupy the full solid angle of the virtual pixel's cone to the pupil, the part it does subtend will focus back to the same point. Of course the smaller area of light redirection will require greater brightness to fairly represent the brightness of the virtual pixel than a larger area would and that brightness can be adjusted by the processor software by any of the methods described herein or that are otherwise used including a longer LDE activation, stronger LDE charge and/or multiple cooperating LDE's.

Thus, when the subject is viewing a physical scene object at a distance Δ, the instant accommodation of the eye's lens will now (in this example by real-time selection of approximate BS size from layers of options) also accurately focus the BS light to a fine point on the retina. Also, a desired perceived depth of the displayed image in the scene is selectable by choice of LDE size (thus controlling diffraction). Also, should the subject focus far from the chosen virtual depth, the image would become blurry which is one component of the subject's perception of the virtual depth. There are approximations in all eye calculations due to its complexity and variation between subjects. However, there is room in the variables used here to substantially adjust the conditions to manage the degree of BS divergence to advantage based on alternative assumptions and calculation methods.

Calculating Diffraction

As described widely herein, the software, when attempting to create a virtual pixel at a given distance should ideally control It is also possible. as discussed herein, to limit the light reflected from 131 to emulate essentially only the parallel light from 132 and, in fact, only a beam along the optical axis narrower than the pupil. Thus this displayed image is less vulnerable both to pupilary diffraction and to minor defocus since only a tiny and uniformly central portion of the virtual cone of light from the virtual scene enters the pupil. This effect, enhanced by selective cone-ray display and other options, is also advantageous for providing a worn display device for those with cataracts. It is also applicable to improving their view of the natural scene with a projected natural scene captured by a forward scene camera.

Real-Time, 3-D Image Capture with Pixel Depth

Although two scene cameras, ideally one at each lateral extreme of the glasses frame, can be used to capture depth information as is understood by those skilled in the art and applicable to the current invention, an additional means also exists. That is, in embodiments with ET cameras mounted (e.g. 509 in FIG. 14D) in the assembly, the distance, (normally along the instant cyclopic vision axis) to the instant POI may be calculated from the intersection of the two eyes' vision axes as recognized by the camera-captured azimuth and elevation of the two eyes.

Thus, as the subject's eyes saccade around the scene, the calculated range for the instant cyclopic vision axis identifies the distance to a point in the scene. This calculation can be done a number of ways by those skilled in the art including a nasal mounting for the scene camera (in the frame of the glasses just above the nose) so that the effective origin of the scene captured image is essentially at the cyclopic origin (between the two eyes). Thus, the instant cyclopic vision axis associated with the current subject fixation identifies a pixel in the captured scene (many ET systems normally ignore 60 Hz eye vibrations and only consider more significant moves of the eyes thus reporting significant temporal fixations). Thus, an approximate depth value is known and can be stored to build a 3-D image. Even in a very active real-time environment where the image moves too fast for a built depth map for the current image to be of great use, the eye's current view displayed from the plate can provide the appropriate depth perception for essentially the foveal sub-FOV where the subject is looking by providing the appropriate light divergence and binocular image placement controls described herein.

Shutters and all Other Transmission Attenuation Components:

Also, various applicable embodiments of the current invention may include or do without shutters to temporarily block the natural view of the scene (which herein is understood to refer to the view of whatever is before the eye such as a landscape or other POI), a view of the scene overlaid with the displayed image, or a displayed image registered with elements of the scene view as if the displayed image and the scene were one reality simultaneously viewed. Any combination of these elements can be added to the fundamental elements of the most basic embodiments without amending applicability to the current invention.

In most of the illustrations in FIG. 14, the outline of the dimming array, 142, (be that an LCD, shutter array or other conditional or partial transmission method; these being considered functionally synonymous herein) is a dotted line emphasizing that it is not necessary for general use. However, the shutters (referring to all the above light attenuation components) provide extremely useful options for many applications. Placement of shutters in FIG. 14 are representative of only one of the many applicable embodiments. For example, in FIG. 14A it could be, for many applications, between the lens, 140, and the BS, 131.

Figure 14A:
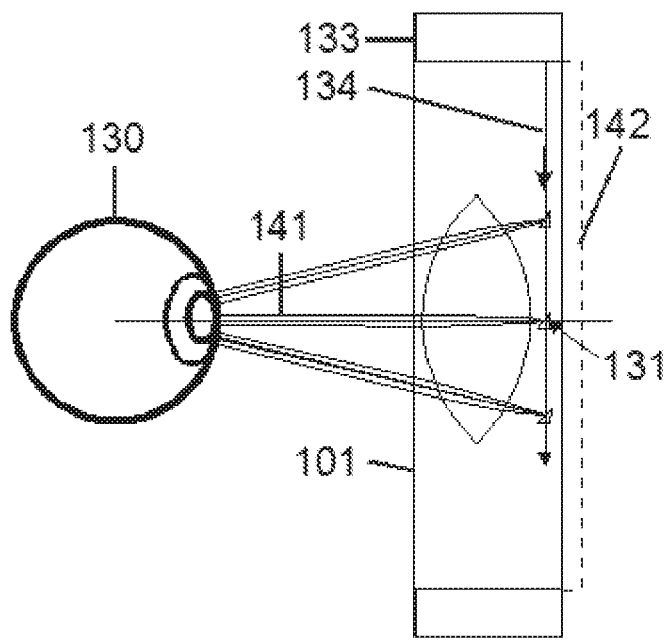
FIG. 14A illustrates fixed global correction of certain diffraction elements using a lens.

General Removal of Unwanted Scene Information:

Unwanted scene information may include an abusively bright daytime sun that would overpower a display area's ability to compete. In addition to a general area filter layer (e.g. sunglasses layer), this may be more specifically reduced (favorably biased) by briefly for a portion of a cycle, or partially blocking only the defined areas transmitting extreme brightness from the scene light (headlights at night, sun and glare during the day). This is accomplished with the addition of shutter arrays or LCD layers (the terms "LCD" or "shutter array" will refer herein to any of the numerous media capable of attenuating the amount of light transmitted through areas of a curved or planar area). These will typically be located over the distal plane of each plate (furthest from the subject). Examples of shutter locations may be seen as 142 in FIG. 14. However, although the shutter array is shown distal to the eye in FIG. 14, it can be placed in a number of orders with respect to the other components. E.g., in FIG. 14A Area-Specific Removal of Scene Information:

As summarized above, light transmission can be shutter or LCD-attenuated selectively thus affecting only excessively bright areas or light from other undesired locations. This allows the scene to be seen brightly without the blinding spots. Additionally, a dark background can be applied to an area where the displayed image needs to stand out over the scene. E.g., a rectangular blocked area behind a block of displayed text. Also, a narrow darkened area around text makes it easier to read.

For example, the pixels of a scene camera's image are registered/mapped to at least approximately associate each scene camera pixel location with the specific shutter(s) in the array that transmit light from the scene object for that pixel. Without range data or ET information, this requires approximation (and, typically, providing a darkened border around the unwanted light to accommodate that approximation) since light from scene objects at different distances will enter the eyes through different vectors. Thus, some embodiments will assume a moderate distance or a feathering of the effect to broaden the shading without fully blocking areas that should not be dimmed. An optional enhancement involves the addition of ET cameras, normally mounted in the frames of the glasses for worn embodiments, to estimate the approximate distance to the instant PO. Based on this distance, the approximate diameter of the cone of light from the POI passing through the shutter is known and this can better define the area to be blocked around the center of the bright area.

In addition to providing bright vision at noonday without the direct glare of the sun itself (via temporal transmission interruptions via the brief and/or intermittent closing of shutters where undesirable light is being transmitted), it is also applicable to dimming bright headlights for night driving.

Balancing of Scene and Display:

The shutter array (or other light attenuating elements included with the term) may also be used to adjust the ratio of brightness between the two views either by partially closing or, for on/off switching elements/shutters, remaining open for a shorter period for the view whose brightness is to be diminished. This brightness control by period limits is, of course, a common practice that is only practical when it is effected quickly enough to be perceived as reduced illumination rather than a series of flashes.

Alternating Images Using Shutters:

These shutter arrays are also useful for providing rapidly alternating scene and display images. In one embodiment a full cycle can be defined as being in two segments. In one segment of time the shutter is closed and the EO components direct light to the eye and in the other segment the shutter is open, allowing the scene view to enter the eye while the EO components may be turned off. and the This alternating image is particularly useful in embodiments where (and if) even the extremely small refractive effects on the scene image passing through the plate are not acceptable. While individual pixels of the display image are ordinarily intended to supersede the background (scene view), for those applications where it is desirable, the scene and display image may share different "slices" of time (fractions of a cycle). Thus, when the scene image is transmitted, the BS may all be at the default (non-reflective/refractive) RI. Of course, the array may also be used to turn off the scene view for an extended period of unimpeded display viewing.

Hyper-Invisibility (General or Near-EO Specific):

Blocking the scene during a discrete display cycle (when the shutters are blocking the scene and the EO components are diverting light) also prevents any backscattered or backreflected light from EO components from being visible by others. While backscattering and backreflection is minimal, this applies to certain military applications.

Vision Correction and/or Light Divergence Control:

There are also a number of applications that benefit from additional lenses. When the subject has an astigmatism and/or presbyopia/hyperopia/myopia, corrective lenses may be added to the assembly in a number of positions with respect to the BS arrays and switching arrays, if any. There are also applications for embodiments with physical lenses, EO lenses, SLMs and combinations thereof (all of which are considered functionally synonymous and used interchangeably herein) that benefit from the controlled divergence of directed light. This is supportive of embodiments for fully depth enabled perception and for very discrete packets of light (very thin and/or minimally divergent/convergent).

Fortunately, the diffraction of the EO components is eminently predictable based on which EO component is selected in real-time, its known size (which is the effective aperture in embodiments where all of the BS is activated), RI and coatings, etc.

Thus, for example, a single lens between the subject and the EO components that direct the light can be simultaneously useful both for precisely correcting vision (even using existing prescription glasses) and for precisely controlling beam collimation.

Figure 14B:
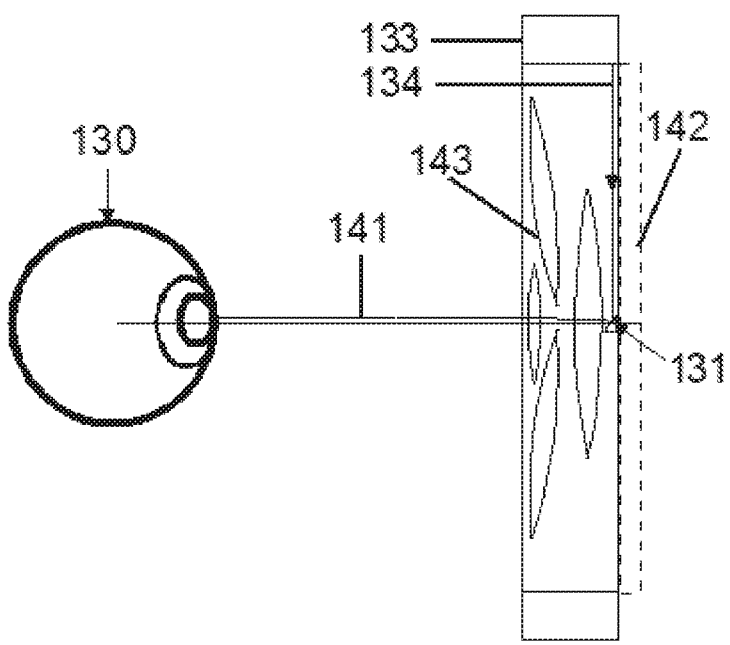
FIG. 14B illustrates fixed global correction of certain diffraction elements using a plurality of lenses.
Figure 14C:
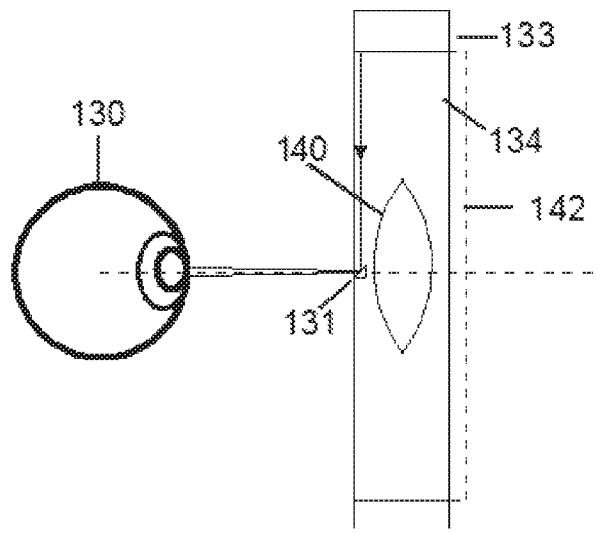
FIG. 14C illustrates fixed global correction of certain diffraction elements using a lens.
Figure 14D:
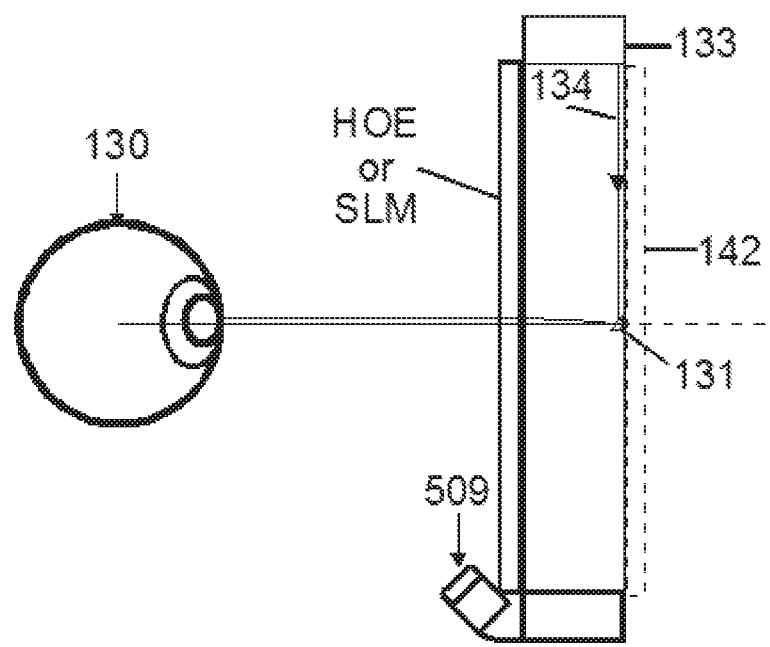
FIG. 14D illustrates an embodiment using a spatial light modulator applicable when the user is viewing both the display and the scene but in the presence of a shutter plane or other dimming means, 142.

FIG. 14D is one illustration reminding that any of the lenses displayed in FIG. 14 may be replaced by SLM's or HOE's. The laser beam(s) for HOE applications's are not drawn. Also, for embodiments using HOE's, the angle of the focusing element, Proximal Lenses, Lens Arrays and SLMs:

In FIG. 14A the proximal lens, 140, is between the BSs and the eye (the proximity reference point is the retina). The lens, 140, may be a fixed, permanent lens for vision correction. These corrective lenses may be part of the plate or precisely clipped to the rest of the assembly. Or, as shown in FIG. 14A, the proximal lens may be in the plate. This option allows the display to be "clipped on" to existing prescription eyewear. This also allows the assembly to change from person to person (even when each person has different prescription glasses) or to be sold out of the box to work with any prescription. This can, however, require an additional configuration step to spatially align the formerly separate components.

One advantage of this proximal lens embodiment is that both the BSs and the scene provide appropriate divergence and proper and jointly aligned virtual/scene origin of light. That is, all the light seems to be coming from the same scene view with the appropriate vector and distance-driven divergence. Thus, the images flow through the lens together for natural correction of a combined virtual and scene image.

Thus, in this embodiment, the shutter array, 142, is not necessary to separate the images. However, if the extremely slight refraction of the RI-adjusted BSs causes noticeable distortion, the shutters can separate the two images temporally.

EO Proximal Lenses:

Lenses Between the EO Component and the Eye.

Of course, the lens, 140, can also be an EO element in FIG. 14A, or an arrangement of lenses as in FIG. 14B, or an SLM as in FIG. 14D). Thus, the proximal lens, 140 in FIG. 14A may be a permanent lens or an EO lens (or lens replacement such as an SLM, GRIN array, etc.) either to correct the vision, or to adjust display light divergence, or both. Although a proximal lens embodiment like FIG. 14A does not require it, the shutter may be used in any of the embodiments to facilitate multiple uses for the same lens. For example, the lens may be an EO lens or SLM assembly and, in the first half of a cycle, RI adjusted to correct the vision while the shutters are open and the BSs inactive. Then, in the second half of the cycle, the RI is differently adjusted to control the divergence and/or diffraction from the other EO components that are instantly active.

Permanent Proximal Lenses:

Also, the lens, 140, of FIG. 14A can be a permanent lens for prescription correction and the BS and/or other EO light direction components must then be selected (from a range of those available in real time and/or at manufacture) to have a divergence that is precisely corrected by the fixed corrected lens. Thus, for example, a myope would use smaller BSs (resulting in larger divergences) than a hyperope to light the same row/column pixel (ignoring astigmatism) in this type of embodiment. The shutter array is not necessary here since the distortion is minimal and, for the most part, only present where the display image is intended to overpower the scene view. However, the shutter array may be used both to limit and balance the intensity of the scene and display images and to provide separate timeslices so as to isolate the two sets of images in time (thus eliminating even the minor potential distortion of the scene by the BSs or other EO components).

FIG. 14D illustrates another location for a SLM. One of the great advantages of the SLM is that it can theoretically replace the other SLM components (serve the same function that they do) in many embodiments and applications and can do so while providing a different RI for each instant-active BS.

FIG. 14B illustrates an arrangement of EO lenses, 143, (replaceable by SLM's) that are independently activated as needed for some or all of a frame cycle. Thus, at one point in time during a display cycle (when the scene is blocked) selected lenses are activated to a degree appropriate for the currently activated BS'.

A shutter layer, 142, may also be used to balance the brightness of the two images. This balance may be adjusted manually (e.g., a hand adjusted potentiometer on the glasses read by the software responsive to sensors e.g., an ambient light sensor) or responsive to configuration criteria for brightness and target or general ambient light sensor data.

Multiple Refractive Components: It is advantageous to have more than one refractive component (of the many applicable types of refractive components available) in the path of a directed beam, e.g., 141. In order to have a large enough aperture not to add significant diffraction and edge aberration to a beam, the radius of curvature needs to be large enough to provide this aperture. However, many refractive components, like EO lenses and SLM's have limited RI shift. Thus, activating more than one of them in the path of the beam provides greater refraction without requiring a tiny lens, many more of them to cover the same area and without creating unwanted diffraction and possible edge aberration.

FIG. 14E illustrates an arrangement of EO lenses, 143 (replaceable by any combinations of SLMs, GRIN EO lenses, diffraction gratings, etc. with effectively refractive properties), that are selectively software activated to condense/expand and/or redirect light from at least one EO component, e.g., the BS, 144. The light, 134, from essentially collimated light source, 133, actually reflects from activated BS, 144. However, due to the factory-known diffraction of BS, 144, at the known wavelength of light, 134, (which was part of the criteria for selecting this particular BS from the software-provided array of available acceptable BSs to choose from) the formerly collimated light, 134, expands in width prior to being condensed (made less divergent or more convergent) by selectively activated lenses, 143. Thus, to light a pixel from those available and make it present a pixel image of a desired size at a desired distance, the software selects the EO components that are known to (or at calibration time did) create a beam along a preferred central vector with a desired degree of divergence/convergence.

Although, to fit on a page, the perceived pixel image, 145, is very near, this is an excellent embodiment for producing a very small pixel from a very small EO component (here a BS) and yet have the pixel come into focus in the subject's eye as if it were coming from far away. The small EO component means a larger divergence that a larger EO component would have created making the pixel thus lit appear near. This is effectively mitigated by the selected condensing lenses, 143.

The converse is also true, a large pixel, e.g., from a large BS used to light many pixel areas at once with its large area (extremely useful for image areas with adequate color and brightness continuity such as areas of walls, white paper background, etc.) can be made to come into focus when the subject's eyes are accommodated to a far distance and yet have the proper divergence not only for proper focus but for depth perception at edges as well. Ordinarily a large BS would result in very small divergence presenting a focus and apparent distance applicable to a far POI. This can be corrected by activating an expanding refractive component (e.g., a concave EO lens or expanding SLM area, etc.). An example of a concave EO lens is shown located in the plate proximal to the eye and highlighted with a dotted outline. Of course, there can be many and larger concave and convex lenses and other refractive components than are illustrated.

Where the relatively minor refraction of the dynamically refractive components is a problem, a shutter array, 142, may be used to create two images in cycles: one with active light direction and refraction components and a blocked scene and the other with open shutters and an otherwise transparent plate as all potentially refractive and reflective components have the same RI.

Figure 10:
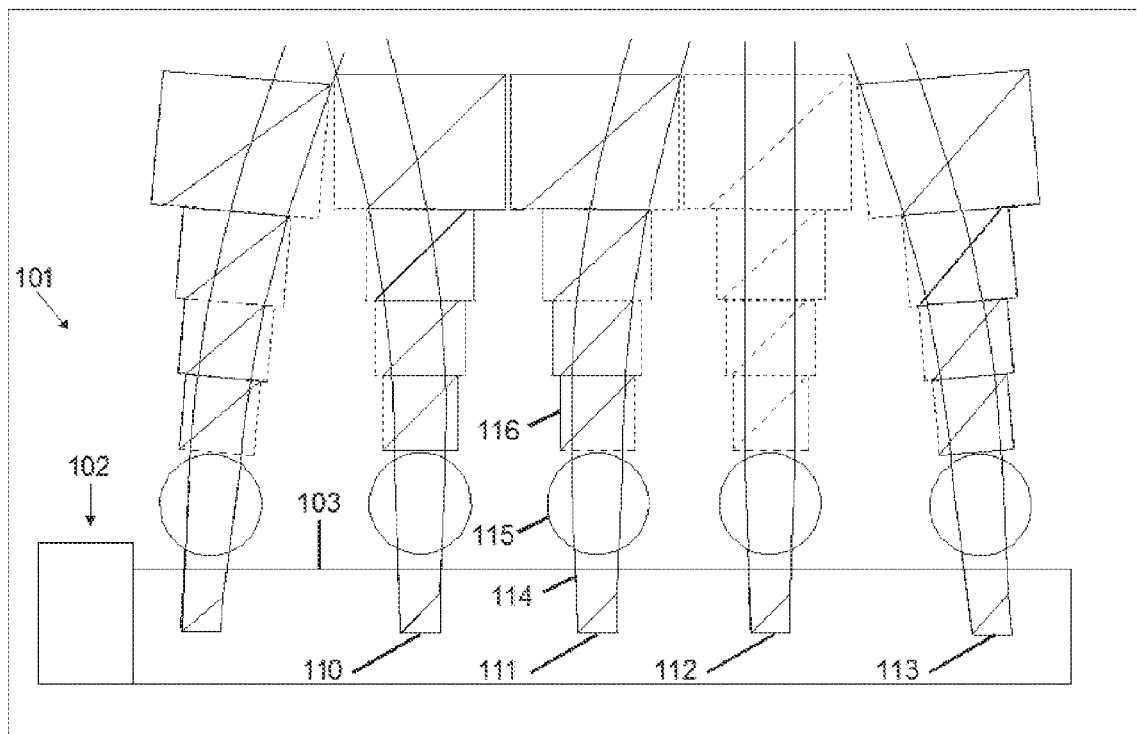
FIG. 10 illustrates one embodiment using a spatial light modulator (SLM).

Directional Proximal Lens Assembly:

Another form of proximal lens assembly is shown in FIG. 10. The eye, not drawn, is above and looking downward through the plate, 101, and, thus, receiving the light directed and modified by the elements in the plate (e.g., 111, 115 and 116). Here, at a pixel level (111 is an example of a BS representing a pixel or, in the case of a multi-BS pixel as illustrated in FIG. 4, part of a pixel), the pixel's convergence/divergence/collimation is corrected by at least one lens, 115, (which can be a GRIN, SLM, spherical lens or any practical focusing material). The light is further directed (the BS, 111 and lens, 115 already provide direction) by the subsequent refraction of selected ones (the ones currently electrically activated) of the shaped (here prism shaped) EO BS' like 116. This permits divergence control, control/use of diffraction and numerous ray direction options from a single BS. Of course, though the EO components like 116 are drawn to direct light left and right, it is obvious that rotation of any of these elements 90 degrees would redirect light into and away from the page instead of right and left in the page. Thus, combinations of directional refractors can direct the light in any direction.

Of course, all of the components drawn from the spherical lenses, e.g., 114, and above can be applicably replaced by one or more SLM's or other light directors. However, FIG. 10 provides a good and applicable illustration of the sequential redirection and light processing approach.

This embodiment can use planes of stamped or printed arrays (a cross section of which is shown) of shaped EO lenses, 115, and prisms, like 116, in the path between the BS and the eye. In one of many manufacturing options, the BS, 111, would be in one printed layer followed by a layer containing (along with conductor connections) the lens 115. Both layers are surrounded by media having the default RI. Similarly the next layer would contain the first triangular director encountered followed by a layer containing the next triangular director encountered (116) and so on.

The default RI of the elements are effectively identical to the surrounding area until selected groups of them are simultaneously activated, along with a corresponding BS to begin a dynamically directed route, to adjust the divergence to correct for the degree of diffractive-induced divergence and/or to effect a chosen divergence for depth perception.

Programmatic selection of locations on planes to be activated determines the refraction of and also optional redirection of the beam.

One BS providing multiple pixels of image: This allows a single BS to represent multiple pixels (each with a unique vector) in the same "frame" of display. For example, with adequate source illumination from the light source, 102, supportive of time-division imaging in a single frame (perhaps the $\frac{1}{30}^{th}$ of a second associated with 30 fps), the BS, 111, can paint x pixels of the display image in x fractions of a frame period by changing the selection of activated elements and their degree of charge as well as optional changes in wavelength, etc. between the x sub-sessions of the frame).

Distal Lenses, Lens Arrays and SLMs:

In the distal lens example of FIG. 14C where the lens, 140, is for correction of subject vision problems, it can be seen that the BS, 131, will direct a beam that, unlike the embodiments of FIGS. 14A and B, does not enjoy the corrective benefits of 140. The scene is, however, fully corrected. This is acceptable for some applications since the light so directed can be discrete (thin) and near collimated and, in that example, is less sensitive to defocus (the circle of confusion is smaller for a given mismatch in instant subject plane and POI distance than a conventionally full cone of light that must be focused to a point). However, an additional embodiment represented by FIG. 14C incorporates through software a virtual corrective lens (below).

Shutters: The optional shutter array, 142, offers further image enhancement: As described above, it can attenuate both the general brightness, brightness of key areas and/or balance the brightness of the scene and the display. Its presence further allows the creation of timeslices (ex: 30 cycles/second in which both views have a fractional slice of each cycle) in which an alternating image reaches the eyes. In one timeslice, for the scene view, the shutters are open and the BSs are inactivated and, in the next, the shutters are closed and the BSs are activated for the display view.

Hybrid Lens Embodiments:

Internal Dynamic Refractive Element(s):

In FIG. 14F the distal side of the plate, 101, is curved to create refraction of the scene view with a concave lens for correcting myopic vision (the eye, 130, is slightly elongated). Of course, a fixed lens can also be attached distal to the plate instead of curving the distal side of the plate. Also, the shape of the curved distal side of the plate, 101, would also be convex for hyperopes and the refractive component, 146, would create divergence or reduce convergence e.g., a concave lens. A distal shutter array, not shown, adds the ability to, in addition to brightness control and balance, create two alternating images in each cycle. The dynamic refractive component, here an EO lens, 146, is invisible (as is the concave lens, 149, which is shown as inactive in the illustration) during the scene cycle when the shutter is open. In the display cycle, it adds desired convergence, varied by charge amount applied, etc., to the directed light 141.

The entering rays from the scene, 147, are first diverged by the distal side of the plate, 101, and then reconverged by the refractive component, 146. However, as can be seen by the dotted line, a slight shift occurs. Where it is problematic, this shift can be eliminated with the use of more refractivity in 146 and a proper activation of 149 to return the ray to its entry vector.

The entering display light, 134, from light source, 133, is reflected by BS, 131. Its divergence is mitigated by refractive element 146. This is useful for several applications and allows very small pixels (created by very small EO components having significant diffraction), to produce very discrete packets of light, rather than a full cone image, and seem to the subject to be very far away as described more below.

The light, 141, however, is not yet corrected for the subject's prescription. For some vision problems, the above is still adequate, especially since the light, 141, can be very discrete (narrow and often collimated) and somewhat resistant to the visible evidence of defocus. However, for those more significantly challenging environments, the light directing elements like 131 need to be selected to provide a virtual-lens corrected view which is described further below.

Internal Fixed Refractive Element(s):

For embodiments where the display image needs to be very high resolution (e.g., very small BSs with high diffraction-driven divergence) but the image is to appear distant (minimal divergence), FIG. 14F with either a fixed or dynamically refractive component, 146, (in the instant example an ordinary convex lens with RI distinct from the default RI of the other plate contents) provides another accommodating embodiment (beyond those above and below).

Obviously, for embodiments where the display image needs to be created with very large BS' and yet appear very close (the less than ideal condition), this approach works well in reverse. Here, the distal side of the plate, 101, is convex and the refractive component, 146, is either concave or it is inactive during the display segment while the concave element 149 is, instead, properly charged. As above, the slight offset created may be offset by including an additional active lens (e.g., a more proximal convex EO lens along with RI balancing to return the ray to its entry vector).

For a subject with no corrective glasses or having a corrective lens affixed/clipped to the proximal side of the plate, the assembly of FIG. 14F may also be viewed as having all fixed (some potentially off the shelf) refractive components, simplifying the design, software detail, real-time image processing and manufacturing overheads while minimizing any need for shutter arrays (except for some cases where even the very minimal BS distortion of the scene view near pixels that need to be overpowered by the display view anyway is problematic). The refractive component(s) 146 and, optionally for minimization of offset, 149 essentially offset the refraction of the distal side of the plate, 101, leaving a net effect of reducing divergence of light from light diverting EO components.

Making 146 more refractive than drawn, either by increased charge or smaller radius of curvature than the illustration, such that the dotted line meets the distal face of 149 coincident at the surface with the un-dotted entry vector, 147, and then correcting the dotted line to rejoin the entry vectors direction from that point by the refraction of an activated 149, mitigates shift offsets of entering light.) Thus, since 146, optionally combined with 149, defines a net convergent refractive system (light passing through them becomes more convergent), the EO directing component, e.g., the BS, 131, will have its natural divergence mitigated. This allows, in many embodiments, even more room for high resolution with much flexibility. (Of course, 149 and 146 can also be combined into a single solid lens but the potentially lesser refractive maximums may make this untenable for some applications.

For example, inexpensive fabrication or tiny optical parts by stamping, printing, etching, etc. make miniaturization almost a non-issue for many resolution ranges. Having too much resolution is rarely the problem so the ability to have extremely small EO light directing components, like the BSs in FIG. 14F, whose higher diffraction is minimized by a subsequent convex system with a very large aperture, is helpful. Then, the EO light direction components, can be selected in real-time and/or manufactured based upon an end light divergence tolerant of very small pixels and improved by the converging proximal refractive system.

Of course, making 149 and/or 146, dynamically diopter adjustable (e.g., EO lenses and SLMs) adds flexibility and redirection options for software to capitalize upon.

If the minimal distortion of the BSs of the scene view is a problem and a shutter array is for some reason undesirable, virtual corrective lenses (described next) may be the best solution.

Virtual Corrective Lenses:

Treating Potentially Multiple Symptoms Simultaneously:

In multiple embodiments the scene view is largely or completely provided by a displayed image of the scene as captured by a scene camera which is, at default, normally aimed along the subject's permanent cyclopic vision axis (which originates essentially between the eyes and follows a vector normal to the coronal plane). For some of those embodiments the natural scene view (light from the outside penetrating the plate) may be, by design or instant user preference, substantially diminished or blocked altogether. This includes applications providing:

Convenient and invisible worn display options for viewing images where at least one of the images displayed is the instant captured scene view.

Better vision for cataract patients without interference from ambient scene light.

More light for older subjects with diminished retinal sensitivity.

Better night driving vision by removing headlight-blindness (increasing dynamic range while eliminating whiteout) while also increasing general illumination as described herein.

Providing all of the above with true, natural depth perception even though it is produced by a display device.

Potentially simultaneous treatment of other conditions including myopia, hyperopia, astigmatism and presbyopia.

These embodiments may be used simply to provide a worn or standing video display that requires no glasses, provides a true 3-D image and/or improves vision, They may, of course do all three at once. All of the above applications and others use the current invention's EO components and redirected light to create a display image and all can use conventional lenses to correct the subject's view of the displayed image (either custom lenses or the ones the subject normally wears as described above). Alternatively, however, in all of the above cases, the display can be software amended to display the image in a form recognized by a subject with a vision impairment as a corrected image by creating virtual corrective lenses.

Myopia and Hyperopia: Focus-Based Control

Some conditions, such as myopia, hyperopia and presbyopia can be corrected simply by controlling the divergence of the EO components by any of the numerous methods discussed above for 3-D imaging and for diffraction control. This is because hyperopia, caused by a shortened path in the eye and/or a flatter than normal cornea (where ~70% of the eye's refraction occurs) requires additional refraction (more diopter fractions) to bring the image to a focal point early— since the retina is being encountered prior to the effective focal point. Similarly, and inversely, the myope requires that his vision system's effective diopters of refraction be reduced to bring the image to a focal point later since the retina is further away (due to an elongated eye) or due to an excessively curved cornea. Presbyopia requires similar adjustments responsive to the instant POI which may require refractive adjustments in either direction.

To emulate a given prescription for these conditions, a general shift in the vision system's focal range is the solution. This is normally effected by the insertion in the vision path of a concave lens (for myopia, to increase the divergence of entering light so that it doesn't reach a focal point until the light has reached the retina in the elongated or under-refractive eye) or a convex lens (to decrease the divergence/increase the convergence of entering light so that it reaches a focal point faster to correct the shorter or over-refractive eye).

These general adjustments can be made in a different manner (backwards), as in the current invention, by creating light from a viewed display whose divergence is already selected to be appropriate for both the virtual distance and the subject's vision system (or, where desirable, just one of the two). For the myope, viewing, for example, an image of a large virtual movie screen 2 M feet in front of him, the desired divergence of the light is calculated based on the virtual POI distance (here, 2 M) using calculations similar to or having adequately similar results with those described above in the discussions of diffraction managed divergence, image placement and 3-D imaging.

The adjustment to this POI-driven divergence for the subject's vision system is not limited to a single applicable method. Some implementers will prefer calculations, well understood by those skilled in the art, to appropriately increase or decrease this divergence to match the simple additive divergence or convergence of the prescription lens. Others will simply provide an additive value (or an array of range-driven values) to be added to the POI distance. For myopes they will be negative numbers to achieve the more-easily viewed divergence associated with a nearer object. (This adjusted value that uses the POI distance does not, of course, change the POI distance that is used for binocular overlap considerations.) Thus, when the divergence selection logic chooses a "POI-driven" divergence, its result will be increased or decreased for myopes or hyperopes respectively. E.g., for a hyperope, a positive value appropriate to the subject's prescription, D', would be added to the POI distance before selecting the EO component for that distance.

To tune closer to a range, the distance addition/subtraction value may also be an array of values each keyed to a distance or any distance adjustment algorithm e.g., $D=P*d'*a$ where D is the distance used in the selection of EO elements, P is the true POI distance, d' is a value (>1 for hyperopes and <1 for myopes). In either case, the desired divergence is accomplished by any of the methods already discussed.

Self-Adjustment: The subject can also, optionally, manually adjust this with an adjustment screw or knob or, using a PC having communications with the processor(s). Here, the subject views the image while adjusting a knob, computer slider or other approach for communicating a degree and direction of change. As the adjusted value increases or decreases, the adjustment factors just discussed and others are increased or decreased causing the instant display image to reflect the changes until a satisfactory accommodation range is accomplished.

Strabismus:

Many strabismics can be coached to train the lazy eye to stay in coordination with the strong eye. However, the time and caregiver support required is often expensive and prohibitively time consuming. Also the treatment is intermittent and thus often ineffective. The primary current treatment options are 1) chemically paralyze the working eye to make the lazy eye exercise, 2) Numb the working eye to force the lazy eye to practice tracking or 3) block the strong eye (e.g., a patch) to force the lazy eye to behave. An ET-enabled embodiment of the current invention can also be used to treat strabismus without these extreme and cosmetically prohibitive measures by training the user to control the "lazy eye" with immediately responsive negative feedback thus forcing the brain to keep the straying eye on target. It is normative in strabismus for the strong eye to provide the dominant image to the brain when the lazy eye strays. While this does allow the patient to see, it robs him of the negative feedback needed to train himself to stay on target—which is why doctors are paralyzing good eyes.

Figure 12:
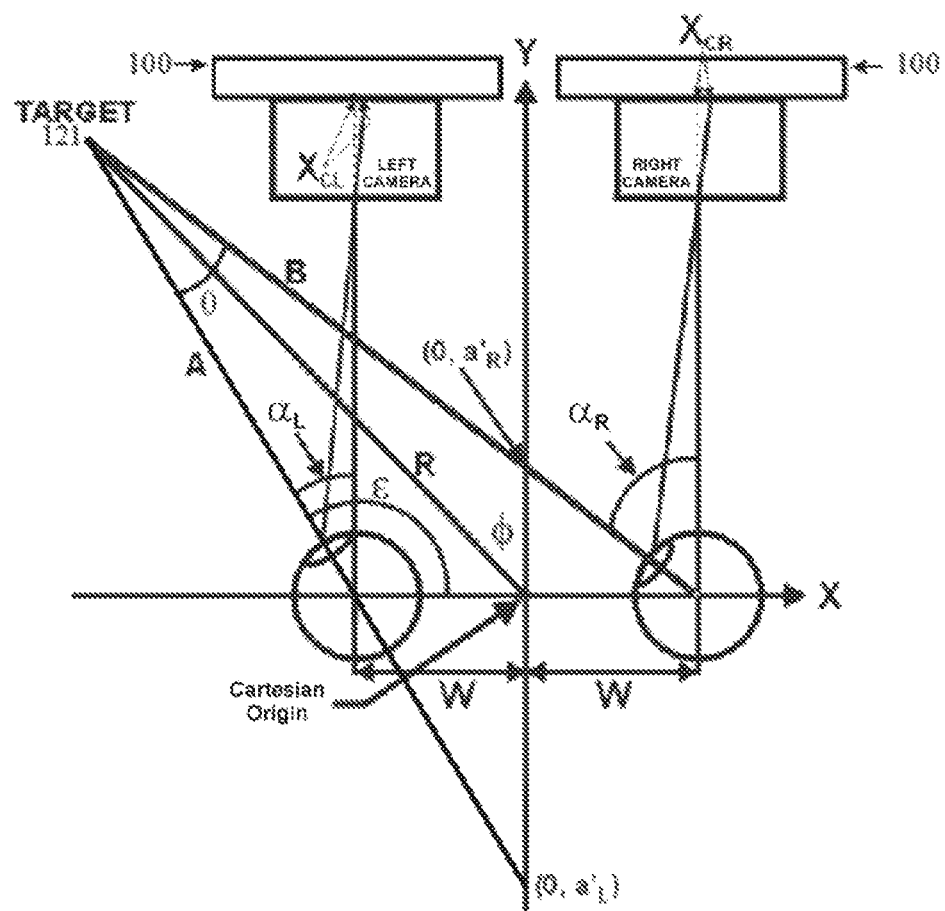
FIG. 12 illustrates some of the geometry associated with an eye-tracking assembly.

The example embodiment sketched in FIG. 12 is not spatially proportional in order to allow the distant target to fit into the drawing. Also, the plate assemblies, 100, are drawn only as dotted lines. Their positions can be imagined since the ET is normally attached to it or the rims that house it. If FIG. 12 is thought of as a top view (looking down on the wearer) then, if the ET is mounted just below or at the bottom of the plate, the plate can be seen as just above the CCD, 121. Of course, ET's can be placed in a number of places around the eye's normal vision area but this is exemplary. Normally, at least one of the lines A or B will pass through at least one of the plates, 100. Thus, the plates, 100, and cameras (normally the combination of the CCD, 121 and the lens (122) will normally be much further from the target (point of interest, POI), 123.

Thus, the ET assembly, powered by onboard battery not shown, in this embodiment is shown as processing element(s) and 2 cameras, one for each eye (other forms of ET are also applicable to the current invention). Both cameras are operatively connected to a processor. This connection is by simple wire in the preferred embodiment (where an onboard rather than a remote processor is used for locally used data such as this distance calculation and response; wire and processor not shown), or wireless via a frame-mounted battery powered transmitter on board, not shown, to a processor which provides response commands by return transmission. Regardless of which primary processor approach is selected by implementers for the current invention, the ET is imaging or otherwise measuring the attitude or position of each eye from its location largely outside the area of each eye's likely optical axis.

For example, in embodiments where the ET captures the position of each eye (typically relative to the base position of the eye, i.e. the position when the user is looking straight ahead), this lateral shift can be identified as values $X_{CL}$ and $X_{CR}$, as labeled in FIG. 12. These can be ascertained by the magnitude of image displacement of the center of the iris (or other eye landmark) on the camera's CCD (as illustrated with offsets labeled $X_{CL}$ and $X_{CR}$ from its base position. Said processor then calculates the intersection of the optical axes of the two eyes, 123 (they intersect at the patient's approximate point of focus, i.e. his point of interest). The distance R (as labeled in FIG. 12) from between the user's eyes to said target (point of intersection, 123) is calculated. Anyone skilled in the art can, of course, calculate the value R based on trigonometry and the drawing in FIG. 12, which is one acceptable, but not the preferred, method. In this calculation embodiment, the distance is simply the value of R. Although this can be calculated as:

$$\alpha_J = \sin^{-1}\{[f\psi(x_{CJ}) \pm X_{CJ}(f^2 + X^2_{CJ} - \psi^2(x_{CJ}))^{1/2}]/(X^2_{CJ} + f^2)\}$$

where $\psi(x_{CJ}) = [(DX_{CJ} - f(W_J - W))/r]$ and $J = L, R$.

$$\tan \alpha_L = (R \sin \phi + w)/R \cos \phi$$

$$\text{and } \tan \alpha_R = (R \sin \phi - w)/R \cos \phi$$

Thus: $w = \tan \alpha_L R \cos \phi - R \sin \phi = R \sin \phi - \tan \alpha_R R \cos \phi$ $$-2R \sin \phi = R \cos \phi(-\tan \alpha_R - \tan \alpha_L)$$

$$\tan \phi = \frac{1}{2}(\tan \alpha_R + \tan \alpha_L)$$

$$\phi = \tan^{-1}[\frac{1}{2}(\tan \alpha_R + \tan \alpha a_L)]$$

$$A = 2W \sin \Gamma_R/\sin \theta \text{ where } \theta = \alpha_L - \alpha_R$$

$$\Gamma_R = \pi/2 + \alpha_R \text{ and } \Gamma_L = \pi/2 - \alpha_L$$

Thus: $A = 2W \sin(\pi/2 - \alpha_R)/\sin(\alpha_R - \alpha_L)$ and (by law of cosines): $R = (A^2 + W^2 - 2WA \cos \Gamma_L)^{1/2}$ it is, in practice not the preferred embodiment because of the significant and sometimes undocumented effects of ET assembly lenses as angles changed, actual magnifications once installed and the difficulty of placing elements in perfect form for wearing on a person's uniquely shaped head (all heads are different). Also, of course, it is normative for many ET devices to reduce the image on the CCD with the lens. Thus, the relative $X_{CL}$ and $X_{CR}$ must normally be used for the spatial calculation which is an adjusted value representative of the lens-unreduced $X_{CJ}$ (where J is L or R for the left or right eye as is appropriate) shown in FIG. 12. For example, when the ET software operating on the processor identifies the pixel associated with the instant center of the iris image on the CCD, the number of pixels of offset from the pixel associated with the base position will be calibrated to represent the distance between the locations of the instant center of the iris image and the base position of the iris image.

Subsequent specific distance reading calibration was always necessary because even the slightest asymmetry of the face of the wearer or variance of the height of an ear or a slight misalignment of a lens from the alignment presumed in the trigonometric calculation, etc. introduced error. Since calibration improved results so much, it was found easier to base the distance calculation itself on a single distance calibration which serves to correct all alignment and positional errors at once.

Thus, the now described preferred embodiment was found to greatly improve the accuracy beyond simple trigonometry, to bypass the trigonometric calculation above completely and simply have the user look at several known distances (prompted by the system either using a PC connected to the ET during setup or by prompting the user on the display of the current invention directly e.g., prompted by the onboard processor) for a couple of seconds each to make a table of at least distance vs. captured $X_{CL}$ (and for the right eye, $X_{CR}$). This short table (which in practice has in each record a pixel location (where the center of the pupil was observed) vs. a distance associated with that pixel value) can then be curve-fitted by normal means (including the well-known curve fitting techniques commonly used in Excel) to create a calibration curve of $X_{CJ}$ vs. Distance. The resulting curve may be in the form of:

$$\text{Distance} = a_1 x^{n_1} + a_2 x^{n_2} \ldots + ax + b$$

where the a's and b are constants and the n's are powers of x. Or where a linear fit is used, the familiar Distance=mx+b.

The captured runtime values for actual $X_{CL}$ and $X_{CR}$ values can then be simply entered into the equation in place of the x values to resolve distance as a single process that accommodated a number of fitting and adjustment issues.

Although pupil displacement from base can be used (as well as angle of pupil) in any direction, simply noting lateral travel (based on azimuth with no concern for elevation), i.e. left and right, provides good results.

The long periods of time strabismics spend looking at computer monitors and TV may exacerbate the symptoms of strabismus but, with the current invention, can be a powerful means to treat it. For example, when the user is sitting at a computer monitor he may inform the software user interface to begin a session whereupon the software calculates the distance of the user's initial look (the distance to the screen). The user may also, optionally, using the user interface, tell the software how far away the current POI is. However, before long, one eye may begin to move away from the POI and, because the strong eye continues to feed the dominant image, the user is not prompted or required to correct it.

Rather than, for example, paralyzing the strong eye, the software compares the ET-based calculation of distance with the known approximate distance from the start of the session. When a lazy eye wanders off, the intersection of the vision axes can move from, say, 18" to multiple feet away very quickly. When this distance comparison results in a difference above a chosen threshold value chosen by experience, the software initiates a correction.

This correction may be in the form of:

A) A dotted display. The current invention, able to light every pixel in the user's field of view, can display any kind of video image and can, over the user's view through the glasses, overlay an array of dots on the view forward. This can begin as few dots for a small disparity between the known distance and the calculated distance spread over may pixels (perhaps 1 pixel lit dimly every 50 pixels. This can proceed to extremes of disparity to very substantial image blockage with high brightness. However, the image itself is, in the preferred method, never blocked so much that the user cannot make out the image because the image facilitates rapid recovery.

B) A message or image on the display with the letters of text warning him to get back on track.

C) A refractive blurring of the image e.g., by effecting a focus in embodiments where LDE's are SLM's using the methods well known for adjusting/creating refraction in SLM-based arrays.

D) A selective blocking of pixels to darken the image. Like the dotted display but progressively dimming the display responsive to increased distance disparity.

E) Combinations of the above.

Patients vary and different methods benefit different patients. The software can optionally, either by user selection, doctor instructions or product design, apply these stimuli in the strong eye, the weak eye or both and in varying degrees for both. In the preferred embodiment, at least the strong eye is provided the image interference. Research has shown that perception of vision input is an extremely high priority for the brain and that it will plastically do whatever it can to "see". That includes making the lazy eye behave when the strong eye image is negatively affected even very temporally.

The software has a degree of image interference associated with each disparity value or range of disparity values so, as the lazy eye starts coming back, the lesser disparity results in a lesser interference created and the image begins to get brighter and/or clearer. When the continuously monitored distance disparity is within the tolerance (i.e. when abs(calculated distance−known distance))<=threshold distance) the forward image is undisturbed.

The user does not have to be in a "session" to benefit from the treatment.

The software can continuously monitor for multiple magnitude-providing indicators of strabismus:

A) Distance disparity (described above)
B) Movement of one eye without movement in the other.
C) Movement of one eye in a different lateral direction that the simultaneous motion of the other.
D) Movement of one eye in a different vertical (elevation) direction that the simultaneous motion of the other.
E) Any distance calculation significantly greater than the values for effective infinity in the human eye which will occur at least when the optical axes of the two eyes are divergent (e.g., when $180-\Gamma_L-\Gamma_R<0$).

To eliminate noise, and in particular here the momentary irregularities of the saccading eyes, and to recognize motion as the change in the values between frames, the software optionally considers these movements and conditions over an implementer or user-decided number of frames. Thus, for example, the movement of an eye in an apparently erroneous direction as described above, may be tolerated for a small number of frames but, if it continues for a chosen threshold number of frames, the software will execute one of the corrections above as chosen by implementers and the user will respond and then see a clear, satisfying image.

Diagnosis of Strabismus:

The description above demonstrates the ability of the current invention to recognize symptoms of strabismus in real time. Thus, it also has great use as a means to diagnose both the presence and magnitude of the problem. The software can also keep a history of each time-stamped correction and its magnitude. These results can be displayed via the plate, 100, or by external display. Ratings such as the area under the corrections curve (time vs. magnitude of correction) or simply corrections/hour can be included. Also, in all embodiments of the current invention there is the intended option of stored data either on board, externally by communication connection or both as a means for applying the resources of personal computers to broadening the capacity and 2-way functionality of the current invention. Thus software on an external computer or computer device can direct the onboard software with responses received by the onboard software. Here, the statistics can be software offloaded by the communication methods already discussed as well as the obvious memory chip physical transfer from the glasses frame to a PC chip reader. Once on the PC, any number of diagnostic and recommended response statistics can be further rendered based on the key information thus captured.

Astigmatism:

Consider a cylindrical lens, 802 in FIG. 8A (seen from above but not drawn geometrically). To correct an astigmatism of the eye, 106, the lens refracts the ray extending from 800 to exit the lens as the ray 804 (rather than the natural path, 801, from POI, 800). For a given prescription corrective lens in a known spatial relationship between eye and lens, these corrective vector shifts (e.g., 801 to 804 so that 800 appears where it should even with the astigmatism) are quickly calculated both manually and in ray-tracing systems. Of course, ophthalmologists also capture in examination the same data or data convertible to such vector shifts but it is simpler to explain and visualize looking at the physical lens that we are emulating.

The current invention can, from this corrected vector data, e.g., the vector coordinates of 804 (whether it is calculated in real time or using a table-based lookup from initial calculations), reproduce light along the corrected vector, 804, as illustrated in FIG. 8C. A BS, 104, is visible because it is activated to reflect the light 103 along the path 804. This will be perceived as coming from the spatial location associated with POI, 800. Of course, when the software is required to display a pixel, e.g. to appear as the POI 800, knowing the vector of light that needs to proceed towards the eye is not enough. To reproduce that vector, the proper EO component must be selected or arrived at by calculation. The preferred method for quickly selecting the right EO component to create the vector is described in "EO Component Mapping for Calibration and Mass-Production" above. There, the table based recall of which conductor contacts need to be activated to power a specific EO component is also described.

Thus in one example embodiment, to display a pixel representative of a POI, e.g. 800, the vector shift from the original path, e.g., 801 to the corrected path, e.g., 804 is spatially calculated (either based on the lens prescription or ophthalmologist eye geometry captured data) or table recalled. This vector's coordinates, potentially rounded to key-based precision levels, are retrieved from a factory or more recent calibration table relating, ultimately, the vector that the light is to follow to the conductor contacts that need to be activated to power the appropriate EO component to send that light. The table can also contain, of course, similar data for more complex light directions like the ones in FIG. 10 and FIG. 14.

Moving Virtual Lens and Other Eye-Tracking Enhancements:

There are, additionally, a number of good reasons to, optionally, cause the virtual lens being emulated to move with the eye and separately, also optionally, to select more carefully which vectors we select to send light along to represent a POI.

For example, it is useful, where possible, to select, for reflected light, vectors that go through the center of the pupil. Recalling from FIG. 4B that, to light any given pixel, there are potentially any number of EO components, like the two indicated by 403, that can do so. Even for near-collimated, very discrete (narrow) beams, any two of these preserve focal depth and depth perception. Thus, in some embodiments, implementers will want to choose, based on ET-gained eye position data, rays more like 409 (which would require another BS between the two indicated by 403) which would paint the same virtual POI but with less distortion. Rays entering near the center of the pupil are not only less vulnerable to corneal refraction error (where approximately 70% of the eye's refraction occurs) but incur less pupil diffraction and, when narrow, contribute less to the outer boundaries of the circle of confusion on the retina.

Also, astigmatism is also not always fully correctable with toric lens (or a virtual toric lens being emulated). Often scratches and/or asymettrical deformations are not all corrected by a cylindrical lens. Also, where a combination of corneal and lenticular astigmaticm exist, they may "warp" each other with their combined irregular refractions in a way that no cylindrical lens can correct. Even in less complex corrections, it is not unusual for a subject to feel that "the floor is tilted". The typical cylindrical shape can be modified to be better optimized to irregular shapes. This can be most effective when the subject's eyes' instant vision axes cross the optical center of the complex and/or asymmetrical lens—but this is often not the case.

If the eye was always looking directly through the center of a lens, that lens could be marvelously complex, taking into account every corneal scratch and even compound distortions from contributing corneal and lenticular astigmatisms. However, the eye does move so it's always been easier to predistort the entering wavefront with a necessary general and orderly lens. However, with the addition of ET to one embodiment, those vectors can be based on the instant-ideal position of the virtual lens. In other words, the virtual lens (which is idealized for an irregular surface when the eye's vision axis crosses the center of the lens) appears to move when the eye does. Thus, the eye is always looking through the center of the virtual lens and more complex correction is enabled by the enduring virtual-spatial relationship.

One way to envision the process, and a simple-to-explain embodiment of the many applicable embodiments, is to follow the following steps:

1. In software, position the virtual lens being emulated at a given distance in front of the virtual position of the eye with the vision axis of the instant virtual eye at the center of the lens and normal to a transverse plane of the virtual lens.
2. Responsive to ET data returning the attitude of the eye, rotate in VR the eye and lens together on the central rotational axis of the virtual eye. Now as the real eye rotates, the virtual eye does too and the virtual lens follows at the same distance in front of the virtual eye.
3. Now, to display a given virtual POI, calculate the vector from that virtual point in space (for a 2-D application this may be a point on a virtual screen a couple of meters in front of the subject or, for 3-D, it is a specific, depth-loaded POI) in front of the subject to the known related spatial location of the eye.
4. Calculate the shift of light following this vector as it encounters the virtual lens (using well known VR positional calculations and, from the angles of incidence at boundary layers, Snell's law) to obtain the shifted vector, e.g., 801.
5. As described above, select and activate the EO component that will send light along this vector. The pixel is seen by the subject in its proper position without a physical lens.

There is, of course, no chromatic aberration or edge distortion since the virtual lens is always "centered" on the vision axis. Using, where practical, narrow beams of light for each pixel, provides the general vision advantages of a greatly reduced effective aperture (even with a large pupil) reducing diffraction and minimizing the envelope of the circle of confusion.

Treating multiple simultaneous conditions: It may be observed that treating astigmatism with virtual lenses is best done with narrow bands of near-collimated light while treatment for focal-length conditions would ordinarily create specific divergence for focal distance and, for 3-D applications, depth perception enablement. However, when treating both astigmatism and a focal-length condition simultaneously (e.g., myopia, hyperopia or presbyopia), the depth loading can be softened (range of divergences over the full range of distances can be compressed into a narrower range) or depth enablement can be accomplished by the same narrow and near-collimated types of beams as shown in FIG. 4.

Then, whether the subject is wearing the current invention to view virtual images over a scene, just to see a displayed image, to see a displayed image better (cataracts, myopia/hyperopia/presbyopia etc.) or to see the scene better by way of redisplay from a scene camera, this can be accomplished without corrective lenses via remapping. Both the displayed image (e.g., text and graphics) and a captured scene provided via a displayed image can, then, include correction for vision defects without lenses.

Holographic Imaging Embodiments:

Diffraction control has been addressed above including a list of "Diffraction-driven divergence control elements" and a discussion of "3-D IMAGING" both describing embodiments where diffraction is both accommodated and used (both for focus and depth enabled display and for control of diffraction). Beyond those, there is provided here, for even higher resolution applications (even in the presence of very long wavelengths), a number of other holograph-related embodiments benefitting from diffraction both as a part of the display process and as a diffraction control measure.

Good optics equipment is often described as "diffraction limited" meaning that other issues detrimental to good imaging have been taken care of leaving only the immovable diffraction limits on high-resolution. However, grating technology, associated with holographic imaging and a growing number of emerging imaging advances, provides important elements in multiple embodiments of the current invention that not only fight diffraction with diffraction while enabling very high resolution but additionally provide an eminently inexpensive alternative solution that is also a mass-producible, "stamp-able" display mechanism and diffraction control measure.

Background on Holograph Stamping and Other Processes:

By bleaching a silver halide hologram or using dicromated gelatin, etc. holographers regularly create transparent holograms whose diffraction patterns are solely controlled by clear shapes whose differences in RI provides the diffraction-driven image. There is also a well developed process of treating extremely high-resolution diffraction patterns from collapsed silver halide hologram patterns rendered to molds for mass produced stamped holograms. This is extremely cost effective in mass production. Also, computer driven diamond and chemical etched holograms also appear able to deal with the scales desired. Contrast-based computer-generated film images can also be created which can then be treated to become transparent. In the preferred embodiments, the transparent hologram EO material has or can attain the default RI.

Holographic gratings can contain rings separated by $\frac{1}{5000}^{th}$ of a mm which creates no small amount of diffraction. However, in a recreated hologram (of, for example, what was, at exposure time, a reasonably distant and tiny isotropic reflector) instead of a grating-width-predicted diffractive bright angle (Airy disc) of roughly a radian exiting the microscopic grating, we get a tiny, discrete and largely non-divergent packet of light that is sent to the eye. Its divergence is, of course, comparable to the light that would have come from the distant virtual image.

This "masking" around the most central portion of the diffraction pattern is due to destructive interference with all but the bright center of the pattern. The precisely organized destructive interference from cooperating related rings creates a blanking effect that is concentrically arrayed around the central point leaving nothing but a discrete shaft of light in the middle. In other words, destructive interference eliminates most of the unwanted diffraction-driven expansion of our desired tiny and collimated beam.

Note, though the word hologram is used fairly loosely herein to also include a wide variety of grating, scratch array and holograph-like processes. Some of them, like scratch holographs, Benton rainbow holographs and other diffraction-based approaches work better with different embodiments and design goals. Scratch holograms and some other human/computer generated patterns work on somewhat different principles than classical holograms but this can actually be used to simplify the process and use fewer rings.

Despite their differences, they are all usefully applicable embodiments and all permit mass-produced holographic elements that, using the "invisible until needed" process, can be selectively activated to create very discrete packets of essentially parallel light as a depth and color controlled image to an eye.

Element-Level Holographic Beam Control:

Example: a placed, printed, photographically created, or stamped array of holographic forms in an EO layer across each "lens" plate creates an array of optionally discrete holographic elements that each act like bleached, clear holograms or other holographic forms where the imaging diffraction is effected by differences in RI rather than contrast. Of course, for stamping embodiments, there are numerous means for creating a holographic stamping master. Examples include computer-directed diamond scratches in an EO medium or scratches in a mold used to create an EO medium and computer driven film exposures followed by processing the silver halide film to collapse into mold form (the collapsed portions create ridges out of the uncollapsed portions). Other processes for creating physical ridges and RI-driven patterns from film holograms are also applicable. << >><<positive/negative mold>> Regardless of how they are mastered, one quick process for mass production is pressing a pattern originating thus into either one or many electro-optic elements, layers of elements or entire layers representing a composite element. This can be done separately for each eye or as a continuous wavefront reconstructor to be shared by both eyes. At the other extreme, they may be imprinted one "single pixel" producing pattern at a time. These EO component materials are selected for their RI range and thus can attain the default RI and, with proper conductor stimulation, an adjusted RI which activates the previously transparent and non-diffracting EO component into an active hologram with the potential for extremely discrete packets of light for very high resolution.

In one embodiment, one layer so pressed can potentially create at once all the "rows" analogous to FIG. 3B's rows in one layer. However, to provide more area for better and brighter pixels, multiple layers in the plate will normatively be stamped. Then, on each side of each such layer, conductor lines can be added as a layer to produce a charge across the EO pattern thus activating it. Gaps in EO and, where present, conductor gaps (between the EO elements and conductors) can be covered or filled with a poured, sublimated, plated, printed or otherwise applied non-conductive layer (with the system default RI) followed, optionally, by more stamped EO layers. As above, the holographic EO elements have effectively the same default (inactivated) RI as the surrounding media and any encountered wiring until activated. Thus, the refractive and reflective boundary layers only exist when they are needed by electro-optically managed RI matching as the default. Of course, if the image display electronics are damaged or even destroyed, the wearer still has a clear scene view since the combined elements default back to the same M.

One Very Simplified Example of the Process:

The simplest way to visualize this approach for the first time is to think of a single BS in the FIG. 1 assembly as being a fragment of a hologram whose ordinary output is a discrete shaft of near-collimated light (e.g., a hologram of a distant, discrete point). Place it at the proper angle in the path of the aforementioned laser beam for emission of image light to the eye analogous to the paths shown in FIG. 1. The essentially collimated or controlled-divergence light to the eye is provided via reference-beam holographic reconstruction.

The hologram in this particular example, however it is created, is a hologram of a tiny and discrete shaft of light or, visualized differently, a holograph of a reasonably distant and small isotropic reflector/emitter (whose light can be near-collimated and unassociated with diffractive divergence). Any fragment of this hologram could be cut out, and when placed close to the eye and in the path of the reference beam, would present the eye with an image of that dot (pixel) of light at the apparent distance which is easily recognized by the eye (even if the eye is less than an inch from the hologram fragment as it is in this worn display device). (Of course, if the theoretical fragment, in this illustrative sub-comment, is taken from a portion of the hologram with a different perspective of the emitter than a true spatial recreation of the hologram, the image would be shifted but this provides an insightful look at how a tiny hologram fragment can produce a very discrete and predictable packet of light.) If you position the hologram such that the orthoscopic packet terminates at the pupil then the pseudoscopic image can be directed to miss the eye.

Thus we first consider the most easily understood of the holographic embodiments: an array of such holographic fragments each of which is positioned to present a single pixel in the FOV. Although a mass-stamped layer of thousands of these is a practical embodiment, a simpler one to visualize first is the placement of many rectangular holograph fragments like 904 in the left side of FIG. 9B. A portion of the hologram of a singular and distant point's diffraction pattern from that singular, tiny object light source is cut out and bleached to make a common transparent, RI-based hologram and placed as shown (e.g., 904) to provide a pixel of the FOV. Of course, in practice, it is more cost effective to press thousands of such holograms into an EO material but this is also a viable example and one that is easily understood. Conductor traces are added which apply a charge to the hologram which will be explained with FIG. 9D. Thus, the laser beam from laser and decollimating optics, 903, becomes the reference beam for the hologram sending a pixel or more of data to the eye, 106. The divergent laser, while not the only embodiment (collimated beams are also illustrated herein), provides a useful array of different reference beam angles for different pixels which allows the implementer to choose a reference beam angle best suited for the direction of the beam to the eye simply by choosing, by placement, which part of the divergent beam provides the best suited reference beam angle of incidence.

Understanding, now, the left side exemplary layout, it is obvious that larger hologram fragments like 905 (on the right side) would accomplish the same objective with more surface area thus requiring less substrate base resolution while embodying a large "aperture" of reflection favorable to control of unwanted boundary diffraction. In such embodiments, it is visually apparent that, ideally, stamping would not be in horizontal (as drawn) rows but in angular layers.

Of course, rather than this tedious process, large arrays of these can be computer generated or assembled hologram modeled and then mass stamped. There can also be many layers to make sequential and complex arrays. This can include providing multiple individually selectable holograms for each pixel with the same azimuth and elevation with respect to the eye's central vision axis. These redundant elements can be included in the depth of the plate to allow the selection of varying and selectable perceived depths for each pixel. They also enable larger hologram segments since there may be many stacked close together separated only by insulation layers and conductor traces. These redundantly positioned pixels can also be used to pass on to the eye and/or respond to different laser wavelengths. That is, different grating patterns on different holograph segments can provide to the eye different wavelengths from the same source (which may also be white light). Also, when multiple sequential wavelengths of collimated source light are used, the selection of one holograph segment from a group of many for the same pixel may be made to best accommodate or apply the chosen or current wavelength.

It will be seen shortly that much higher capacity with less fabrication labor is practical and, for many embodiments, preferable.

Figure 9A:
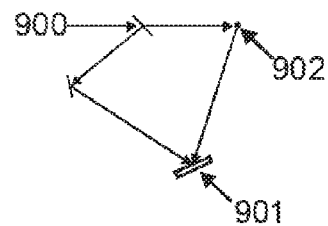
FIG. 9A illustrates an embodiment using holographic fragments.
Figure 9B:
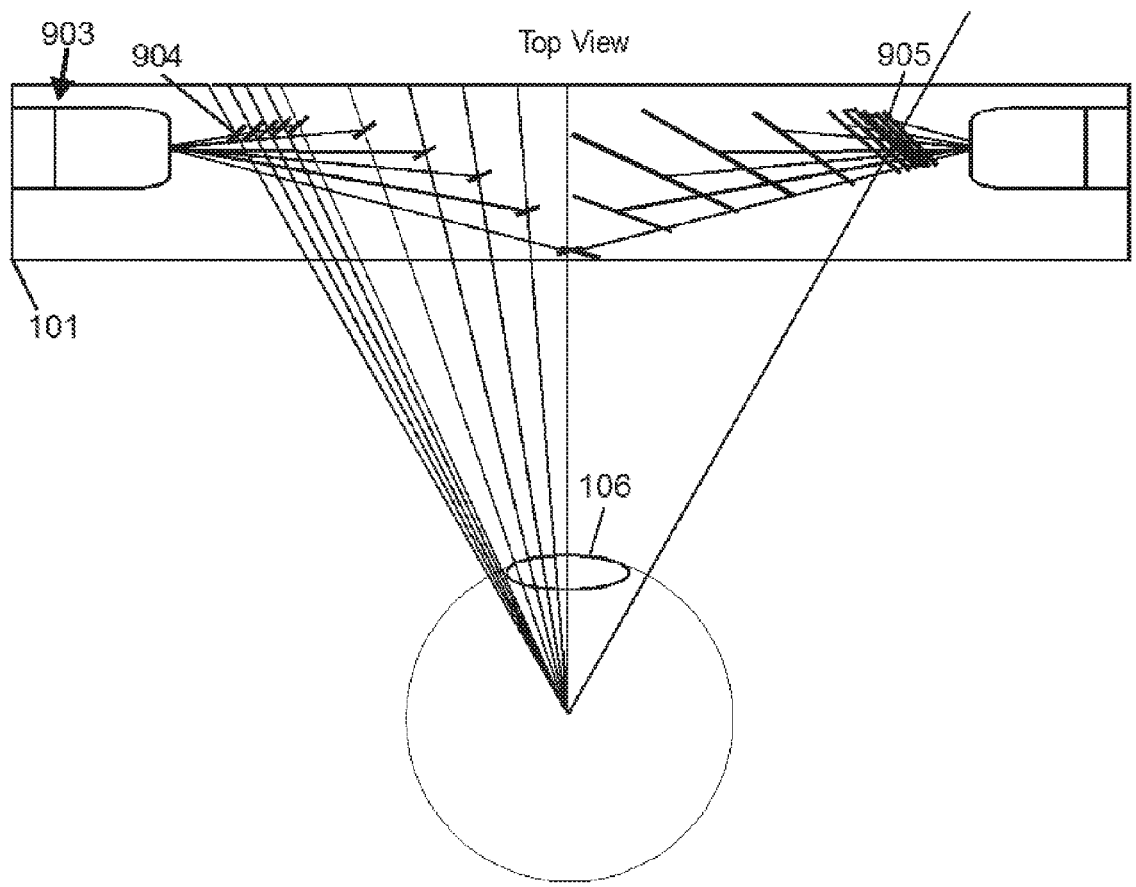
FIG. 9B places a number of these holographic elements in a plate, 101.
Figure 9C:
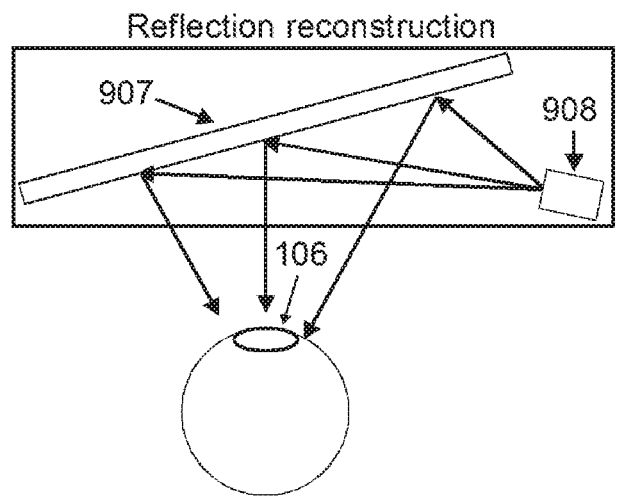
FIG. 9C illustrates one embodiment of a single flat hologram version. In this example a reflection hologram, reflecting only when and where activated, is used.
Figure 9D:
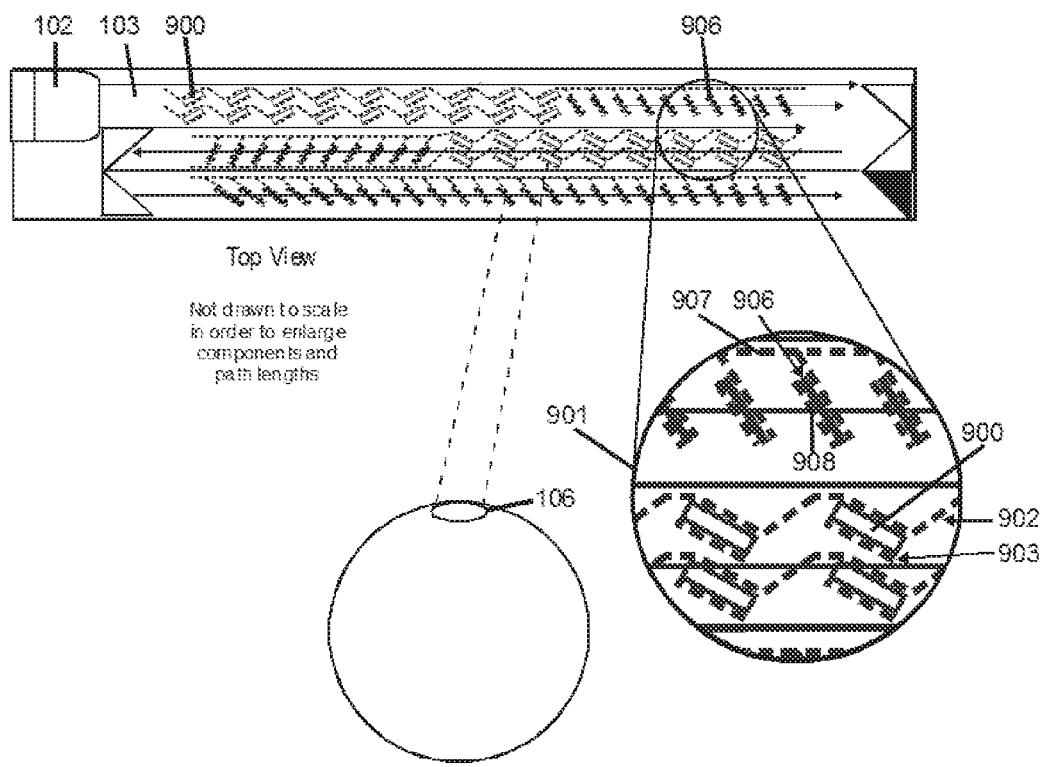
FIG. 9D further illustrates conductor traces which are added and apply a charge to the hologram.

Assembly Summary and Another Example Embodiment:

FIG. 9D illustrates a number of possible components of different or the same embodiment. A laser beam 103 from laser 102 proceeds to the right in what will be referred to as the top row. It first encounters a 2-layer deep array of mechanically mass pressed holograms, 900. Another hologram, 900, can also be seen in enlarged form in enlargement, 901. Here it can be seen that there is a layer of conductor, 902 (the upper dotted line, normal to the paper but irregular in surface) laid down. Upon the layer containing the conductor traces, the holograms are added. This can be by simple placement or mold pressed EO holograms formed into holograms as they are pressed. However, it is not necessary to shape them into little rectangles as they are pressed as illustrated. For example, a layer of EO material (e.g., liquid crystal, lithium niobate, or any EO material) may also be laid down over the entire conductor trace layer, 902, and stamped with a holographic pattern. Then the conductor trace layer, 903, corresponding to 902 for effecting a charge across 900, is laid down. Here it is illustrated as the trace layer, 903, being linear and normal to the paper. The familiar matrix selection method (where one wire from a row and one from a column together select an individual node) is one applicable embodiment and is illustrated here. When a complete layer of EO material is deposited, it will be the portion that is between the conductor nodes that is activated. The rest will continue to be invisible. Another layer of default RI filler is added before beginning the process again for the next layer of holograms.

It can also be seen that a mixed environment is practical. Here, ordinary BSs, e.g., 906, coexist in the same assembly. They can also share the same broad array stamping process. One layer contains the conductor traces, 907 (which may be applied in two steps, including a default RI form layer for the diagonal to be deposited upon). The next layer is the hologram which may, as described above, be formed in any manner including placement of a pre-existing hologram or a subsequent layer of EO material that is stamped into a hologram in which only the portion proximal to the next layer of conductor traces will be activated. Thus, selecting the shape of the conductor traces themselves is an effective means for determining the shape and dimensions of the hologram surface (e.g. round or, as shown here, rectangular and large or small). FIG. 9D also illustrates the mixing of unlike components to form a single pixel. While the holograms themselves are fully capable of providing the proper divergence and angle for proper focusing and depth perception (applicable to 3-D), nevertheless, for this example the two dotted lines entering the eye, 106, are slightly divergent with one coming from an ordinary BS and the other discrete beam is from a hologram. The two lines intersect in the scene view ahead of the subject where the pixel is perceived to be. If the subject does not focus at the right depth, this will be out of focus providing the brain depth information in addition to lens-exertion for accommodation. Of course, another one of the advantages of EO switchable holograms is that they may be also used to display multiple pixels at once.

Dealing with Low EO RI Variation and Other Manufacturing Issues.

EO RI shift is comparatively small. There are several individual approaches to managing the EO effect that can also be used in combination.

a.) Large power-to-need ratio: It is true for most embodiments of the current invention that by simply and inexpensively overpowering the laser (providing much more brightness in the beam than the eye needs to receive) a desired reflected brightness can be attained even with minor RI shift.

b.) Thin charge distribution: It is also true for most embodiments that the potential for RI shift can be substantially increased by simply applying the charge through a very thin EO media. Thus, many of the design criteria for a number of embodiments apply vapor, plating or other thin, controlled application methods for EO components to minimize the thickness of the EO component. In FIG. 9D it can be seen that, even in the rectangular solid embodiment illustrated (a deposited flat film with conductor-defined EO active boundaries is even easier than stamping structural shapes) the charge may be applied through the narrow depth rather than through the more substantive length.

c.) Charge control. Increasing the charge increases the EO effect.

d.) Wavelength shift. E.g., for exposure-created film holograms the exposures can be made with a very short wavelength light (even below the human-visible range). Then, collapsed silver halide hologram patterns thereof can be used to press a hologram in a clear EO material. By using a much longer reference beam (103) reconstructing wavelength (which, if the hologram is created with sub visible wavelength light may just mean visible light but could be red light for even larger results) more diffraction (applied to holographic imaging from a limited voltage) will occur with less voltage.

e.) Computer generated. Obviously, similar to the above, you can simply create computer generated holograms with patterns analogous to extremely short wavelengths (even shorter than is physically possible in the photographic process such as when diamond scratching, selective etching or other precise grating production methods create the diffraction pattern). Recreation with a longer wavelength reference beam light will then provide more diffraction for the same charge.

f.) Field-length minimization. As applied to potentially unique EO shapes, the shorter the distance between the electrodes, the less voltage is required. For example, in a computer generated set of rings, the approach in FIG. 11A can be effective at shortening the effective distance by making the charge range as thin as layer 119 (which can be a very thin layer with the longitudinal distribution of the charge being handled by the conductor areas, in the form of broken annuli). For this discussion of only one embodiment consider the pair of ring sets 113A and 113B to be electrically independent of each other having conductor areas that do not overlap. Conductor lead 115A applies a charge to annulus 117A while conductor lead 115B applies the other charge on the back side (to the viewer) of the displayed assembly to the annulus 117B applying the charge across the EO, pattern embedded annulus, 119.

In a modified embodiment, one side (either the top or bottom layer seen in the cross-sectional area) may be one embodiment of a flat conductor plane as explained above. For example, the top layer, serving as 117A and 117C in FIG. 11A, may both be replaced by or viewed as charged by a single layer of conductor. In that example, conductor annulus 117D would still be activated as shown by leads. The remainder of the discussion, rather than duplicating the discussion for multiple embodiments, considers the conductors as draw in FIG. 11A. Thus, 113A (and, the similarly wired and arrayed, 113B) represents a sandwich-like assembly with a thin, potentially stamped layer carrying a holographic pattern surrounded by flat conductor annuli fed by conductor leads. Of course, in this particular example, the annuli are broken, i.e. missing a portion where it would interfere with the other ring set. This allows for the conductor annuli to be electrically separated from each other where they would otherwise overlap which allows 113 A and B to be printed (or filled then stamped, etc.) in the same three layers (not counting any before or after insulation layers or optional additional layers for managing transparent conductor trace matrix overhead). While the area inside the annuli may be filled with default RI material separately, when the next layer is of such a material, the deposition of that subsequent layer will fill the void without an extra step in the layering process. Thus these two can be activated independently. Using this general approach, any number of concentric or column-row arrayed (or both) ring sets can be closely packed as well as overlapped by multiple other layers and be selected independently with high charge-path efficiency and, thus, maximum RI shift potential for a given charge potential.

g.) Charge reversal: The conductor annuli can, by reversal of charge on the leads or provision of additional leads, reverse the charge polarity to effect a larger total range of RI shift.

Figure 11A:
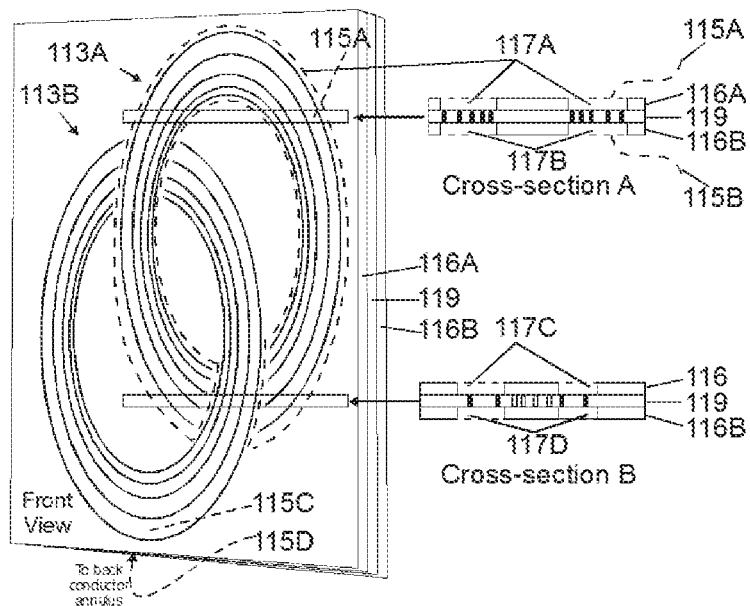
FIG. 11A also involves the use of an SLM illustrating here an arrangement for field-length minimization.
Figure 11B:
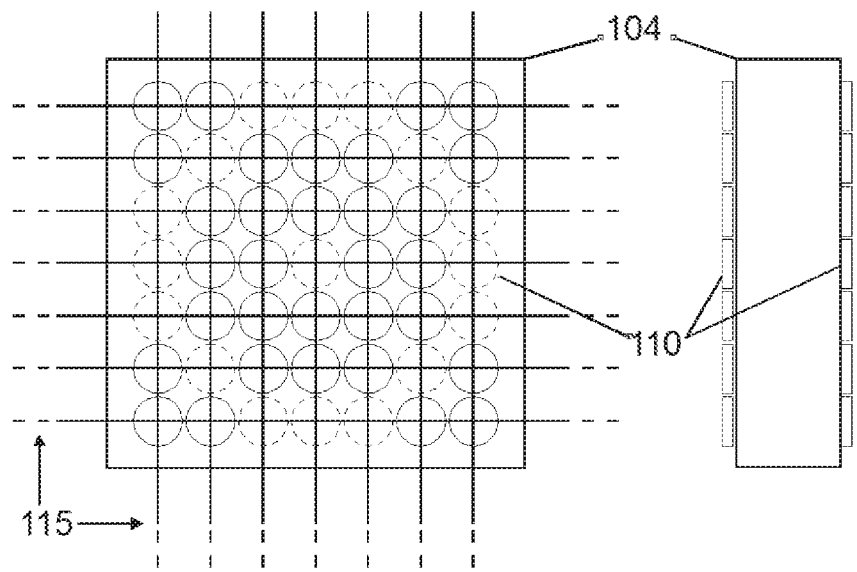
FIG. 11B illustrates that left a plan view of an array of spatial light modulators and, to the right, a profile view.

The FIG. 11A form also allows any RI change of the conductor itself (whether intentional or consequential), when charged, to be incorporated as part of the calculated desired change in the RI of the EO layer rather than potentially interfering with it.

Stackable sheet arrays: It is intuitive, and ideal for many embodiments, that the etched, printed, scratched, stamped, burned, molded or otherwise patterned EO material is the first recipient of said shape controlling factors. However, a non-EO substrate (a carrier material of default RI or, at least having a flat surface that does not substantially greatly affect light transmission) or even an interior surface of the plate itself (which, when relatively flat, does not necessarily have to have the default RI) can be etched, scratched, grooved, etc. or initially molded to have the "negative" shape of BSs, other EO components or any relative of diffraction gratings. Then, when an EO material is deposited upon or otherwise placed against that irregular surface (e.g., liquid crystal or any other EO material) the EO material can take on the desired positive shapes of ridges, rings, BSs and other EO components. Indeed, for some applications, thin sheets of transparent molded or cut plastic or glass with registration holes and pegs for easy stacking alignment and having ubiquitously the negative shape of any EO component or components shaped into them may receive a conductor layer and then stacked together with liquid crystal or other EO material between them and sealed with optical or, at peripheral edges, ordinary cement. Here, as the EO material flows or is pressured into accommodating to the irregularities of the substrate, the EO acquires the positive (desired) shape. Activating areas of the shaped material (rings, BSs, etc.) with shaped conductors can further define the shape and character of the emitted light.

"Screen-Level" Holographic Beam Control.

Now that this simpler example of a matrix of tiny hologram segments and sets or ring-sets (which can be arrayed in rows, columns and in multiple layers) is understood, it's much easier to visualize very much larger individual holographs (such as the sparse subset shown on the right side of FIG. 9B) or even singular (one per plate/eye) computer generated (or carefully imaged) holographic EO ring-sets that create a wide matrix of points (pixels) at a virtual distance with individual rings (or portions of rings optionally segmented to prevent overlaps with other rings) activated selectively to create any virtual point/pixel or many simultaneous virtual points/pixels.

The left half of FIG. 9B illustrates an array of small holograms like 904 which are in the expanding beam of a laser and divergent lens assembly, 903, and, only when activated, send light towards the eye, 106. While it is initially simpler to think of these as producing a single discrete ray, since each of these can contain many selectively activated rings representative of many POI's, each can represent many points/pixels in the display by selecting, i.e. activating, a subset of the EO rings. Further, the right side of FIG. 9B illustrates that each of these small and potentially much more tightly stacked (both horizontally and vertically) holograms like 904 can be expanded to encounter the full beam width as 905 does. Now, it is easier to envision an array of much larger, multi-POI-pixel holograms that are always illuminated by the laser but, due to the effectively identical EO RI with the surrounding media, they allow light to pass through unaffected for those portions that are at the default (unselected) RI. However, selective ring excitement creates the appropriately divergent or parallel (as desired) beams on demand.

Of course, a single flat or shaped hologram, with many independently selectable rings and/or ring sets, can replace all of those shown in FIG. 9B. FIG. 9C illustrates one embodiment of a single flat hologram version. In this example a reflection hologram, reflecting only when and where activated, is used. Of course, embodiments that use the forms illustrated in FIGS. 9B and 9C will use EO and other elements that have or can achieve the default (unselected) RI of the surrounding media. However, the containing surfaces of the plate itself may be of another RI where necessary with minor consequences.

Health Applications

In addition to the health applications of Lenses for Vision Correction, above, the following are applied towards aiding human perception.

Night Vision:

This process of scene redisplay in natural-looking glasses with brightness control is also applicable to providing depth-perception-enabled night vision (brightness control) for those with reduced retinal sensitivity. This amplification of positionally managed light can also be mapped pixel by pixel to best address the irregular and subject-specific retinal map of sensitive/less-sensitive rods and cones. For driving glasses, areas of extreme brightness (e.g., headlights) can be software-governed (dimmed to a cap level). The assembly to accomplish this is simply a worn display embodiment of the current invention with a scene camera or cameras added.

2-D: A camera, normally directed along the cyclopic axis, captures scene images which are redisplayed in amplified form to coincide with the natural scene view. This allows "highlighting" of dark areas while, optionally, leaving bright areas like headlights alone thus making dim objects brighter and the pupil of the eye smaller. In addition to adding what can't be seen, this design can avoid adding to what can be seen (based on light level as easily read from the camera image's pixel brightness) for a "win only" condition. In other words, this is one method for mitigating the effects of partial image mis-registration. At the same time, the smaller pupil responsive to the brighter overall image, makes headlights less blinding and, in fact, more in line with background brightness. This also allows excellent depth perception for relatively bright areas and edges since it is the natural scene coming through the plate.

3-D: A 3-D capture camera, e.g., a pair of cameras, one over each eye, captures a stereoscopic image. Said image is slightly height adjusted for the actual position of each eye with respect to the capturing camera and displayed to the eye via a worn display embodiment providing stereoscopic reproduction and the option of eliminating the natural scene view (blocking the scene view). Where true depth-enabled image capture is present, the pixel or pixel-group enabled divergence responsive to said actual depths of the points in the scene image provides eye-accommodation-related depth perception. One very useful such embodiment involves ET which captures the distance to the instant POI and allows the current invention to apply, as described above, the proper divergence for that distance. This is most useful and precise for the instant foveal view for each eye and, thus, another optional embodiment that only depth enables the portion of the image associated with the instant POI requires that the scene POI's position be located in the captured image (as will be understood by those skilled in the art) and, when those pixels for said locations with known ranges are displayed, the divergence is responsive to the proper depth to be perceived. Here as in the previous example, it is possible to simply tip the scales in favor of dimmer areas of the FOV without displaying anything over the natural scene view for adequately bright subjects. With good camera quality, alignment and display-provided depth perception, however, it is also possible to block the natural scene view with shaded or black lenses.

Macular Degeneration (MD):

Some of the elements in the current invention have application to enhancing the vision for the growing population suffering from macular degeneration. With the capacity to recreate a depth-enabled scene view from a scene camera that accurately reflects the actual scene view for the instant head attitude and with full peripheral vision and light conditioning, several perception enhancements become possible. While this is a natural vision enhancement for worn display delivery, it is also highly applicable to large screen displays. Even in the scene stabilization option, below, stabilizing an action video image can help MD sufferers with perception.

Saccade Temporary Stabilization:

It is problematic that a person with MD will sense a POI in a peripheral area of the retina that still functions and, unconsciously, immediately center the fovea over the POI, removing it from vision and making good perception and orientation difficult. MD subjects complain that objects move, become blurred or simply become "invisible" because the brain processing is confused by the continual bait and switch images. By providing an optional ET camera e.g. 509 in FIG. 14D (similar or amended placement is applicable to all embodiments), the instant cyclopic (central) vision axis can be tracked based on positional and approximate (or calibration corrected) subject cephaolmetric data (e.g. a distance between the eye centers of 62 mm). Then, during brief fixation periods, when the subject is trying to analyze something in the scene, the fixation can be sensed triggering a stabilization or the subject can trigger a stabilization through a user interface such as a "clicker" (which sends an ideally wireless signal received and forwarded to the processor) whereupon the software "freezes" the image briefly. The freeze is long enough to read or grasp what is viewed (or until the clicker is released) but short enough to prevent any significant loss of "brightness" resulting from what may appear to the brain be a frustrated saccade. In the preferred embodiment, eye vibrations that may be 60 Hz do not result in a shift but only significant saccades. Thus, the loss of image is minimized or eliminated.

This temporary stabilization is provided as the software moves the image (the image that was current at the time of the stabilization request) responsive to the eye-tracked and software calculated changes in the ET measured azimuth and elevation of the vision system (which may be based upon the azimuth and elevation of the instant cyclopic vision axis. Thus, during a stabilization period, when the subject unconsciously moves the eyes during a freeze, the image moves with it and the brain perceives a stable image. This is most easily visualized and, indeed, often best suited for a worn display embodiment.

However, for video monitor (no worn display) applications, the ET camera may be screen mounted and the shifted image adjustment, responsive to eye motion as capturable by some many ET and security systems, is in the form of a stabilized video image. The temporary stabilization, again, can be on command from a subject user interface (which can be an ordinary remote control code or a one way square wave RF clicker). This, of course, requires either an interface to shift the image in the circuitry of the monitor itself responsive to ET-captured head shifts or a modular "black box" between the incoming video signal and the monitor input port that decodes and interprets the image, shifts it and then recreates an output video signal with the shift incorporated. While less intuitive than incorporating it into the monitor/TV circuitry (particularly if every set needed it), it is probably the most practical way to create a plug-and-play add on that is needed only by a subset of the TV market. Thus both a worn embodiment that stabilizes anything viewed and an external, potentially large-screen, display that stabilizes only the video image for the subject wearing no embodiment are disclosed.

Scene Stabilization:

Additionally or alternatively, the image from the scene camera embedded in the frames of a worn embodiment can be adjusted to, during punctuated software-sensed or subject-initiated (optionally a separate subject key or signal) scene stabilized periods, remove unwanted motion in the displayed view resulting caused by subject motion, tics or other instability. Thus, the display of the virtual scene removes vibrational image shifts using the same techniques used with many image-stabilization enabled cameras including the recognition of the amplitude and reciprocity of a change in recognized image borders and shifting the image to register with a previous frame. While this functionality is well understood in cameras and can function solely on edge-detected image shift, one of the optional equipment additions associated with enhancing this function is a glasses-frame accelerometer or other system known in the art to more accurately return to the operatively connected software of the current invention data indicative of head motion. From this measured change in head attitude, the change in instant cyclopic axis is geometrically rendered and the software then moves the center of the projected image responsive to the degrees of change in the actual default cyclopic axis due to head motion. Thus, during a software term-based recognition of a vision fixation or a subject user interface input initiating a stabilization period, head motions such as tics or bumping result in a shifting of the scene to offset the change allowing the subject a more persistent image to study and understand.

Very similar to the saccade stabilization above, there is also a stand-up (not worn) video monitor/TV display embodiment that captures the head motion from a screen (or nearby) mounted camera and responsively stabilizes the video image itself while allowing the video motion to proceed. As the head moves, the image on the screen moves. However, extremes of head motion will result in black portions of the screen as the image moves off the screen.

Note, only one camera is required for this application of ET since the azimuth and elevation of one eye can be geometrically associated with the subject's cyclopic azimuth. However, 2 cameras can provide better performance and add the additional value of true POI depth measurement which is applicable to other enhancements.

Contrast Enhancement:

Worn embodiments only: Software-driven contrast enhancement or edge detection or both (as is commonly performed in imaging applications) of the scene-captured image is effected as the recreated image is here provided to the eye via the worn display with increased contrast for better perception. Also, while the dark areas are made darker, the diffusion (that comes from even those darkened areas) is diminished and less light for bright areas is needed for contrast. This allows production of more rhodopsin responsive to a net reduction in illumination while still perceiving a bright image. Where shutters and ET are part of the assembly, light from areas that will fall on dead areas of the retina and light from peripheral areas may be blocked to reduce even low-grade cataract diffusion (often accompanying MID) and glare for better vision and more rhodopsin production.

Color Substitution and/or Morphing.

Subjects with macular degeneration gradually lose color perception as the photoreceptor cone cells, responsible for color vision and most dense in the disease-reduced macula, become unresponsive due to the degeneration.

When the cones are weakened, they lose sensitivity to the lower-intensity wavelengths and are unable to send proper signals. The spectral colors, blue, green, and red are the easiest to see. Thus, as the virtual scene (an enhanced image from the scene camera) is produced, non-spectral colors (which are a combination/blending of the spectral colors and detrimental to complex color contrast) are shifted towards the nearest spectral range. This shifting is accomplished by any means known to those skilled in the art including numerically locating the nearest spectral color to each pixel's scene camera pixel and displaying that spectral color, or a color nearer to it than the scene camera pixel color. In a non pixel-specific embodiment, an HOE, proximal to the subject, may be used to shift colors of the entire displayed image.

Image Concentration/Expansion (Instantly Targeted Zoom Imaging).

It is extremely hard for a person with macular degeneration to read. The text needs to be at a minimum threshold size to be perceived but headlines, fine print and pictures all require different magnification. Thus, in order to fill the visible area of the retina (perhaps a corner) with the most profitably framed/zoomed portion being studied at present, constant "zooming" is needed but unavailable in conventional optics.

The current invention, using a scene camera for the only image (normally blocking the natural, non-electronic, scene view), has a unique facility for changing the size and the apparent depth of elements. By modifying the displayed image to each eye for enlargement/reduction of size and modifying the binocular overlap of the displayed images to the two eyes and switching, for each pixel, to different EO component or components, a genuine memory zoom (as opposed to optical zoom) is provided by well understood means.

However, for MD sufferers such a general zoom can be more trouble than it is worth. As you zoom closer, the peripheral areas don't become easier to see but rather go away altogether as they disappear beyond the limits of the display (while the dark center becomes larger). The subject can provide the corrective factor by continually turning the head as the zoom progresses to keep the retreating image area of interest on the screen. However, this can require a lot of coordination and conscious effort.

An alternative embodiment includes ET hardware, like the cameras represented by 509 in FIG. 14D, and essentially typical ET software. In the configuration process, the azimuth and elevation of "sweet spots", typically one in each quadrant of the scene view is ascertained. This is because typical zooming moves the center of the enlarged area nearer to the center of the displayed image but this is the worst place for the MD sufferer. Thus, the ET either identifies the approximate area being looked at (which may be an adjusted value from experience and calibration of how much off-axis the subject has to look) or the subject identifies it with an HMI (e.g., a mouse). Then, through the HMI (perhaps an up/down rocker switch) the subject indicates a desire to enlarge or reduce while the button is pressed. The resulting zoom or reduction is centered not around the optical axis of the camera but around the adjusted area of the image associated with the subject's "sweet" spot (much as a typical system does around the image center). Because an enlarged, real-time video image from a head mounted camera tends to move more with head vibration, more significant enlargement will be tolerated when zoom is accompanied by the scene and/or eye stabilization options described above.

Retinal Flat Fielding:

As the plate feeds the display image (which, here, is the reproduced scene image) to the eye, each pixel's brightness can be amplified or attenuated to match the weakness or strength, respectively, of the area of the retina where that pixel will image. This can be adjusted by the subject with an HMI to a computer running software that displays a flat-fielded white screen at sequentially varying levels of luminance. The subject can move the HMI cursor to a dark area and hold down the mouse as the "dark" (only because the subject's vision is dark there) area is lightened with increased illumination. These changes in pixel location illumination enhancement is recorded and, in post-calibration display, the pixels feeding darker areas of the retina provide a proportionately higher intensity. Thus, the subject's view is largely flat-fielded (should he look at a lighting-balanced wall it will, except where there is no response at all, be flat fielded. This can also increase the vision area by making insensitive areas that were black before now visible.

However, since the subject is not always looking straight ahead, a superior optional embodiment adds ET. The ET software then calculates (by the azimuth and elevation of the eye with respect to the known spatial location of the plate) the point in the display matrix associated with the subject's physical vision axis for that eye. Then, rather than flat fielding the display image by centering the typical plus/minus adjustment pixel data matrix at the center of the display, it is centered at the point the ET calculation indicated as the point of fixation in the image. Thus, the flat fielding moves with the eye so that the display flat fielding is in sync with eye motion.

More brightness is then provided where needed without blinding or damaging healthier areas of the retina and the brain is provided a more flat fielded image as rods and cones are helped to appear to be more equally sensitive.

Cataracts:

Some discussion of applications related to cataracts have already been discussed. Although other embodiments described further below can be much more effective for improved display imaging and, ultimately, vision for those with cataracts than this first illustration, the following advantages of even this limited example are listed below.

The incoming beam from the BS is analogous to the central subset of the virtual cone of light from a virtual point. In the example above, the radius, r, of the BS' divergent beam near the eye lens (not counting the convergent refraction of the cornea which makes it even smaller) is:

$$r=\beta*\tan(\alpha)$$

or 35*tan(0.79)=0.48 mm. The area illuminated is, then, 0.72 mm$^2$.

The comparative radius of an actual object at the virtual object distance would, in the same calculation, be $$r=\Delta*\tan(\alpha)$$

or 300*tan(0.79)=4.14. The larger area illuminated by a full cone of light from the virtual POI is, then, 53.85 mm. The ratio of the two areas (which is independent of the earlier-ignored corneal refraction) is approximately 75:1.

Thus, this approach has the potential to represent a virtual scene with pixels whose light passes through roughly $\frac{1}{75}^{th}$ as much turbid media for an individual pixel. By also reducing off-axis light and excessive entry of ambient scene light, the eyes will allow an even lower intensity of these narrow beams as rhodopsin is produced responsive to the consistently controlled light entry. Further, in embodiments where the through-the-plate natural scene is itself replaced by a displayed scene image captured by a tiny scene camera (or 2 cameras for capture of binocular separation indicators) in the frame of the IVV glasses, this control of light and image is substantially enhanced.

Thus:

A displayed image may be more easily viewed by persons with cataracts than an ordinary screen.

A displayed image can replace the scene view and make it more visible to the subject with cataracts. This is done by adding a scene camera and projecting its image to the eye in this form which is less vulnerable to turbid media. This may also involve restricting or eliminating (blocking) other incoming light from the scene.

Brightness control for maximum transmission through turbid media are especially efficient when the natural scene is replaced by a displayed scene image. Here the two images, the scene camera captured image and the display image are combined, by commonly practiced methods, and displayed together.

Depth perception, both binocular and lens-accommodation based, can be provided to the subject with cataracts.

Excessively turbid areas or areas with scarred or otherwise blocked elements may be mapped around. As explained above and illustrated in FIG. 4, a single virtual pixel can be represented by multiple BS'. Thus, software choice of BS based on the locations of worst turbidity in a subject's eye geometry can effect an optimal, least diffused, path.

Maximum corneal transmission with minimal scattering at the boundary layer is the potential benefit of the embodiment shown in FIG. 13 where all displayed light enters essentially normal to the cornea.

Minimum scattering as the image is reproduced (even the depth enabled embodiments e.g. FIG. 4). Since only narrow beams of essentially collimated light pass through only a minimal volume of turbid media for each pixel (rather than the typical full cone of light scattering through the full turbid area for each and every pixel), less scattering results.

Software-driven contrast enhancement as the recreated image is provided to the eye with increased contrast for better perception. Also, while the dark areas are made darker, the diffusion is diminished and less light for bright areas is needed for contrast. This allows production of more rhodopsin responsive to a net reduction in illumination while still perceiving a bright image.

Beam Splitter Helpers:

Post Laser Beam Emission Enhancement ("enhancers" for optional processing of the light anywhere between the laser and the eye): Photonic crystals or other EO RI-shift-enhancing layers may be inserted in the path of a beamsplitter(s) in a manner that does not add excessive noise or absorption. One such applicable embodiment places a photonic crystal between the laser and the first beamsplitter on the path to slow the light. This has been shown to increase the EO effect [Wallace, John, "NONLINEAR OPTICS: Slow light boosts electro-optic effect in lithium niobate". Laser Focus World. Http://www.laserfocusworld.com/display_article/294639/12/ARCHI/none/News/NONLINEAR-OPTICS:-Slow-light-boosts-electro-optic-effect-in-lithium-niobate].

Also, there are a number of coherency enhancing processes that have been shown effective at increasing the depth of focus (DOF) and these will be beneficial components of some embodiments where that improves the image perception by minimizing diffraction, enhancing DOF, depth of field, or simply enhancing the more collimated nature of a pixel's transmitted image. One example is Zeev et al's binary phase masks covered in Background above. While these patterns (often circles, lines, and mixtures of patterns) are sometimes calculated, they are also sometimes most effectively iteratively selected from computer programs that compare the net result of different combinations. Another example is U.S. Pat. No. 7,158,317's arrayed Fresnel elements serve a very similar function with a slightly different planar filter (also covered in Background above).

FIGS. 7A and B display a few of the logical positions for some of these. The shape of elements, 703 and 704, actually illustrate a phase mask while 705 looks like a generic filter, including any of the above. However, any of these illustrations of post-laser beam emission enhancement's may understood to represent obvious general placement locations for any of the conditioning elements. For example, 705 in FIG. 7C can be thought of as any of the beam enhancing filters, plates, media, etc. being placed just post laser emission (the laser beam, 103 has just emitted from the laser, not shown, from the left). This placement has the advantage of serving all the beamsplitters in a row with a single enhancer. This, however, when the shared path of thus-processed light is sufficiently long compared to the enhancer's effective range, can reduce the beneficial effect. In such cases, 704 in FIG. 7A illustrates an optionally preferable placement of an enhancer which is, in fact for most applications, the preferred embodiment.

This is particularly the case when the enhancer itself is LDE based. Recalling that any material or assembly that effectively changes RI on command is included in the current invention even in descriptions where only one of the many LDE's is specifically discussed, view 704 in FIG. 7 as an EO element whose default or standard RI is the same as the surrounding media and the RI of the beamsplitter.

Edge Diffusion:

103 in FIG. 1D illustrates that for many embodiments a single broad beam can cross many beamsplitters at different depths in the plate (3 depths shown here). 103 in FIG. 1D can also be thought of as 3 discrete beams. One difference in the two interpretations, both of which are appropriate but for different embodiments, is the potential for edge diffusion and significant diffraction in the case of one broad beam that crosses the edges of smaller bss within its path. One method for minimizing the effects of this is to create a gradient of charge across the beamsplitter so that the greatest charge is at the center of the beamsplitter and, by the time you get to the edges of the beamsplitter, the RI is equal to the media and thus less refraction or reflection occurs. Any means of creating this gradient is a qualified embodiment of the current invention as long as the center of the beamsplitter receives a significant charge and its effect is substantially lessened at the perimeter of the beamsplitter. A smooth, naturally field/range-dissipated graduated reduction in charge over distance from a centrally delivered charge is one method for minimizing issues at the edge of the beamsplitters as the edges become invisible to the passing light.

The invention claimed is:

1. A device for a viewer comprising:
   a display to display at least one image to the viewer;
   a processor configured to direct said display to, in displaying at least one pixel of said at least one image, at least emit, at least when extra perceived brightness is desired, at least one wavelength known to be among those that a retina is particularly sensitive to instead of alternative wavelength choices that the retina is less sensitive to even if said alternative wavelength choices are better at reproducing the color identified in said at least one image.

2. The device of claim 1, wherein
   said processor directs the intensity of light-emitting components of said display to accomplish, as much as is practical, a selected one of the group comprising:
   1) a desired level of perceived brightness,
   2) the display of a desired color when a plurality of said light-emitting components are used in the display of said at least one pixel of said at least one image,
   3) both 1 and 2.

3. The device of claim 1 further comprising:
   an eye-tracking assembly to track at least one eye of said viewer; wherein
   said processor directs a selected one of the group comprising:
   1) brightening of at least one portion of said at least one image that will reach at least one portion of said at least one eye that is less sensitive than desired, 2) darkening of at least one portion of said at least one image that will not reach at least one portion of said at least one eye that is less sensitive than desired,
3) both 1 and 2.

4. The device of claim 1, further comprising:
a worn video camera to capture said at least one image which is, at least in part, an image of at least part of the surroundings of said viewer with said camera positioned to provide, when displayed on said display which is also worn, a view at least similar to a natural view that said viewer would see if not wearing said display; whereby
said viewer can better perceive said viewer's said surroundings.

5. The device of claim 1, wherein
said device is used to improve the ability of said viewer to perceive said at least one image said viewer having one of the group comprising:
1) macular degeneration,
2) at least one cataract,
3) poor night vision,
4) any combination of 1, 2 and 3.

6. A device for a viewer comprising:
a display, capable of emitting at least one wavelength known to be among those that a retina is very sensitive to, to display at least one image to the viewer; and
a processor configured to direct at least one use of said at least one wavelength in the display of said at least one image to enhance a retinal sensitivity of the viewer to light from said display.

7. The device of claim 6 wherein
said processor, in the display of at least one pixel in said at least one image, causes at least one light-emitting component of said display to emit light having at least one wavelength that is at least near to one known to be among those that the retina is very sensitive to even if the resulting color perceived by the viewer is noticeably different than the color of said at least one pixel in said at least one image.

8. The device of claim 6 further comprising:
an eye-tracking assembly to track at least one eye of said viewer; wherein
said processor directs a selected one of the group comprising:
1) brightening of at least one portion of said at least one image that will reach at least one portion of said at least one eye that is less sensitive than desired,
2) darkening of at least one portion of said at least one image that will not reach a portion of said at least one eye that is less sensitive than desired,
3) both 1 and 2.

9. The device of claim 6 further comprising:
data regarding a selected one of the group comprising:
1) said viewer that is at least indicative of a sensitivity to light of at least one portion of at least one retina of said viewer,
2) said viewer that is at least indicative of a sensitivity of at least one retina of said viewer to at least one wavelength of light;
3) at least a subset of a population that is at least indicative of a sensitivity to light of at least one portion of their retinas,
4) at least a subset of a population that is at least indicative of the sensitivity of their retinas to at least one wavelength of light,
5) any combination of 1, 2 3 and 4; whereby
said processor is provided with data for use in determining adaptations in the display of said at least one image.

10. The device of claim 6, wherein
said processor directs the intensity of light-emitting components of said display to accomplish, as much as is possible, a selected one of the group comprising:
1) a desired level of perceived brightness,
2) the display of a desired color when a plurality of said light-emitting components are used in the display of at least one pixel in said at least one image,
3) both 1 and 2.

11. The device of claim 6, wherein
said display is a selected one of the group comprising:
1) any worn color display,
2) any color television,
3) any color video display,
4) any color video projector.

12. The device of claim 6, further comprising:
a video camera to capture said at least one image which is, at least in part, an image of at least part of the surroundings of said viewer with said camera configured to provide, when said at least one image is displayed on said display which is also worn, a view at least similar to a natural view that said viewer would see if not wearing said display; whereby
said viewer can better perceive said viewer's said surroundings.

* * * * *